United States Patent [19]
Vakoc

[11] Patent Number: 6,034,924
[45] Date of Patent: *Mar. 7, 2000

[54] FOLDED SAGNAC SENSOR ARRAY

[75] Inventor: Benjamin J. Vakoc, Mountain View, Calif.

[73] Assignee: The Board of Trustees of the Leland Stanford Junior Univerisity, Stanford, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/253,203

[22] Filed: Feb. 19, 1999

Related U.S. Application Data

[60] Provisional application No. 60/080,677, Apr. 3, 1998.

[51] Int. Cl.[7] .................................................. H04R 1/44
[52] U.S. Cl. ............................................................ 367/149
[58] Field of Search .............................. 367/149; 385/12, 385/13; 250/227.14, 227.16, 227.19; 356/345, 350

[56] References Cited

U.S. PATENT DOCUMENTS

| | | | |
|---|---|---|---|
| 4,375,680 | 3/1983 | Cahill et al. | 367/149 |
| 4,440,498 | 4/1984 | Sheem | 356/350 |
| 4,525,818 | 7/1985 | Cielo et al. | 367/149 |
| 4,536,861 | 8/1985 | Graindorge | 367/149 |
| 4,545,253 | 10/1985 | Avicola | 367/149 |
| 4,752,132 | 6/1988 | Pavlath | 356/345 |
| 4,799,752 | 1/1989 | Carome | 367/149 |
| 5,373,487 | 12/1994 | Crawford | 367/149 |
| 5,636,021 | 6/1997 | Udd | 356/345 |
| 5,636,022 | 6/1997 | Priest | 356/350 |
| 5,694,114 | 12/1997 | Udd | 340/506 |
| 5,866,898 | 2/1999 | Hodgson et al. | 250/227.14 |

OTHER PUBLICATIONS

Sang K. Sheem, Fiber–optic gyroscope with [3×3] directional coupler, *Applied Physics Letters*, vol. 37, No. 10, Nov. 15, 1980, pp. 869–871.

K. Böhm, et al., Low–Drift Fibre Gyro Using a Superluminescent Diode, *Electronics Letters*, vol. 17, No. 10, May 14th, 1981, pp. 352–353.

R.A. Bergh, et al., Compensation of the optical Kerr effect in fiber–optic gyroscopes, *Optics Letters*, vol. 7, No. 6, Jun. 1982, pp. 282–284.

R.A. Bergh, et al., Source statistics and the Kerr effect in fiber–optic gyroscopes, *Optics Letters*, vol. 7, No. 11, Nov. 1982, pp. 563–565.

B. Culshaw, et al., Fibre optic gyroscopes, *Journal of Physics E (Scientific Instruments)*, vol. 16, No. 1, 1983, pp. 5–15.

E. Udd, Fiber–optic acoustic sensor based on the Sagnac interferometer, *Proceedings of the SPIE—The International Society for Optical Engineering*, vol. 425, 1983, pp. 90–91.

(List continued on next page.)

*Primary Examiner*—Daniel T. Pihulic
*Attorney, Agent, or Firm*—Knobbe, Martens, Olson & Bear, LLP

[57] ABSTRACT

A folded Sagnac fiber optic acoustic sensor array operates in a manner similar to a Sagnac interferometer but uses a common delay path to reduce distributed pickup in downlead fibers. The fiber optic acoustic sensor array is used to detect acoustic waves in water. By basing the folded Sagnac sensor array on operating principles similar to the Sagnac interferometer rather than basing the array on a Mach-Zehnder interferometer, the sensor array has a stable bias point, has reduced phase noise, and allows a broadband signal source to be used rather than requiring a more expensive narrowline laser. A large number of acoustic sensors can be multiplexed into the architecture of the folded Sagnac fiber optic acoustic array.

12 Claims, 25 Drawing Sheets

OTHER PUBLICATIONS

Robert J. Urick, The noise background of the sea: ambient noise level, *Principles of Underwater Sound*, 3rd Ed., Chapter 7, McGraw–Hill, 1983, pp. 202–236.

N.J. Frigo, et al., Optical Kerr effect in fiber gyroscopes: effects of nonmonochromatic sources, *Optics Letters*, vol. 8, No. 2, Feb. 1983, pp. 119–121.

J.A. Bucaro, et al., Optical fibre sensor coatings, *Optical Fiber Sensors, Proceedings of the NATO Advanced Study Institute*, 1986, pp. 321–338.

Moslehi, Analysis of Optical Phase Noise in Fiber–Optic Systems Employing a Laser Source with Arbitrary Coherence Time, *Journal of Lightwave Technology*, vol. LT–4, No. 9, Sep. 1986, pp. 1334–1351.

Anthony Dandridge, et al., Multiplexing of Interferometric Sensors Using Phase Carrier Techniques, *Journal of Lightwave Technology*, vol. LT–5, No. 7, Jul. 1987, pp. 947–952.

Kjell Kråkenes, et al., Sagnac interferometer for underwater sound detection: noise properties, *Optics Letters*, vol. 14, No. 20, Oct. 15, 1989, pp. 1152–1145.

H.S. Al–Raweshidy, et al., Spread spectrum technique for passive multiplexing of interferometric optical fibre sensors, *SPIE*, vol. 1314 Fibre Optics '90, pp. 342–347.

H. Poisel, et al., Low–cost fibre–optic gyroscope, *Electronics Letters*, vol. 26, No. 1, Jan. $4^{th}$, 1990, pp. 69–70.

J.T. Kringlebotn, et al., Sagnac Interferometer Including a Recirculating Ring with an Erbium–doped Fibre Amplifier, *OFS '92 Conference Proceedings*, pp. 6–9.

S.F. Collins, et al., A Multiplexing Scheme for Optical Fibre Interferometric Sensors Using an FMCW Generated Carrier, *OFS '92 Conference Proceedings*, pp. 209–211.

A.D. Kersey, et al., Code–division Multiplexed Interferometric Array with Phase Noise Reduction and Low Crosstalk, *OFS '92 Conference Proceedings*, pp. 266–269.

William K. Burns, et al., Fiber–Optic Gyroscopes with Depolarized Light, *Journal of Lighwave Technology*, vol. 10, No. 7, Jul. 1992, pp. 992–999.

C.C. Wang, et al., Very high responsivity fiber optic hydrophones for commercial applications, *Proceedings of the SPIE—The International Society for Optical Engineering*, vol. 2360, 1994, pp. 360–363.

Sverre Knudsen, et al., An Ultrasonic Fiber–Optic Hydrophone Incorporating a Push–Pull Transducer in a Sagnac Interferometer, *Journal of Lightwave Technology*, vol. 12, No. 9, Sep. 1994, pp. 1696–1700.

Sverre Knudsen, et al., Measurements of Fundamental Thermal Induced Phase Fluctuations in the Fiber of a Sagnac Interferometer, *IEEE Photonics Technology Letters*, vol. 7, No. 1, 1995, pp. 90–93.

Kjell Kråkenes, et al., Comparison of Fiber–Optic Sagnac and Mach–Zehnder Interferometers with Respect to Thermal Processes in Fiber, *Journal of Lightwave Technology*, vol. 13, No. 4, Apr. 1995, pp. 682–686.

Sverre Knudsen, Ambient and Optical Noise in Fiber–Optic Interferometric Acoustic Sensors, *Fiber–Optic Sensors Based on the Michelson and Sagnac Interferometers: Responsivity and Noise Properties*, Thesis, Chapter 3, Norwegian University of Science and Technology, 1996, pp. 37–40.

M.J.F. Digonnet, et al., Resonantly Enhanced Nonlinearity in Doped Fibers for Low–Power All–Optical Switching: A Review, *Optical Fiber Technology*, vol. 3, No. 1, Jan. 1997, pp. 44–64.

Jefferson L. Wagener; et al., Novel Fiber Sensor Arrays Using Erbium–Doped Fiber Amplifiers, *Journal of Lightwave Technology*, vol. 15, No. 9, Sep. 1997, pp. 1681–1688.

C.W. Hodgson, et al., Large–scale interferometric fiber sensor arrays with multiple optical amplifiers, *Optics Letters*, vol. 22, No. 21, Nov. 21, 1997, pp. 1651–1653.

Craig W. Hodgson, et al. Optimization of Large–Scale Fiber Sensor Arrays Incorporating Mulitple Optical Amplifiers—Part I: Signal–to–Noise Ratio, *Journal of Lightwave Technology*, vol. 16, No. 2, Feb. 1998, pp. 218–223.

Craig W. Hodgson, et al., Optimization of Large–Scale Fiber Sensor Arrays Incorporating Multiple Optical Amplifiers—Part II: Pump Power, *Journal of Lighwave Technology*, vol. 16, No. 2, Feb. 1998, pp. 224–231.

FOLDED SAGNAC SENSOR ARRAY

RELATED APPLICATION

This application claims the benefit of priority under 35 U.S.C. § 119(e) of U.S. Provisional application Ser. No. 60/080,677, filed on Apr. 3, 1998.

BACKGROUND OF THE INVENTION

1. Field of the Invention

The present invention is in the field of fiber optic acoustic sensor arrays wherein light is propagated in the arrays and the effects of acoustic signals on the light returning from the arrays are analyzed to determine the characteristics of the acoustic signals.

2. Description of the Related Art

Fiber optic based acoustic sensors are promising alternatives to conventional electronic sensors. Included among their advantages are a high sensitivity, large dynamic range, light weight, and compact size. The ability to easily multiplex a large number of fiber optic sensors onto common busses also makes fiber optic sensors attractive for large-scale arrays. The recent successful incorporation of multiple small-gain erbium doped fiber amplifiers (EDFAs) into a fiber optic sensor array to increase the number of sensors that can be supported by a single fiber pair has made large-scale fiber optic sensor arrays even more competitive.

For acoustic detection, the fiber optic sensor of choice has been the MachZehnder interferometric sensor. In any interferometric sensor, phase modulation is mapped into an intensity modulation through a raised cosine function. Because of this nonlinear transfer function, a sinusoidal phase modulation will generate higher order harmonics. An interferometer biased at quadrature (interfering beams $\pi/2$ out of phase) has a maximized response at the first order harmonic and a minimized response at the second order harmonic. For this reason, quadrature is the preferred bias point. As the bias point drifts away from quadrature (for example, due to external temperature changes), the response at the first order harmonic decreases and the response at the second order harmonic increases. When the interferometer is biased at 0 or $\pi$ out of phase, the first order harmonic disappears completely. This decreased response at the first order harmonic (resulting from the bias points away from quadrature) is referred to as signal fading.

Because Mach-Zehnder interferometric sensors have an unstable bias point, they are especially susceptible to the signal fading problem just mentioned. In order to overcome signal fading, a demodulation of the returned signal is required. The typical demodulation technique is the Phase-Generated Carrier (PGC) scheme, which requires a path-mismatched Mach-Zehnder interferometric sensor. (See, for example, Anthony Dandridge, et al., Multiplexing of Interferometric Sensors Using Phase Carrier Techniques, *Journal of Lightwave Technology*, Vol. LT-5, No. 7, July 1987, pp. 947–952.) This path imbalance also causes the conversion of laser phase noise to intensity noise, which limits the performance of the Mach-Zehnder interferometric sensor arrays at low frequencies and places stringent requirements on the linewidth of the source. This narrow linewidth requirement has slowed the development of amplified Mach-Zehnder interferometric sensor arrays at 1.55 $\mu$m.

The Sagnac interferometer has found widespread use in the fiber optic gyroscopes. (See, for example, B. Culshaw, et al., Fibre optic gyroscopes, *Journal of Physics E (Scientific Instruments)*, Vol. 16, No. 1, 1983, pp. 5–15.) It has been proposed that the Sagnac interferometer could be used to detect acoustic waves. (See, for example, E. Udd, Fiber-optic acoustic sensor based on the Sagnac interferometer, *Proceedings of the SPIE-The International Society for Optical Engineering*, Vol. 425, 1983, pp. 90–91; Kjell Kråkenes, et al., Sagnac interferometer for underwater sound detection: noise properties, *OPTICS LETTERS*, Vol. 14, No. 20, Oct. 15, 1989, pp. 1152–1145; and Sverre Knudsen, et al., An Ultrasonic Fiber-Optic Hydrophone Incorporating a Push-Pull Transducer in a Sagnac Interferometer, *JOURNAL OF LIGHTWAVE TECHNOLOGY*, Vol. 12, No. 9, Sep. 1994, pp. 1696–1700.) Because of its common-path design, the Sagnac interferometer is reciprocal and therefore has a stable bias point, which eliminates signal fading and prevents the conversion of source phase noise into intensity noise. Therefore, the Sagnac interferometer is immune to the phase noise which limits the Mach-Zehnder interferometric sensors at low frequencies.

SUMMARY OF THE INVENTION

One aspect of the present invention is an acoustic sensor which comprises a source of light. A first coupler couples the light to a first optical path having a first optical length and to an array of sensors. The array of sensors comprises at least a first sensor. The first sensor is in a second optical path having a second optical length different from the first optical length. The array may advantageously include a second sensor which is in a third optical path having a third optical length different from the first optical length and different from the second optical length. A second coupler receives light from the first optical path and from the array and couples the light to an optical delay path. The light returns from the optical delay path to the second coupler. The second coupler couples the light returning from the optical delay path to the first optical path and to the array. The light returning from the optical delay propagates through the first optical path and the array to the first coupler. The first coupler combines the light from the first optical path and the array to cause light traveling equal distances through the first optical path and the array to interfere and generate a detectable output signal. The detectable output signal varies in response to acoustic energy impinging on the first sensor. At least one detector detects the detectable output signal to generate a detector output signal responsive to variations in the detectable output signal from the first coupler.

Another aspect of the present invention is an acoustic sensor which comprises a source of input light. A first coupler couples the input light to at least a first optical path and a second optical path for propagation therein in a first direction. The first optical path has a first optical length. Light passing through the first optical path is substantially unaffected by an acoustic signal. The second optical path includes at least one sensing element. The sensing element comprises at least a first additional optical path having a second optical length different from the first optical length. At least a portion of the first additional optical path is affected by the acoustic signal to modulate a phase of light passing through the portion of the first additional optical path. In preferred embodiments, the sensing element further includes at least a second additional optical path which has a third optical length different from the first optical length and different from the second optical length. At least a portion of the second additional optical path is affected by the acoustic signal to modulate a phase of light passing through the portion of the second additional optical path. The sensor also includes a delay path. A second coupler couples light from the first optical path and from at least the first additional optical path to the delay path. If the sensing element includes a second additional optical path, the light from the second additional optical path is also coupled to the delay path. The light from the first optical path and from the first additional optical path comprises respective first and second portions of light which are spaced apart in time in accordance with differences in the first and second optical lengths. The first and second portions of light return from the delay path as respective first and second delayed portions. The second coupler couples the first and second delayed portions to the first optical path and to the first additional optical path. Each of the first and second delayed portions is coupled to each of the optical paths for propagation therein in a second direction opposite the first direction. The light portions traveling in the second direction are recombined in the first coupler and are output from the first coupler to at least one detector. The detector detects interference between light portions which travel substantially equal total distances in the first and second directions.

Another aspect of the present invention is a method of detecting acoustic signals. The method comprises generating light and coupling the light to at least first and second propagation paths such that portions of the light propagate in respective first directions therein. The first and second propagation paths have respective first and second optical lengths. The first and second propagation paths output respective first and second output light portions. The first and second output light portions are output from the first and second propagation paths at differing times in accordance with differences in the first and second optical path lengths. The second output light portion is modulated by an acoustic signal impinging on the second propagation path. The first and second output light portions are coupled to a delay path. The delay path outputs first and second delayed light portions corresponding to the first and second output light portions. The first and second delayed light portions are coupled to the first and second propagation paths to propagate therein in a second direction opposite the first direction. The first propagation path outputs a first set of return light portions. The first set of return light portions comprises a respective return light portion for each of the first and second delayed light portions. The second propagation path outputs a second set of return light portions. The second set of return light portions comprises a respective return light portion for each of the first and second delayed light portions. The first and second sets of return light portions are coupled to at least one detector. The return light portions in the first and second sets of return light portions which result from output light portions and delayed light portions which travel identical optical path lengths interfere to generate detectable output signals. The detectable output signals are selectively detected to detect only output signals resulting from interference of light portions which propagated in the first propagation path in either the first direction or the second direction. The detectable output signals vary in response to the acoustic signal impinging on the second propagation path.

Another aspect of the present invention is a sensor which comprises a first optical coupler to receive an optical input signal and to couple the optical input signal to a first optical path having a first optical propagation delay and to a second optical path. The second optical path comprises an array of sensors. Each sensor in the array is in an optical path having a respective optical propagation delay. A second optical coupler receives light from the first optical path and from the array. The second optical coupler couples the light to a delay path, and also couples light returning from the delay path back to the first and second optical paths to cause the light to propagate to the first optical coupler to be recombined therein. Portions of the light interfere in the first optical coupler when the portions of the light have traveled equal distances through the first and second optical paths before returning to the first coupler. A detector detects variations in intensity of light resulting from light pulses interfering in the first coupler.

Another aspect of the present invention is a sensor which comprises a first coupler which couples an optical input signal to a common path and to a sensing array. The light propagates in respective first directions in the common path and in the sensing array. The sensing array comprises a plurality of sensing paths. A second coupler couples light from the common path and from the sensing array to a delay path. The second coupler further couples light from the delay path to the common path and to the sensing array to propagate in respective second directions therein to the first coupler. The first coupler provides output light responsive to the light propagating in the respective second directions. A detector receives the output light from the first coupler and generates an output signal responsive to interference of light in the first coupler. In one embodiment, the delay path comprises a length of optical fiber and a reflector. The length of optical fiber is selected to provide an optical delay time. The light propagates through the optical fiber from the second coupler to the reflector. The reflector reflects light into the optical fiber to propagate through the optical fiber to the second coupler. In particular embodiments, the reflector comprises a Faraday rotating mirror. The light incident on the Faraday rotating mirror in a first polarization is reflected in an orthogonal second polarization, and the light incident in the second polarization is reflected in the first polarization. In the embodiment having the Faraday rotating mirror, the sensor preferably includes a first polarizer to permit light to propagate in the first polarization in the common path between the first coupler and the second coupler. A second polarizer permits light to propagate in the second polarization in the sensing array. The Faraday rotating mirror causes light that propagates in the common path in the first direction to propagate only in the sensing array in the second direction and causes light that propagates in the sensing array in the first direction to propagate only in the common path in the second direction. Portions of the light propagating in the second direction in the common path interfere at the first coupler with portions of the light propagating the second direction in the sensing array which travel substantially equal total optical path lengths in the first and second directions. In alternative embodiments, the delay path receives the light from a first port of the second coupler and returns light to a second port of the second coupler. The delay path may advantageously include a phase modulator which modulates light propagating in the delay path. The phase modulator is responsive to the output signal from the detector to modulate the light propagating in the delay path to null the output signal from the detector.

Another aspect of the present invention is a folded Sagnac fiber optic acoustic sensor array which operates in a manner similar to a Sagnac interferometer but which uses a common-delay path to reduce distributed pickup in down-lead fibers. The fiber optic acoustic sensor array is used to detect acoustic waves in water. By basing the folded Sagnac sensor array on operating principles similar to the Sagnac interferometer rather than basing the array on a Mach-Zehnder interferometer, the sensor array has a stable bias point, has reduced phase noise, and allows a broadband signal source to be used rather than requiring a more expensive narrowline laser. A large number of acoustic sensors can be multiplexed into the architecture of the folded Sagnac fiber optic acoustic array.

BRIEF DESCRIPTION OF THE DRAWINGS

The present invention will be described below in connection with the accompanying drawing figures in which.

DETAILED DESCRIPTION OF THE PREFERRED EMBODIMENTS

The present invention is described below in connection with an array of acoustic sensors (e.g., hydrophones) in a Sagnac loop. Before describing the preferred embodiments, a brief review of the operation of a single loop Sagnac acoustic sensor is provided.

Single Loop Sagnac Acoustic Sensor

Figure 1:
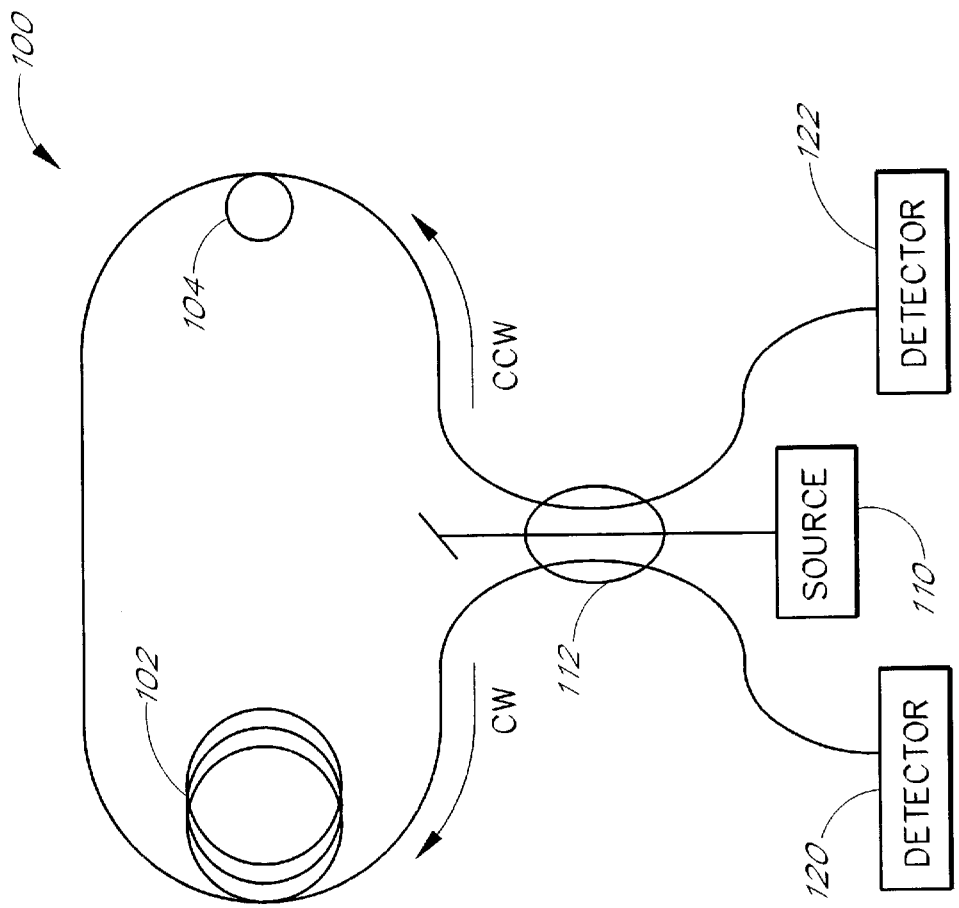
FIG. 1 illustrates an exemplary Sagnac interferometer having a single sensing loop.

A simple Sagnac-based acoustic sensor 100 is shown in FIG. 1. The Sagnac loop is divided into two portions, a delay loop 102 and a hydrophone 104. The delay loop 102 is simply a large length of fiber, typically greater than 1 km. The hydrophone 104 is a portion of fiber in which an acoustic wave is transformed into a phase modulation of an optical signal propagating through the fiber. A high responsibility to acoustic waves is typically accomplished by selecting optimized coatings for the section of fiber in the hydrophone 104, and wrapping the fiber around a mandrel of suitable composition. (See, for example, J. A. Bucaro, et al., Optical fibre sensor coatings, *Optical Fiber Sensors, Proceedings of the NATO Advanced Study Institute*, 1986, pp. 321–338.) The length of fiber wrapped around the hydrophone 104 is typically 10 meters to 100 meters. Light from a source 110, such as, for example, a superfluorescent fiber source (SFS), is split into clockwise (CW) and counter-clockwise (CCW) beams by a 3×3 coupler 112. The operation of the 3×3 coupler 112 is well-known and is described, for example, in Sang K. Sheem, Fiber-optic gyroscope with [3×3] directional coupler, *Applied Physics Letters*, Vol. 37, No. 10, Nov. 15, 1980, pp. 869–871.

Although described herein as using a 3×3 coupler 112, other couplers (e.g., a 2×2 coupler, a 4×4 coupler, etc.) can be used with alternative embodiments of the present invention. For example, to use a 2×2 coupler, both ports of one side are used to create the Sagnac interferometer. One port of the other side is a detection port. The remaining port is used to launch light into the array and can also be used as a detection port if a coupler or circulator is employed (in a similar manner as is done with fiber optic gyroscopes). In general, any n×m coupler can be employed by using two ports of one side of the coupler to create the Sagnac interferometer and using the ports on the other side of the coupler as detection ports, launching ports, or both.

After splitting, the CW beam travels through the delay loop 102 first and then through the hydrophone 104, while the CCW beam travels through the hydrophone 104 first and then through the delay loop 102. During a time delay $T_{delay}$ between a time when the CW beam travels through the hydrophone 104 and a time when the CCW beam travels through the hydrophone 104, the acoustic signal and likewise the acoustically induced phase modulation in the hydrophone 104 changes. This change in phase modulation is mapped into a phase difference between the counter-propagating beams, which is converted into an intensity modulation when the beams recombine at the 3×3 coupler 112. This intensity modulation is then detected by a first detector 120 and a second detector 122 or by only one of the two detectors.

More explicitly, if an acoustic signal induces a phase modulation $\phi_h \cos(\Omega t)$ in the fiber of the hydrophone 104, the resulting phase modulation between the interfering beams at the hydrophone 104, $\phi_{int}(t)$, is given by:

$$\phi_{int}(t) = \phi_h \cos(\Omega t) - \phi_h \cos(\Omega(t + T_{delay})) \quad (1)$$

$$= 2\phi_h \sin\left(\frac{\Omega \cdot T_{delay}}{2}\right) \sin\left(\Omega t + \frac{\Omega \cdot T_{delay}}{2}\right)$$

where $T_{delay}$ is the travel time through the delay loop. Thus, $\phi_{int}(t)$ is a function of the hydrophone modulation $\phi_h$ and the product of the acoustic modulation frequency, $\Omega$, with the loop delay, $T_{delay}$. This differs from a Mach-Zehnder interferometric sensor in which $\phi_{int}(t)$ is a function of only the hydrophone modulation $\phi_h$. Maximum sensitivity is achieved in the Sagnac loop acoustic sensor when the product of the acoustic frequency, $\Omega$, and the time delay, $T_{delay}$, is an odd multiple of $\pi$ (maximum value of the first sine term in Equation 1). The acoustic frequency which makes this product $\pi$ is called the proper frequency of the loop, which is the lowest frequency at which maximum sensitivity is achieved. Most underwater sensing applications are concerned with the detection of acoustic frequencies below 10 kHz. For the proper loop frequency to be less than 10 kHz, a delay time of at least 50 microseconds and therefore a delay loop length of at least 10 km is required. Thus, the Sagnac acoustic sensor 100 requires a large amount of fiber for the detection of low acoustic frequencies (<10 kHz).

The common-path design inherent to the Sagnac interferometer has many advantages over a Mach-Zehnder interferometer in addition to the stable bias point and elimination of phase noise already mentioned. A Sagnac interferometer allows the use of a short-coherence length, broadband source, such as a superfluorescent fiber source (SFS), an example of an amplified spontaneous emission (ASE) source. Such sources are inexpensive and can readily provide high powers. It has been shown that the use of the 3×3 coupler passively biases the Sagnac acoustic sensor near quadrature. (See, Sang K. Sheem, Fiber-optic gyroscope with [3×3] directional coupler, *Applied Physics Letters*, Vol. 37, No. 10, Nov. 15, 1980, pp. 868–871; and H. Poisel, et al., Low-cost fibre-optic gyroscope, *Electronics Letters*, Vol. 26, No. 1, Jan. 4, 1990, pp. 69–70.) By subtracting the signals from the two detection ports of the 3×3 coupler, the source excess noise, which is the limiting noise source of SFS sources, can be subtracted while phase-modulation induced intensity variations due to the hydrophone are added. This allows a Sagnac interferometer to approach near shot-noise limited performance. (See, Kjell Kråkenes, et al., Sagnac interferometer for underwater sound detection: noise properties, *OPTICS LETTERS*, Vol. 14, No. 20, Oct. 15, 1989, pp. 1152–1145.)

Previous work on Sagnac-based acoustic sensors has been limited to a single sensor configuration. Because of the inherent advantages of the Sagnac interferometer, Applicants have determined that it is desirable to replace the Mach-Zehnder interferometric sensors in a large-scale array with Sagnac based sensors. Each Sagnac sensor 100 discussed above requires many kilometers of fiber, making the insertion of numerous such sensors into a large-scale array impractical. Research into using recirculating delay loops to reduce the fiber length requirement has produced sensors which use significantly less fiber but suffer from high noise due to the incorporation of EDFAs within the recirculating loop. (See, for example, J. T. Kringlebotn, et al., Sagnac Interferometer Including A Recirculating Ring With An Erbium-doped Fibre Amplifier, *OFS '92 Conference Proceedings*, pp. 6–9.) A novel approach for decreasing the fiber required is described below.

Novel Sensor Array Based on the Sagnac Interferometer

Figure 2:
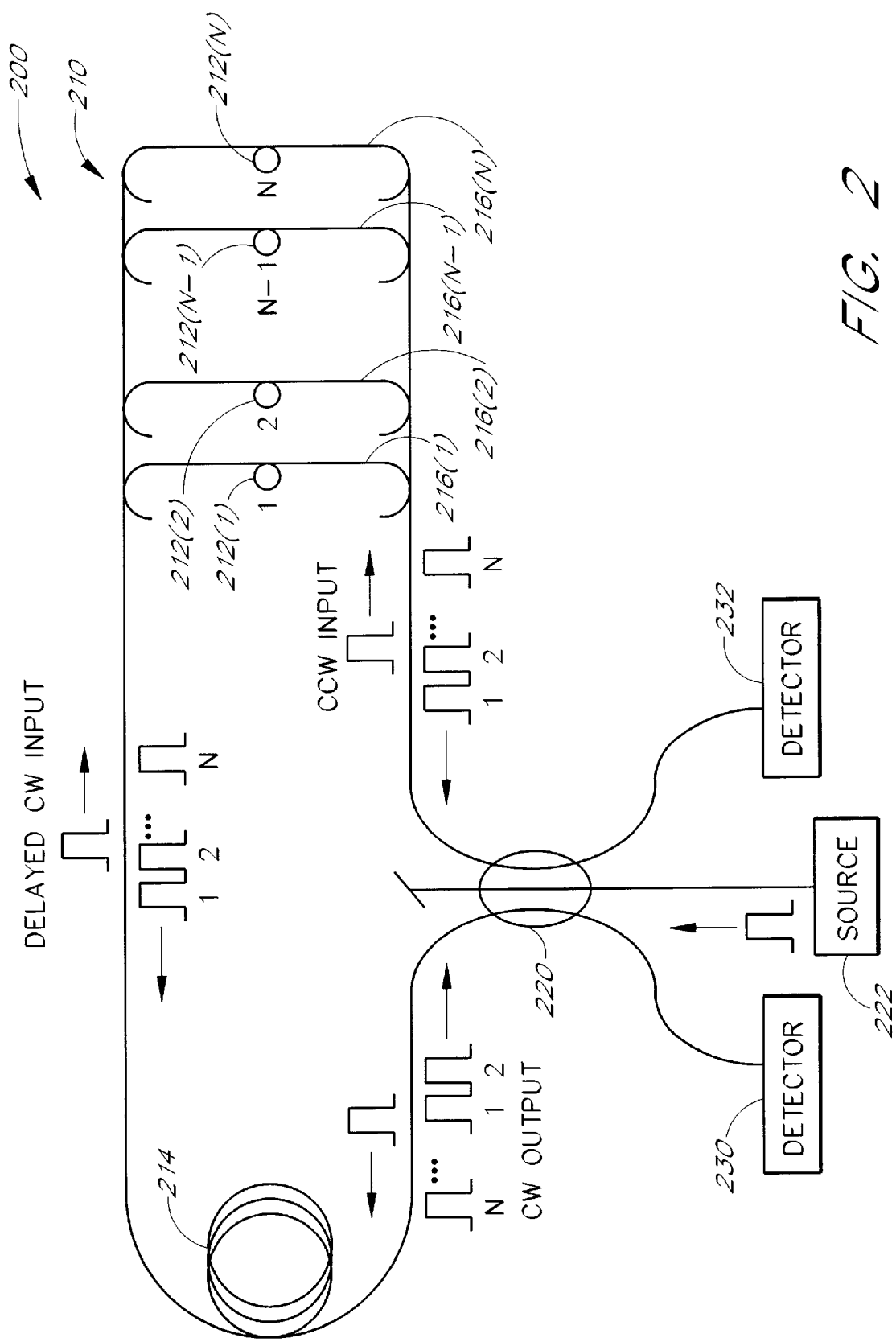
FIG. 2 illustrates a Sagnac sensor array in accordance with the present invention wherein each rung of a sensor array forms an additional Sagnac interferometer.

As set forth below, Applicants have discovered a novel system which reduces the amount of fiber needed for a Sagnac-based large scale array by multiplexing multiple sensors onto the same delay loop, producing a practical Sagnac sensor array (SSA). As illustrated in FIG. 2, a Sagnac sensor array 200 in accordance with the present invention includes an array 210 of hydrophones 212($i$) in a ladder configuration which are attached to a single delay loop 214. For example, FIG. 2 shows a Sagnac sensor array 210 having N hydrophones 212(1), 212(2) . . . 212(N) in respective rungs 216(1), 216(2) . . . 216(N). Each rung 216($i$) in the Sagnac sensor array 210 comprises a single fiber wrapped around a respective hydrophone 212($i$). Every path from a 3×3 coupler 220 through the delay loop 214 and array 210 and back to the coupler 220 comprises a separate Sagnac interferometer. Therefore, for an array of N sensors 212, there are N separate Sagnac interferometers, each of which behaves like the single loop Sagnac sensor 100 shown in FIG. 1. Each Sagnac interferometer measures the acoustic signal at a separate point in space, i.e., the location of the hydrophone 212($i$). For example, the Sagnac interferometer comprising the delay loop 214 and the rung 216(1) measures the acoustic signal at hydrophone 212(1). In addition, each Sagnac interferometer also picks up acoustic signals (e.g., noise) elsewhere in the loop, which noise is advantageously reduced, as will be discussed below.

The Sagnac sensor array 200 is easiest understood in a time-division multiplexed (TDM) configuration (non-TDM schemes are discussed later). A source 222 (which may advantageously comprise a conventional pulsed source or may comprise a cw source with an external modulator) generates a light pulse which enters the Sagnac loop via a third port of the coupler 220 and propagates in both the CW and CCW directions as indicated in FIG. 2. Upon reaching the array 210, the CCW pulse is split into a train of N separate pulses. At this point, the CW input pulse has not yet reached the array 210 and is still a single pulse. When the CW pulse reaches the array 210, it also is split into a train of N pulses. Each pulse in the CW train returns to the 3×3 coupler 220 after traveling through a respective rung 216($i$) and interferes with the pulse in the CCW train which has traveled the same rung 216($i$) in the opposite direction. Thus, N pulses are detected by a first detector 230 and a second detector 232, and each pulse comprises the CW and CCW pulses of one of the N Sagnac loops (i.e., the two pulses which have traveled in opposite directions through the same respective rung 216($i$)). Because the pulses which travel through different combinations of rungs do not travel identical optical paths, such pulses are not coincident in time at the coupler 220, and thus do not interfere with each other at the coupler 220. The pulse widths should be smaller than the differential delay between adjacent sensors so that the pulses from adjacent sensors do not overlap.

Figure 3:
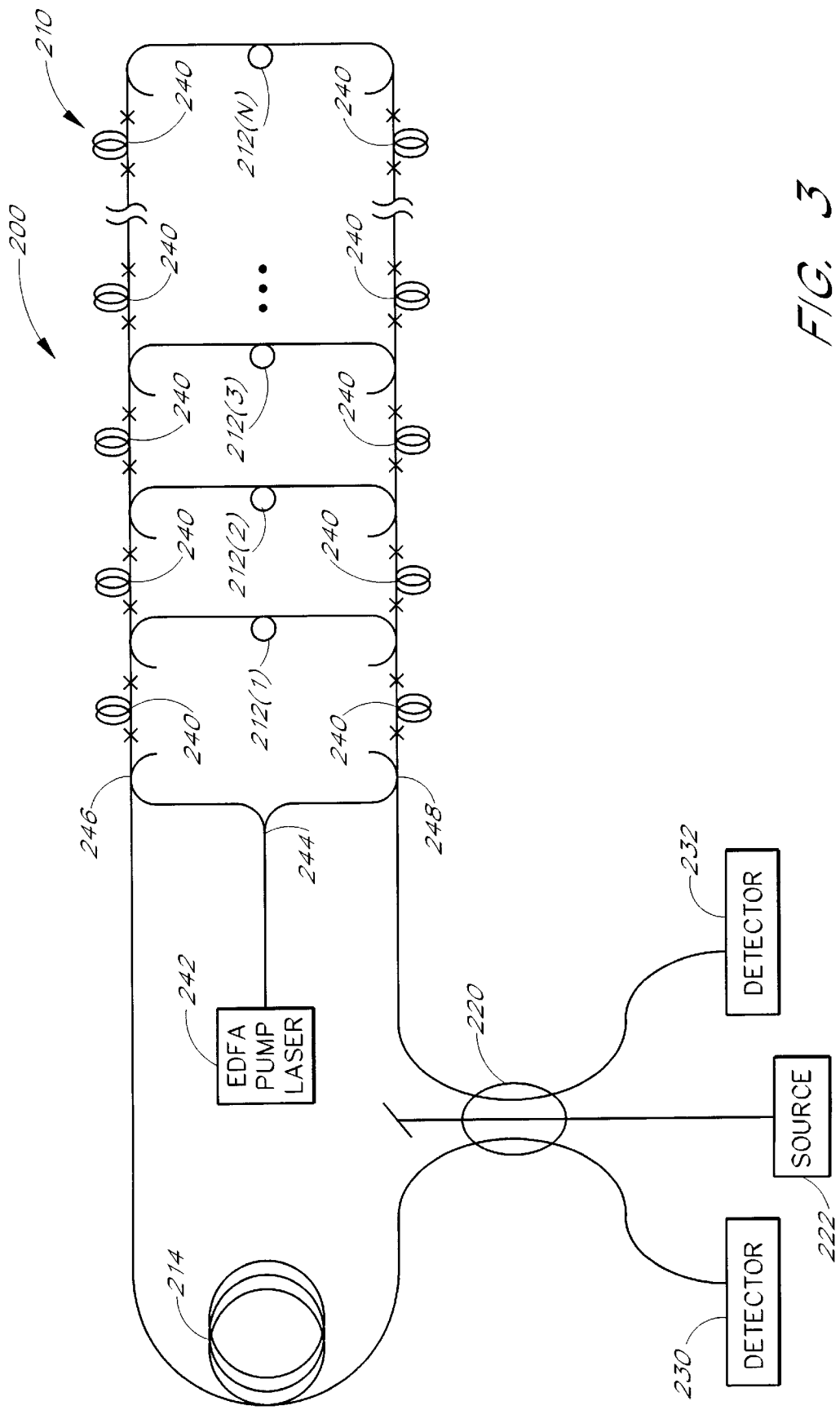
FIG. 3 illustrates a Sagnac sensor array which includes erbium-doped fiber amplifiers to regenerate signal power lost to coupling and dissipative losses.

As illustrated in FIG. 3, small-gain erbium doped fiber amplifiers (EDFAs) 240 are advantageously added to the array portion 210 just as EDFAs have been added to Mach-Zehnder interferometric sensor arrays. (See, for example, Craig W. Hodgson, et al., Optimization of Large-Scale Fiber Sensor Arrays Incorporating Multiple Optical Amplifiers-Part I: Signal-to-Noise Ratio, *JOURNAL OF LIGHTWAVE TECHNOLOGY*, Vol. 16, No. 2, February 1998, pp. 218–223; Craig W. Hodgson, et al., Optimization of Large-Scale Fiber Sensor Arrays Incorporating Multiple Optical Amplifiers-Part II: Pump Power, *JOURNAL OF LIGHTWAVE TECHNOLOGY*, Vol. 16, No. 2, February 1998, pp. 224–231; Jefferson L. Wagener; et al., Novel Fiber Sensor Arrays Using Erbium-Doped Fiber Amplifiers, *JOURNAL OF LIGHTWAVE TECHNOLOGY*, Vol. 15, No. 9, September 1997, pp. 1681–1688; and C. W. Hodgson, et al., Large-scale interferometric fiber sensor arrays with multiple optical amplifiers, *OPTICS LETTERS*, Vol. 22, No. 21, Nov. 21, 1997, pp. 1651–1653.) The EDFAs 240 increase the number of sensors which can be supported by a single array 210 by regenerating the signal power which is lost to coupling and dissipative losses. The EDFAs are advantageously pumped by one or more pump laser sources 242 via a splitting coupler 244 and via a first wavelength division multiplexing (WDM) coupler 246 and a second WDM coupler 248.

Because it uses the Sagnac architecture, the Sagnac sensor array 200 has all of the advantages of the single loop Sagnac based sensor 100 discussed above. The common-path design eliminates the conversion of source phase noise into intensity noise at the interfering coupler 220. The source 222 can be a fiber ASE (amplified spontaneous emission) source (i.e., the SFS discussed above), which provides high powers inexpensively at 1.55 $\mu$m. Passive biasing near quadrature is achievable for all sensors by using the 3×3 coupler 220. Also, the 3×3 coupler 220 provides a convenient means to detect two interferometric outputs at the detectors 230, 232, and to use the outputs of the two detectors to subtract source excess noise. (See, for example, K. Krakenes, et. al., Sagnac interferometer for underwater sound detection: noise properties, *OPTICS LETTERS*, Vol. 14, 1989, pp. 1152–1154, which shows the use of two detectors in combination with a single Sagnac interferometer.)

The properties of this novel Sagnac sensor array 200 will be discussed more specifically below followed by a more detailed discussion of the frequency response and dynamic range which result from the use of a Sagnac interferometer. Thereafter, a calculation of the magnitude of the distributed pick-up from the non-hydrophone fiber loop segments will be described, along with a technique for reducing this pick-up magnitude. Polarization will also be addressed below. New sources of noise which are introduced by the Sagnac design are then discussed. Finally, multiplexing schemes other than TDM for the Sagnac sensor array are presented.

Although the present invention is described above with respect to a single sensor in each rung 216($i$) of the array 210, it should be understood that each rung 216($i$) may advantageously comprise a subarray having multiple sensors, such as are described, for example, in U.S. Pat. No. 5,866,898, which issued on Feb. 2, 1999, which is incorporated by reference herein. (See, also, C. W. Hodgson, et al., Large-scale interferometric fiber sensor arrays with multiple optical amplifiers, *Optics Letters*, Vol. 22, 1997, pp. 1651–1653; J. L. Wagener, et al., Novel fiber sensor arrays using erbium-doped fiber amplifiers, *Journal of Lightwave Technology*, Vol. 15, 1997, pp. 1681–1688; C. W. Hodgson, et al., Optimization of large-scale fiber sensor arrays incorporating multiple optical amplifiers, Part I: signal-to-noise ratio, *Journal of Lightwave Technology*, Vol. 16, 1998, pp. 218–223; and C. W. Hodgson, et al., Optimization of large-scale fiber sensor arrays incorporating multiple optical amplifiers, Part II: pump power, *Journal of Lightwave Technology*, Vol. 16, 1998, pp. 224–231.)

Frequency Response

Figure 4:
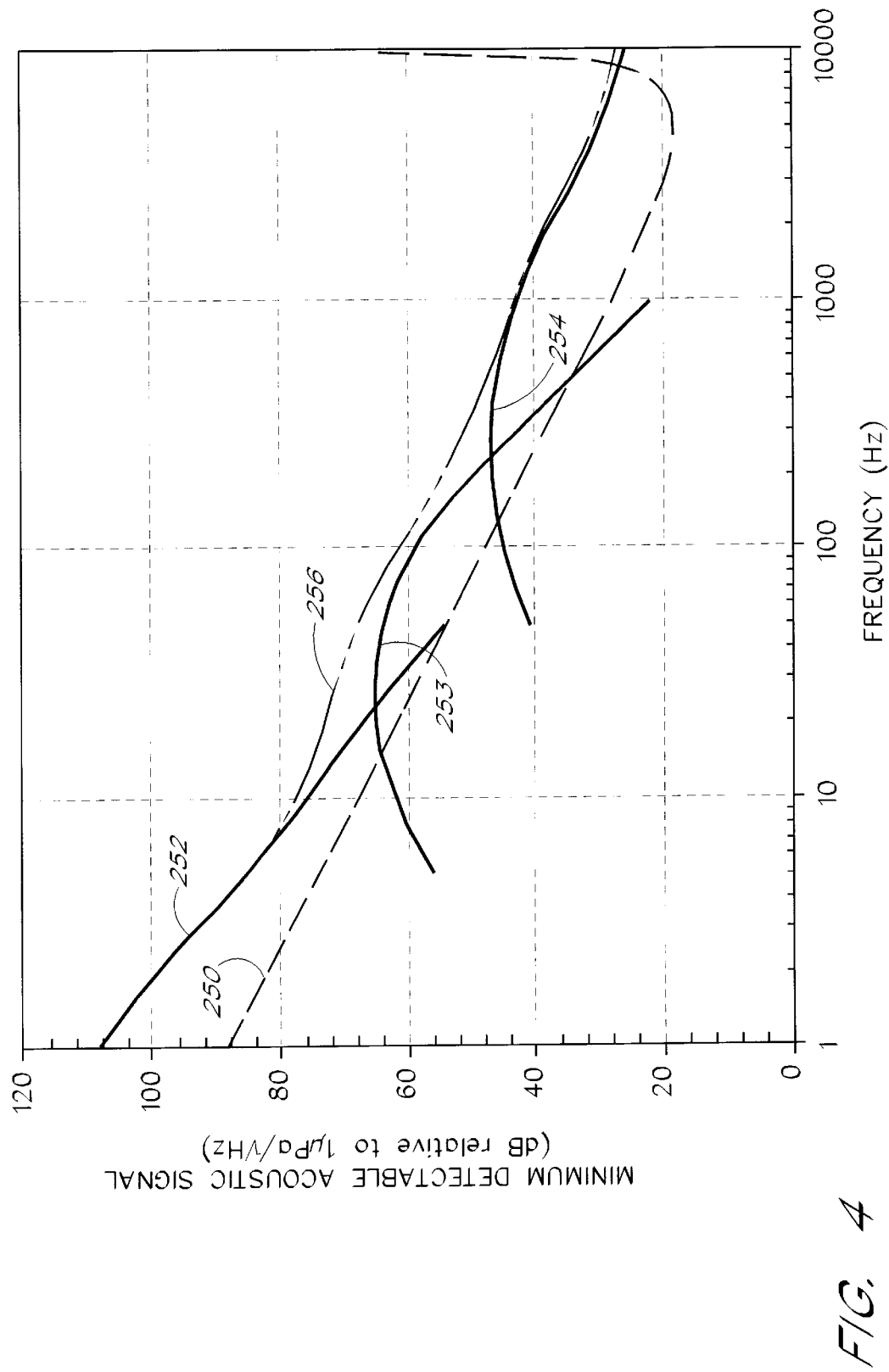
FIG. 4 illustrates a graph of the frequency response of a Sagnac interferometer in accordance with present invention compared with the three dominant ocean floor noises.

As set forth above, the Sagnac sensor has a frequency dependent response given by Equation 1. At frequencies well below the proper frequency of the loop, defined as $1/(2 \cdot T_{delay})$, the minimum detectable acoustic signal scales with the inverse of acoustic frequency. This decreased acoustic sensitivity at low frequencies has been a major concern for the Sagnac acoustic sensor. However, it has been pointed out that this decreased sensitivity at low frequencies is fortunately matched by an increasing ocean noise floor (See, for example, Sverre Knudsen, Ambient and Optical Noise in Fiber-Optic Interferometric Acoustic Sensors, *Fiber-Optic Sensors Based on the Michelson and Sagnac Interferometers: Responsibility and Noise Properties*, Thesis, Chapter 3, Norwegian University of Science and Technology, 1996, pp. 37–40.) Ideally, it would be desirable if the minimum detectable acoustic signal of an array at a given frequency were to be a constant amount below the ocean noise floor at that frequency. Thus, the minimum detectable acoustic signal would also increase at lower frequencies to match the increasing ocean noise floor. The frequency response of the Sagnac sensor array 200 of the present invention in fact does provide a good match between the ocean noise floor and acoustic sensitivity. This is illustrated in FIG. 4, where the minimum detectable acoustic signal for a Sagnac sensor array is plotted as a curve 250 assuming an optical noise floor of 10 $\mu$rad/$\sqrt{Hz}$, a hydrophone phase responsibility of $3.2 \times 10^{-7}$ rad/$\mu$Pa and a delay loop length of 20 km. (The vertical axis is in dB relative to a baseline of 1 $\mu$rad/$\sqrt{Hz}$.) Also plotted in FIG. 4 are the ocean noise floors for the three dominant ocean noise sources at these frequencies and a resulting sum of the noise from the three sources. A curve 252 represents the noise from ocean turbulence, earthquakes, volcanic eruptions, and the like. A curve 253 represents light shipping noise. A curve 254 represents DSSO (distant shipping and storms) noise. A curve 256 represents the sum of the noise floors from the three dominant sources (i.e., the sum of the curves 252, 253 and 254). (See, for example, Robert J. Urick, The noise background of the sea: ambient noise level, *Principles of Underwater Sound*, 3rd Ed., Chapter 7, McGraw-Hill, 1983, pp. 202–236.) The minimum detectable acoustic signal of the Sagnac sensor array 200 increases in such a way as to provide a nearly constant amount of detectable signal below the ocean noise floor at all frequencies below 10 kHz. Thus, the frequency-dependent response of the Sagnac sensor array 200 does not prohibit low-frequency acoustic detection. The Mach-Zehnder array shows the same trend as the Sagnac sensor array, namely a decreasing sensitivity towards lower frequencies, but in the Mach-Zehnder array, the decreasing sensitivity is smaller than in the Sagnac-based sensor.

Although both the Mach-Zehnder interferometer and Sagnac sensor array 200 have similar frequency-dependent responses, the source of their frequency responses is fundamentally different. The increasing minimum detectable signal in the Mach-Zehner interferometer sensor array is due to an increasing optical noise floor. The cause of this increasing optical noise floor is the phase noise introduced by the path-imbalanced Mach-Zehnder interferometer. Thus, although the noise floor is 10 $\mu$rad/$\sqrt{Hz}$ at 10 kHz, it increases towards lower frequencies. In the Sagnac sensor array 200, the increasing minimum detectable acoustic signal is due to the sin($\Omega T_{delay}/2$) term in Equation 1, and not to an increasing optical noise floor. The optical noise floor remains a constant 10 $\mu$rad/$\sqrt{Hz}$ over the entire frequency range.

Figure 5:
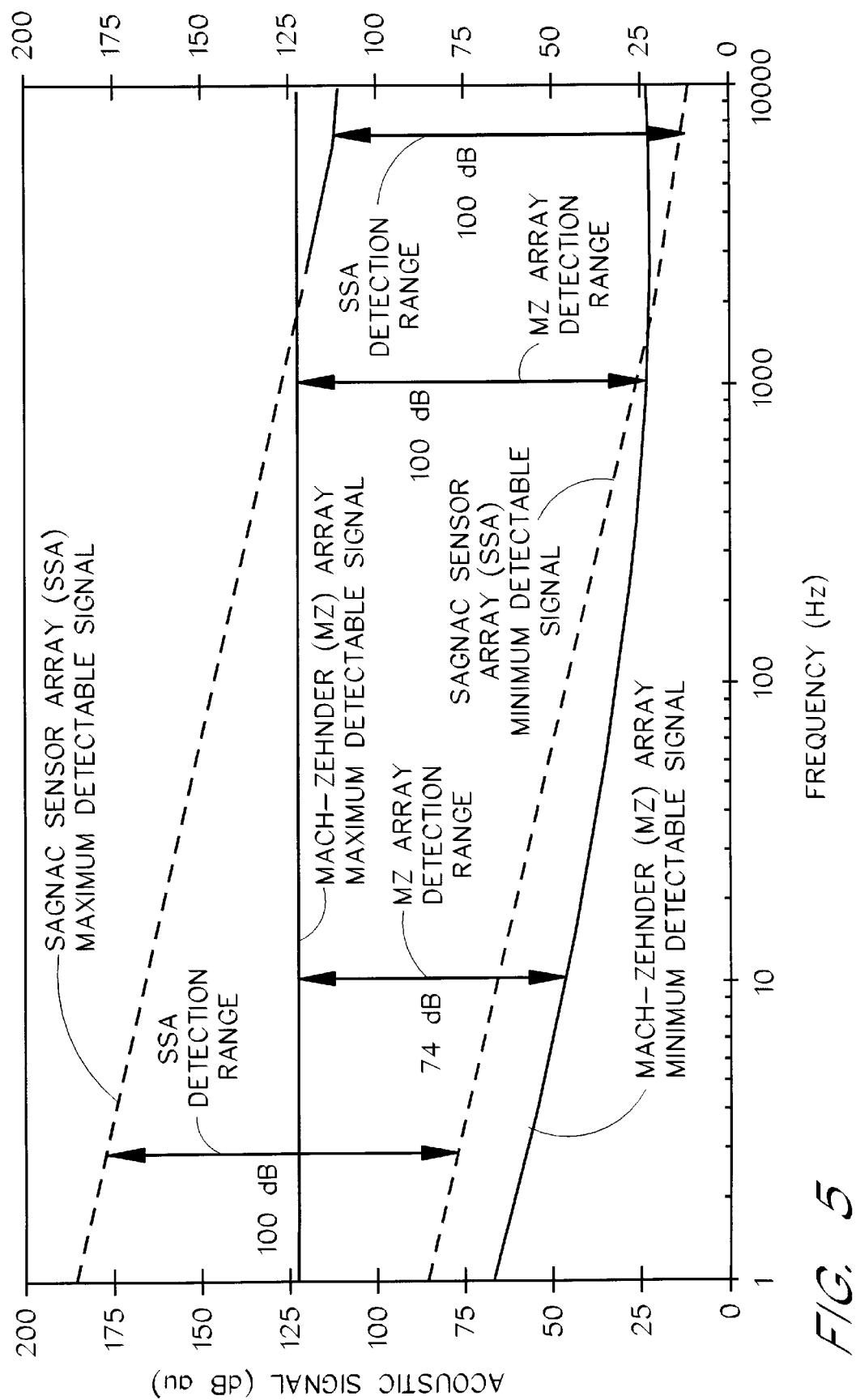
FIG. 5 illustrates graphs of the maximum and minimum acoustic signal detectable by a Mach-Zehnder interferometer and detectable by a Sagnac interferometer in accordance with the present invention, showing the relatively constant dynamic range of a Sagnac interferometer over a wide range of frequencies.

The significance of this difference can be seen by examining the dynamic range of the Mach-Zehnder interferometric sensor array and Sagnac sensor array 200, illustrated in FIG. 5. The dynamic range of a sensor is limited by the minimum and maximum detectable phase shifts. For interferometric sensors, the maximum detectable phase shift is limited by the nonlinear response of the interferometer and the minimum detectable phase shift by the optical noise floor. Both the Mach-Zehnder interferometric sensor array and the Sagnac sensor array have maximum detectable phase shifts which are constant over the acoustic frequency range. However, the Sagnac sensor array 200 also has a flat minimum detectable phase shift because it has a flat optical noise floor, while the Mach-Zehnder interferometric sensor array suffers an increasing minimum detectable phase shift due to an increasing optical noise floor caused by the phase noise introduced by the path imbalanced interferometer. The Sagnac sensor array 200 thus has a constant dynamic range at all acoustic frequencies, while the Mach-Zehnder interferometric sensor array has a decreased dynamic range at low acoustic frequencies. This is illustrated in FIG. 5, wherein the minimum and maximum detectable acoustic signals (in dB arbitrary units) are plotted for the Sagnac sensor array 200 and a Mach-Zehnder interferometric sensor array. As shown in FIG. 5, both arrays have an approximately 100 dB dynamic range above 1 kHz, where phase noise does not limit the Mach-Zehnder interferometric sensor array. At 10 Hz, phase noise dominates the Mach-Zehnder interferometric sensor array, and its dynamic range is reduced to approximately 74 dB. Meanwhile, the dynamic range of the Sagnac sensor array 200 remains at approximately 100 dB.

Figure 6:
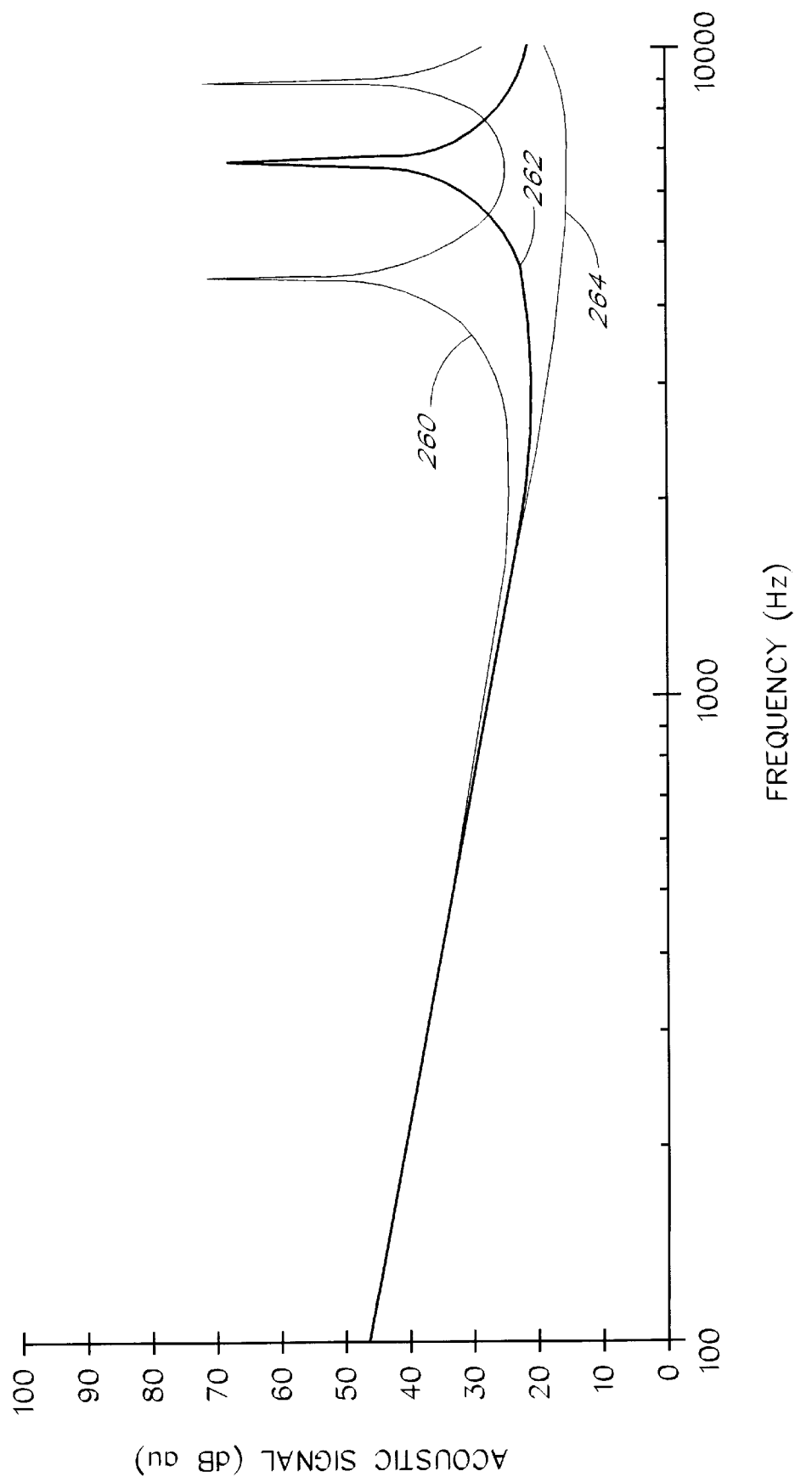
FIG. 6 illustrates graphs of the minimum detectable acoustic signal versus frequency for three Sagnac interferometer configurations having different lengths of fiber in the hydrophone and the delay loop.

It is interesting to examine the frequency response of the Sagnac sensor array 200 at frequencies well below the loop proper frequency as a function of the delay loop length and hydrophone responsibility. At these frequencies, the sin ($\Omega T_{delay}/2$) factor in Equation 1 can be approximated as $\Omega T_{delay}/2$, showing that the responsibility of the Sagnac sensor array 200 is proportional to the product of $\phi_h$ and $T_{delay}$. $\phi_h$ itself is proportional to the amount of fiber in each hydrophone 212(i), and $T_{delay}$ is proportional to the amount of fiber in the delay loop 214. Thus, the responsibility at frequencies well below the loop proper frequency is proportional to the product of the hydrophone fiber length and delay fiber length. FIG. 6 plots the minimum detectable acoustic signal for several Sagnac sensor array configurations in which the product of the length of the fiber in each hydrophone 212(i) and the length of the fiber in the delay loop 214 is constant, but the relative distribution of fiber between the delay loop 214 and each hydrophone 212(i) changes. For example, a curve 260 represents the frequency response of a Sagnac sensor array 200 having 45 km of fiber in its delay loop 214 and 100 meters of fiber in each hydrophone 212(i); a curve 262 represents the frequency response of a Sagnac sensor array 200 having 30 km of fiber in its delay loop 214 and 150 meters of fiber in each hydrophone 212(i); and a curve 264 represents the frequency response of a Sagnac sensor array 200 having 15 km of fiber in its delay loop 214 and 300 meters of fiber in each hydrophone 212(i). As illustrated, each Sagnac sensor array 200 has the same sensitivity at low frequencies, but approaches a maximum sensitivity at different frequencies given by their respective loop proper frequencies. Thus, for a given minimum detectable acoustic signal at low frequencies, there is still some freedom in choosing the fiber lengths of the delay loop 214 and the hydrophones 212(i). This freedom may be used to help the Sagnac sensor array 200 satisfy other criteria, such as minimizing the total amount of fiber required or minimizing the delay loop length.

Increasing the Dynamic Range of the Sagnac Sensor Array

As discussed above, the Sagnac sensor array 200 has a larger dynamic range at low acoustic frequencies than the Mach-Zehnder interferometric sensor array because it is immune to phase noise. Ideally, an array 200 provides enough dynamic range to detect the strongest and weakest acoustic signal which are likely to be encountered. This requirement often translates into a required dynamic range of approximately 150 dB. In order to achieve such a large dynamic range in a Mach-Zehnder interferometric sensor array, two separate sensors with different phase responsibilities are required, with each detecting a fraction of the total 150 dB dynamic range. The obvious disadvantage to this scheme is that it requires two sensor arrays (i.e., twice as many hydrophones, rungs, sources and detectors). Effectively, an array which can support N hydrophones can detect the acoustic signal at only N/2 points.

Figure 7:
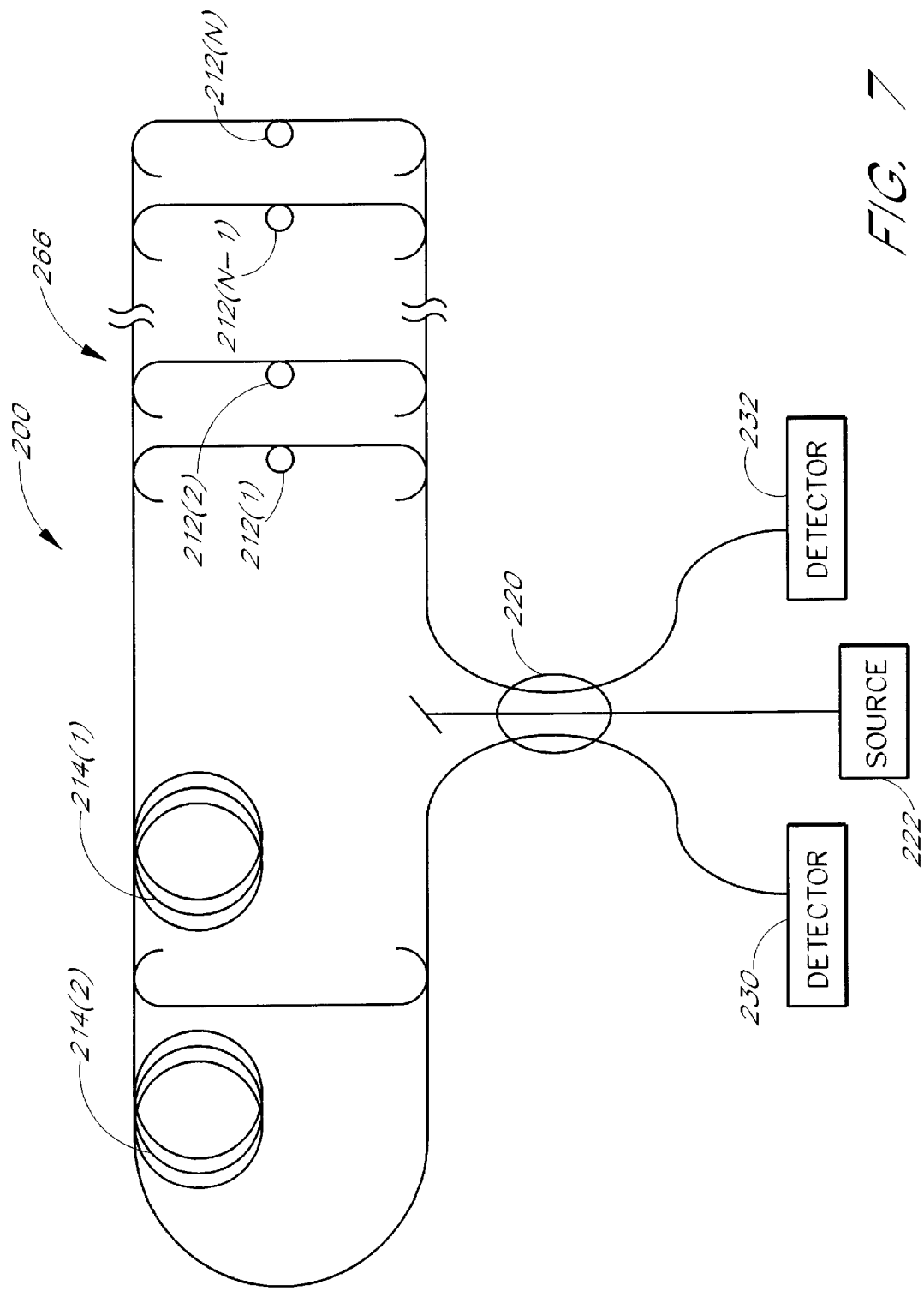
FIG. 7 illustrates a Sagnac interferometer in accordance with the present invention which includes an additional delay loop to increase the dynamic range of the interferometer.

In the Sagnac sensor array 200, it is possible to achieve a large dynamic range without using additional hydrophones 212. Because the phase responsibility in the Sagnac sensor array is a function of the hydrophone responsibility and delay loop length, as shown in Equation 1, the phase responsibility of the entire array of hydrophones can be changed by modifying the delay loop length. By simultaneously using two separate delay loops 214(1) and 214(2) of length $L_1$ and $L_2$, respectively, as shown in a modified sensor array 266 in FIG. 7, the detection range of the array 266 can be dramatically increased. The array 266 now has 2N separate Sagnac loops. Each hydrophone 212(i) returns a separate signal for each of the two delay loop paths, and the length of each delay loop 214(1), 214(2) determines the acoustic detection range of that signal. The total acoustic detection range of each hydrophone 212(i) is the union of the detection ranges of each of the two Sagnac loop sensors which enclose the hydrophone 212(i). The lengths of $L_1$ and $L_2$ set the acoustic detection range. The length $L_1+L_2$ is chosen to allow the array 266 to detect the smallest acoustic signal of interest. The length $L_1$ of the delay loop 214(1) is then chosen to place the detection range of the signals which travel only this shorter delay loop on top of the detection range of the signals which travel both delay loops 214(1), 214(2). In a TDM system, as a result of the insertion of a second loop, the repetition frequency of the source pulses are halved in order to allow time for 2N pulses to return, and the lengths of the delay loops 214(1), 214(2) are chosen such that there is no pulse overlap. Because the repetition frequency is halved, the dynamic range of each individual signal decreases by 3 dB. This decrease is more than offset by the increase in the total dynamic range achieved by piggybacking the dynamic range of two separate signals. In FIG. 7, the second delay loop 214(2) is positioned such that all light passing through the second delay loop 214(2) passes through the first delay loop 212(1). It should be understood that, alternatively, the two delay loops 214(1), 214(2) can be optically in parallel such that the light which passes through the second delay loop 214(2) does not pass through the first delay loop 214(1). In such case, the fiber length of the second delay loop 214(2) would have to be the sum of the first length and the second length (i.e., $L_1+L_2$). But, since $L_1$ is considerably shorter than $L_2$, this adjustment is not essential. The embodiment of FIG. 7 reduces the total fiber requirements by adding the length of the first delay loop to the second delay loop.

Figure 8:
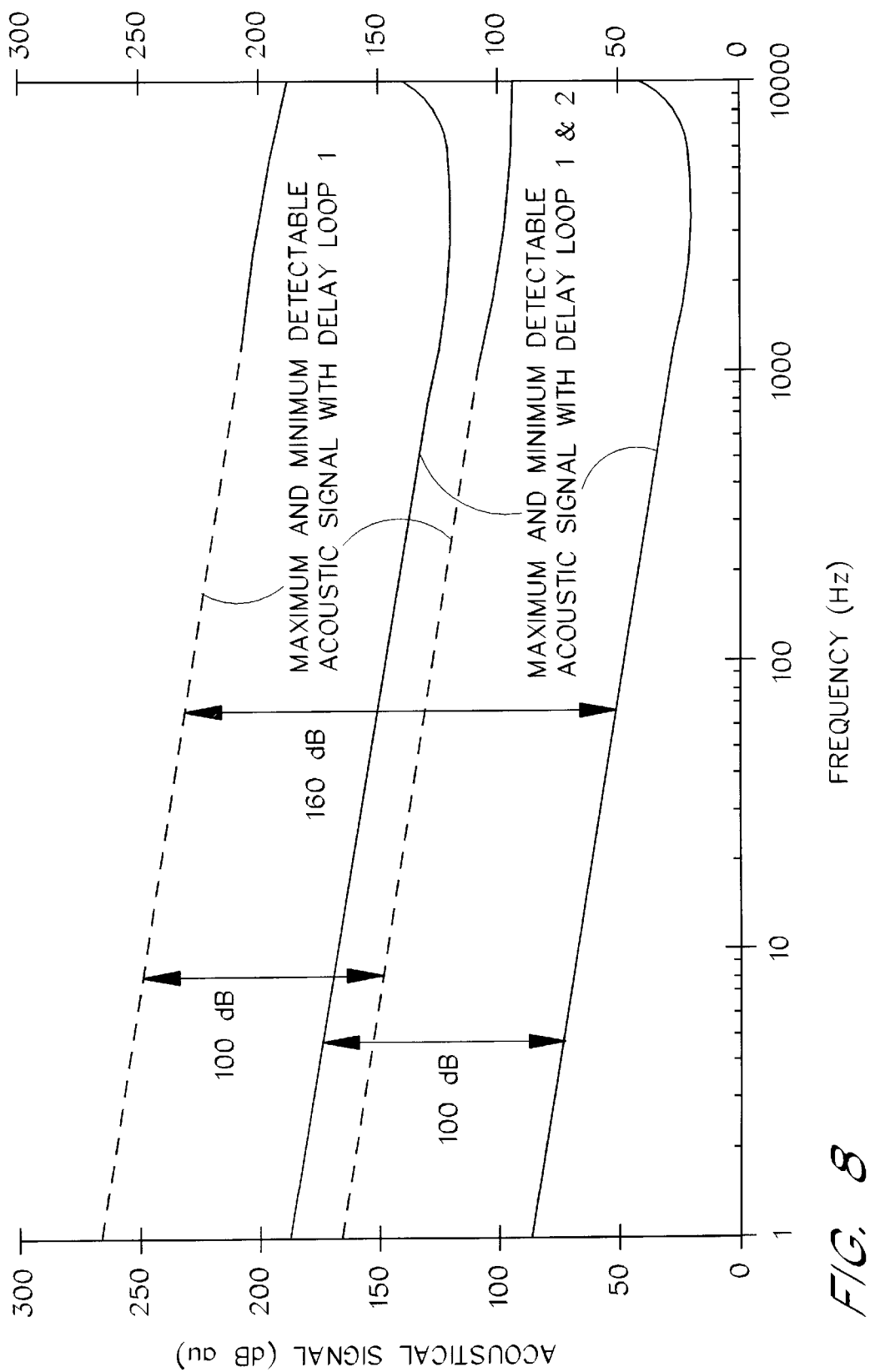
FIG. 8 illustrates a graph of the dynamic range provided by the interferometer of FIG. 7.

FIG. 8 illustrates the extended dynamic range made possible by using the two delay loops 214(1), 214(2) in the array 266 in which the dynamic range of each signal is 100 dB and the ratio L1/L2 was set to be 5000. As shown, the array 266 is now able to detect over the entire dynamic range of interest (approximately a 160-dB range) without increasing the hydrophone count.

Distributed Sensing

In the Sagnac sensor array 266, any phase modulation in the interferometer can be transferred into an intensity modulation at the interfering 3×3 coupler 220. This distributed sensing over the entire Sagnac loop is disadvantageous for an acoustic sensor array. In order to be practical, the acoustic sensor array should sample the acoustic signal at a number of discrete points in space (i.e., at the hydrophones) and return these signals independently. Mach-Zehnder interferometric sensor arrays achieve this because the interferometer is confined within a small space and thus only senses at that point. In order for the Sagnac sensor array 266 to be practical, the distributed sensing of the Sagnac loop must be decreased.

Figure 9:
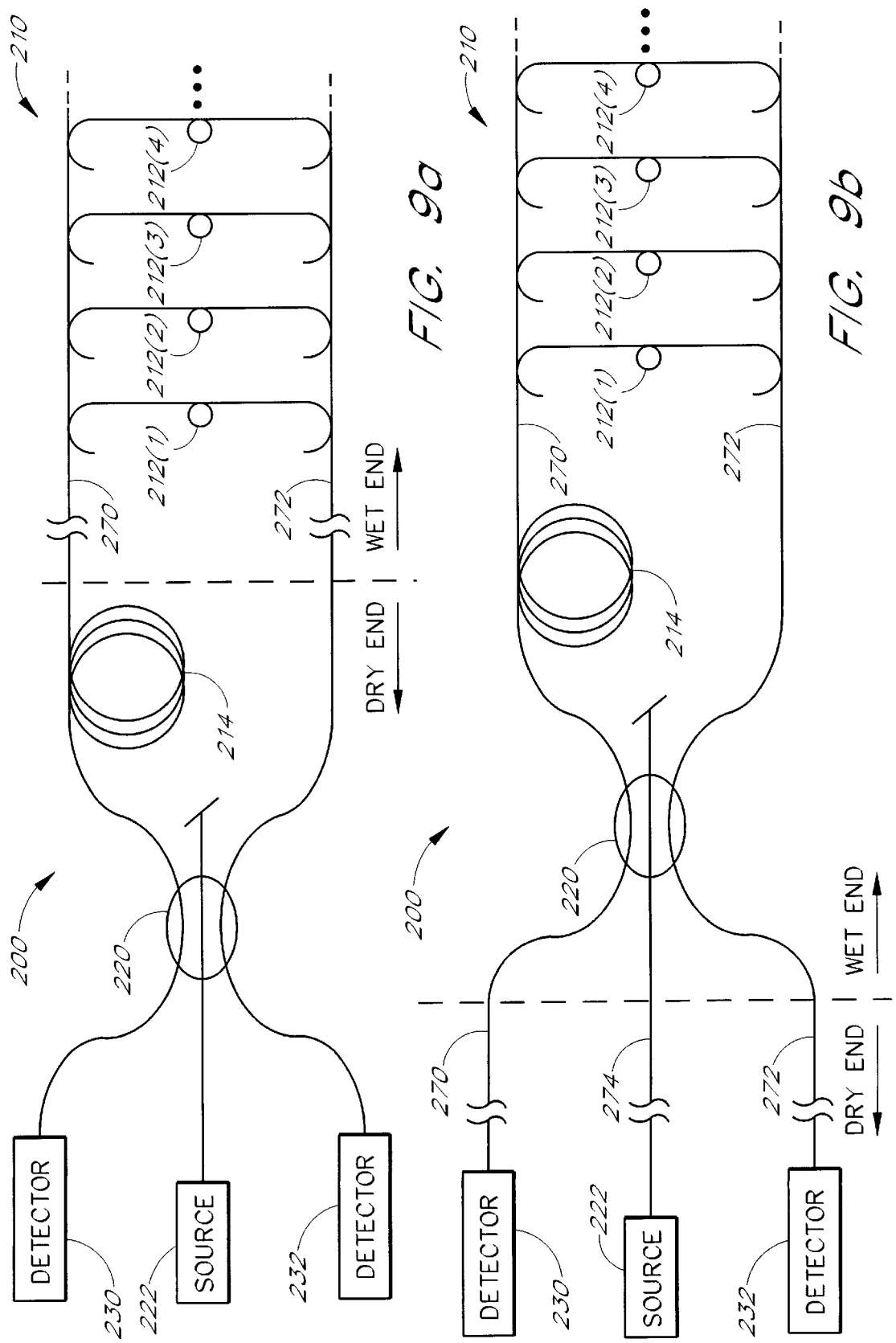
FIG. 9A illustrates the positioning of the delay loop of the interferometer in the dry end of a sensor array system.
FIG. 9B illustrates the positioning of the delay loop of the interferometer in the wet end of a sensor array system.

The bulk of the fiber in the interferometer constitutes the delay loop 214, which can be located in two positions. The first is with the source 222 and the detection electronics (i.e., the detector 230 and the detector 232) in the dry end (i.e., out of the water), as shown in FIG. 9A. Here the delay loop 214 can be environmentally shielded to minimize any external modulation. However, downlead fibers 270, 272 which connect the wet end to the array portion 210 are part of the interferometer. The second possibility is to locate the delay loop 214 in the wet end (i.e., in the water) with the array 210, as shown in FIG. 9B. As such, the delay loop 214 cannot be isolated to the same extent as it could if it were located in the dry end, but the downlead fibers 270, 272, 274 are outside of the interferometer and thus are non-sensing. The relative magnitude of the downlead and delay loop distributed pick-up dictates which configuration is best suited for a particular application. It should be noted that if the delay loop 214 is located in the dry end (FIG. 9A), the downlead fibers 270, 272 must remain stationary to prevent physical movements, such as bending and vibrations, of these fibers, which can induce extremely large phase modulations. These are fiber motion induced phase modulations as opposed to acoustically-induced phase modulations. (Such physical movements are problems in towed arrays, but may not be significant problems in stationary arrays.) Thus, if the delay loop 214 is located in the dry end (FIG. 9A), the entire wet end of the Sagnac sensor array 210 must be stationary. However, with the delay loop 214 located in the wet end (FIG. 9B), only the portion to the right of the 3×3 coupler 220 in FIG. 9B must remain stationary since the downlead fibers 270, 272, 274 are not then part of the interferometer. When the delay loop 214 is located in the wet end (FIG. 9B), the delay loop fiber must be desensitized. The delay loop 214 can be made stationary by wrapping the delay loop fibers around a desensitized cylinder (not shown), thereby eliminating fiber motion and making acoustic pick-up the dominant source of distributed pick-up signal. Because it is easier to desensitize fiber to acoustically-induced phase modulation than it is to desensitize fiber to movement-induced phase modulation, the configuration which locates the delay loop 214 in the wet end (FIG. 9B) is preferable for towed array applications and will be described in more detail below.

Calculation of the Acoustic Pick-up Noise Induced in the Delay Loop

Figure 10:
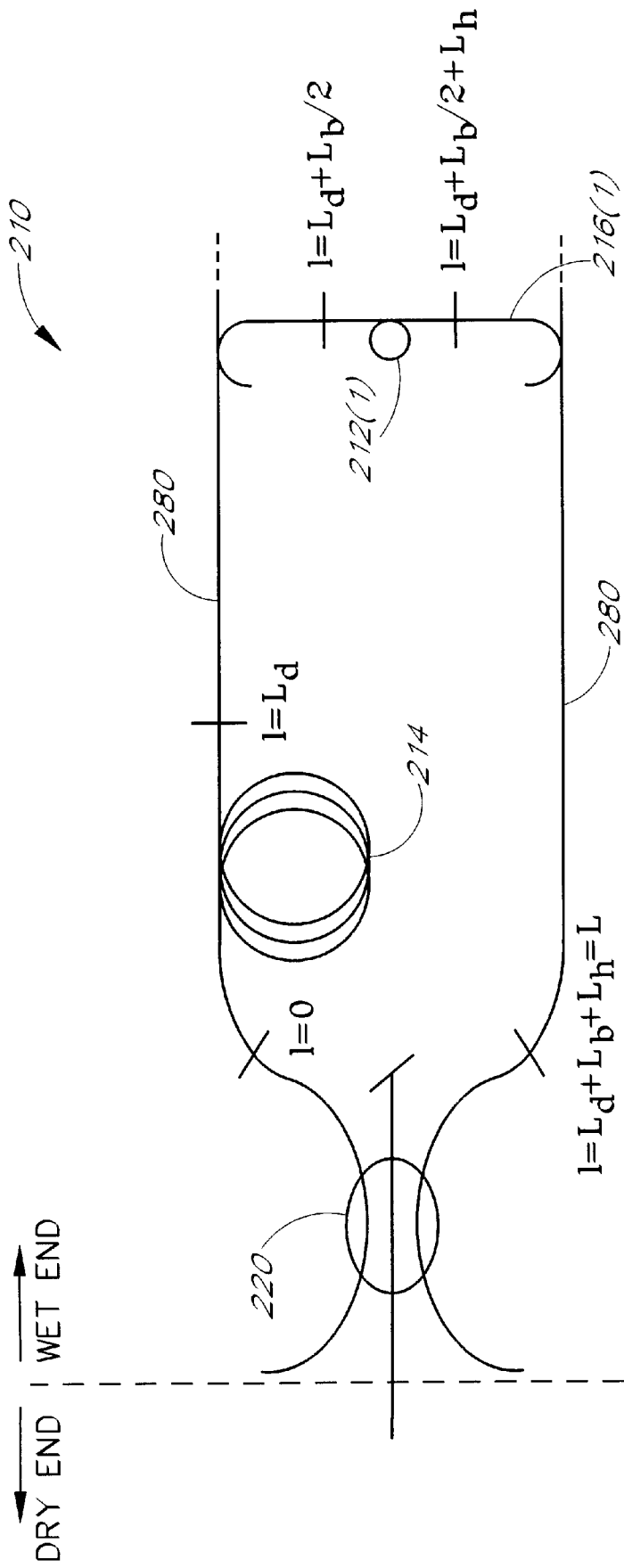
FIG. 10 illustrates the Sagnac interferometer of FIG. 9B with annotations showing the lengths used in calculations of the effects of phase modulation.

In this section, estimates are derived for the magnitude of the acoustically induced distributed pick-up noise as compared to the acoustically induced hydrophone phase modulation in the Sagnac sensor array 210 of FIG. 9(b). The intensity modulation due to the distributed phase modulations resulting from the pick-up of acoustic signals in the delay loop and bus fiber (the fiber connecting each hydrophone to the delay loop and the 3×3 coupler) can be considered a source of noise. For the following discussion, consider one loop of the Sagnac sensor array as comprising only delay fiber of length $L_d$, a bus fiber of length $L_b$, a hydrophone fiber of length $L_h$, and a total length L, as shown in FIG. 10. Also assume that $L_d$ is much larger than $L_b$ and $L_h$. The phase responsibility of fiber to acoustic signals results from a pressure dependent propagation constant, $\beta$. In general, the pressure dependent component of the propagation constant at a position 1 and time t can be written as:

$$\beta(l,t)=\beta_0 R(l) P(l,t) \qquad (2)$$

where $\beta_o$ is the zero-pressure propagation constant, R(l) is the normalized phase responsibility of the fiber, and P(l,t) is the pressure as a function of space and time. If a sinusoidal acoustic signal of frequency $\Omega$ is assumed, Equation 2 can be rewritten as:

$$\beta(l,t)=\beta_0 R(l)[P_0+P_m \sin(\Omega t+\theta(l))] \qquad (3)$$

where $P_0$ is the steady-state pressure, $P_m$ is the amplitude of the pressure modulation (assumed to be independent of l), and $\theta(l)$ contains the spatial phase variation of the acoustic wave. In general, the induced phase difference between interfering beams in a Sagnac loop due to acoustically induced phase modulation from $l=l_1$ to $l=l_2$ is given by the integral:

$$\phi_{int}(t) = \int_{l_1}^{l_2} \left[ \beta\left(l, t+\frac{(l-L)}{v}\right) - \beta\left(l, t-\frac{l}{v}\right) \right] dl \qquad (4)$$

where v is the speed of light in the fiber, and L is the loop length. Substituting Equation 3 into Equation 4 yields:

$$\phi_{int}(t) = \qquad (5)$$
$$\beta_0 P_m \int_{l_1}^{l_2} R(l) \left[ \sin\left(\Omega\left(t+\frac{l-L}{v}\right)+\theta(l)\right) - \sin\left(\Omega\left(t-\frac{l}{v}\right)+\theta(l)\right) \right] dl$$

Equation 5 can be used to determine the phase difference between interfering beams due to acoustic modulation of the hydrophone, bus, and delay fibers.

For the hydrophone fiber, Equation 5 is integrated from $l_1=L_d+L_b/2$ to $l_2=L_d+L_b/2+L_h$. It is assumed that $\theta(l)$ is constant over this range (i.e., that the acoustic wavelength is much larger than the dimension of the hydrophone). It is also assumed that the normalized phase responsivity of the fiber, R(l), is constant and is equal to $R_h$ in this range. Equation 5 then gives a phase difference amplitude between interfering beams due to hydrophone fiber modulation:

$$\phi_{int}^{h} = 2\beta_{0}R_{h}P_{m}L_{h}\sin\left(\frac{\Omega \cdot T_{delay}}{2}\right), \quad (6)$$

where it is assumed that $\Omega L_h/2v \ll 1$. Note that Equation 2 agrees with the expression given in Equation 1.

For the bus fiber, Equation 5 is integrated first from $l_1=l_d$ to $l_2=l_d+l_b/2$, and then from $l_1=L-l_b/2$ to $l_2=L$ to include both the upper and lower bus lines. Again, it is assumed that $R(l)$ is constant and equal to $R_b$ for all bus fiber, such that $\theta(l)$ is constant in the integral of Equation 5. The phase difference amplitude between interfering beams due to fiber modulation becomes:

$$\phi_{int}^{b} = 2\beta_{0}R_{b}P_{m}L_{b}\sin\left(\frac{\Omega \cdot T_{delay}}{2}\right), \quad (7)$$

where it is assumed that $\Omega L_h/2v \ll 1$. It should be emphasized that the assumptions on the constancy of $\theta(l)$ and the amplitude of $\Omega L_h/2v$ act to increase $\phi_{int}^b$, thus giving a worst case scenario for the bus fiber.

For the delay fiber, Equation 5 is integrated from $l_1=0$ to $l_2=l_d$, and, as before, it is assumed that $\theta(l)$ is constant over this range (i.e., the delay loop coil is much smaller than the acoustic wavelength), and that $R(l)$ is constant and equal to $R_d$ over the integral. Equation 5 then yields a phase difference amplitude between interfering beams due to delay fiber modulation given by:

$$\phi_{int}^{d} = 2\beta_{0}R_{d}P_{m}(L-L_{d})\sin\left(\frac{\Omega T_{delay}}{2}\right) = 2\beta_{0}R_{d}(L_{b}+L_{h})\sin\left(\frac{\Omega T_{delay}}{2}\right), \quad (8)$$

where it is assumed that $\Omega(L_b+L_h)/2v \ll 1$.

With Equations 6–8, the relative magnitude of these phase modulations amplitudes can be computed. First, it is noted that a standard plastic coated fiber has a normalized phase responsivity, R, of $-328$ dB re $1/\mu$Pa, as described, for example, in J. A. Bucaro, et al., Optical fibre sensor coatings, *Optical Fiber Sensors, Proceedings of the NATO Advanced Study Institute*, 1986, pp. 321–338. On the other hand, as described, for example, in C. C. Wang, et al., Very high responsivity fiber optic hydrophones for commercial applications, *Proceedings of the SPIE-The International Society for Optical Engineering*, Vol. 2360, 1994, pp. 360–363, a fiber wrapped around current hydrophones made from air-backed mandrels has a normalized phase sensitivity of $-298$ dB re $1/\mu$Pa, an increase of 30 dB over standard fiber. If we assume that the delay loop and the bus fiber have the normalized phase responsivity of standard plastic coated fiber, and that the hydrophone fiber is wrapped around an air-backed mandrel, then the ratio of $R_h$ to $R_b$ or $R_d$ is approximately 30 dB. Therefore, under the simplifying assumption made to reach Equations 6–8, it can be found that:

$$\frac{\phi_{int}^{h}}{\phi_{int}^{d}} \approx \left(\frac{31}{1+(L_b/L_h)}\right) \quad (9)$$

and $$\frac{\phi_{int}^{h}}{\phi_{int}^{b}} \approx \left(\frac{31}{(L_b/L_h)}\right). \quad (10)$$

The ratio $L_b/L_h$ is a function of the hydrophone position. For the first hydrophone, $L_b/L_h \approx 0$ making $\phi_{int}^h/\phi_{int}^d = 31$ and $\phi_{int}^h/\phi_{int}^b$ extremely large. For the last hydrophone, typical values of 100 meters and 1 km for $L_h$ and $L_b$, respectively, are used to arrive at $\phi_{int}^h/\phi_{int}^d \approx \phi_{int}^h/\phi_{int}^b \approx 3$. Thus, despite the fact that the hydrophone fiber constitutes a relatively small amount of the overall Sagnac loop, the magnitude of the acoustically induced phase modulations in the hydrophone fiber are greater than the acoustically induced phase modulations in the delay loop fiber and in the bus fiber for even the furthest hydrophone. The following section describes a means for dealing with this level of distributed pick-up noise using empty rungs.

Figure 11:
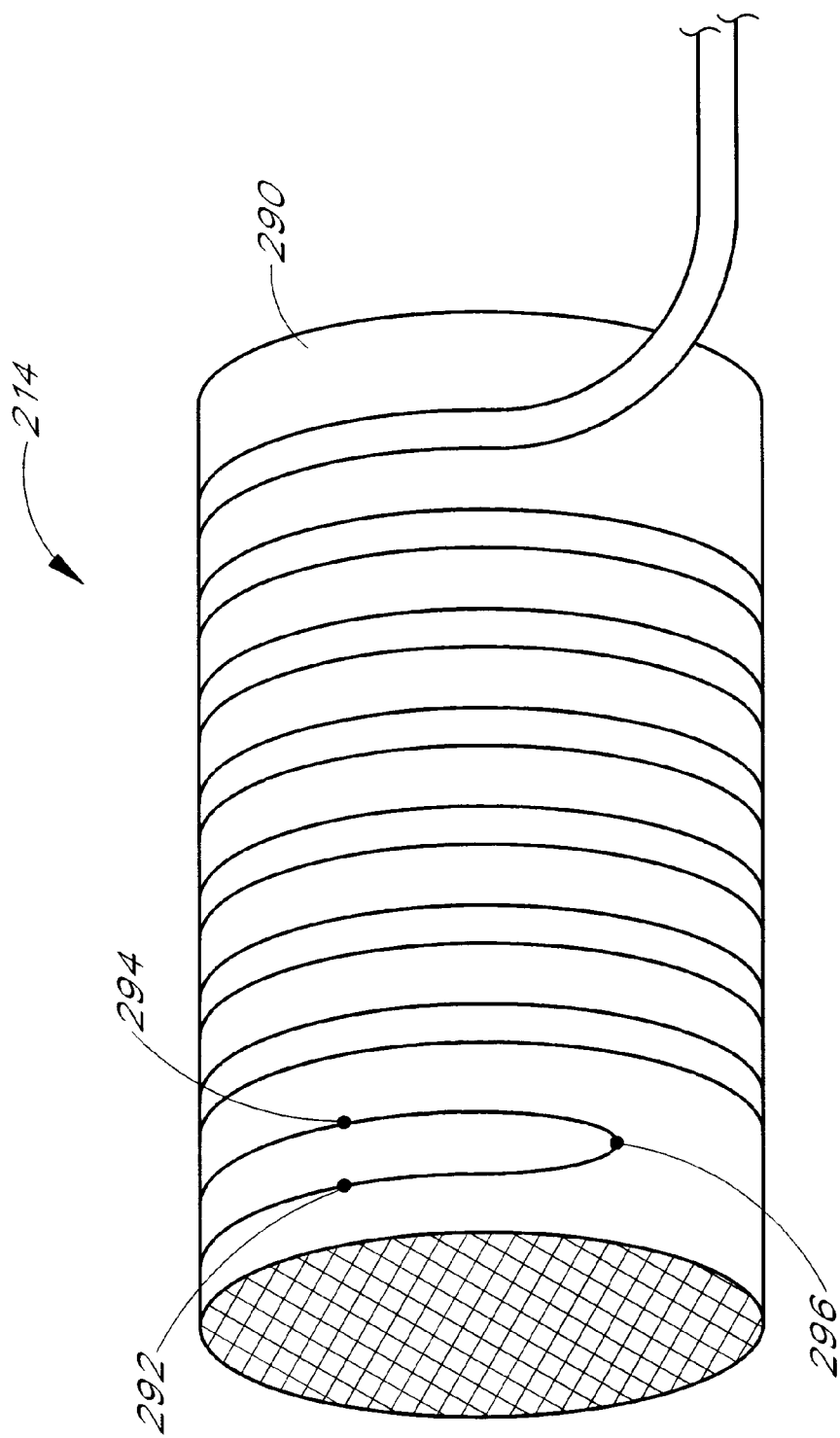
FIG. 11 illustrates a technique for winding the delay loop so as to reduce the effects of the acoustic wave upon the delay loop.

In order to evaluate the integral in Equation 5 for the delay loop fiber, it is assumed that $R(l)=R_d$ for all l less than $L_d$. It was this constancy of $R(l)$ which eliminated any contribution to the integral of Equation 5 from $l=(L-L_d)$ to $L_d$ (because the integrand became an odd function about $L/2$). However, coiling a long length of fiber will result in some dependence in $R(l)$ on l (possibly because the inner layer of fiber has a different R than the outer layer). These variations in $R(l)$ increase the delay loop pick-up from $l=L-L_d$ to $L_d$. In order to reduce this pick-up, it is first noted that $R(l)$ need only be an even function around $L/2$ to make the integrand of Equation 5 an odd function about $L/2$. $R(l)$ can be forced to be more symmetric about $L/2$ by wrapping the delay loop in such a way as to position symmetric points of the fiber loop next to each other as shown in FIG. 11. Such a wrapping ensures that symmetric points of the delay loop are positioned in proximity to each other so that any variations in $R(l)$ due to the position of the fiber on the coil are as symmetric about $L/2$ as possible, thereby making the delay loop pick-up as close to the expression of Equation 8 as possible. Note that, because each Sagnac loop in the Sagnac sensor array has a different $L/2$ point, only one loop can be wrapped exactly as shown in FIG. 11, thereby introducing a small degree of oddness in $R(l)$ to all but one of the Sagnac loops.

It should also be mentioned that in addition to enhancing the acoustic sensitivity of fiber with a hydrophone, it is possible to desensitize fibers by applying a metallic coating of a particular diameter. (See, for example, J. A. Bucaro, Optical fibre sensor coatings, cited above.) Measured normalized phase responsibilities as low as $-366$ dB re $1/\mu$Pa have been reported. If such fibers are used in the delay or bus lines, the ratio of $R_h$ to $R_b$ or the ratio of $R_h$ to $R_d$ approaches 68 dB (instead of 30 dB with plastic coated delay and bus fibers), increasing the hydrophone induced signal over the delay and bus induced signal by 38 dB.

Reducing the Distributed Pick-up Noise by Using Empty Rungs

Figure 12:
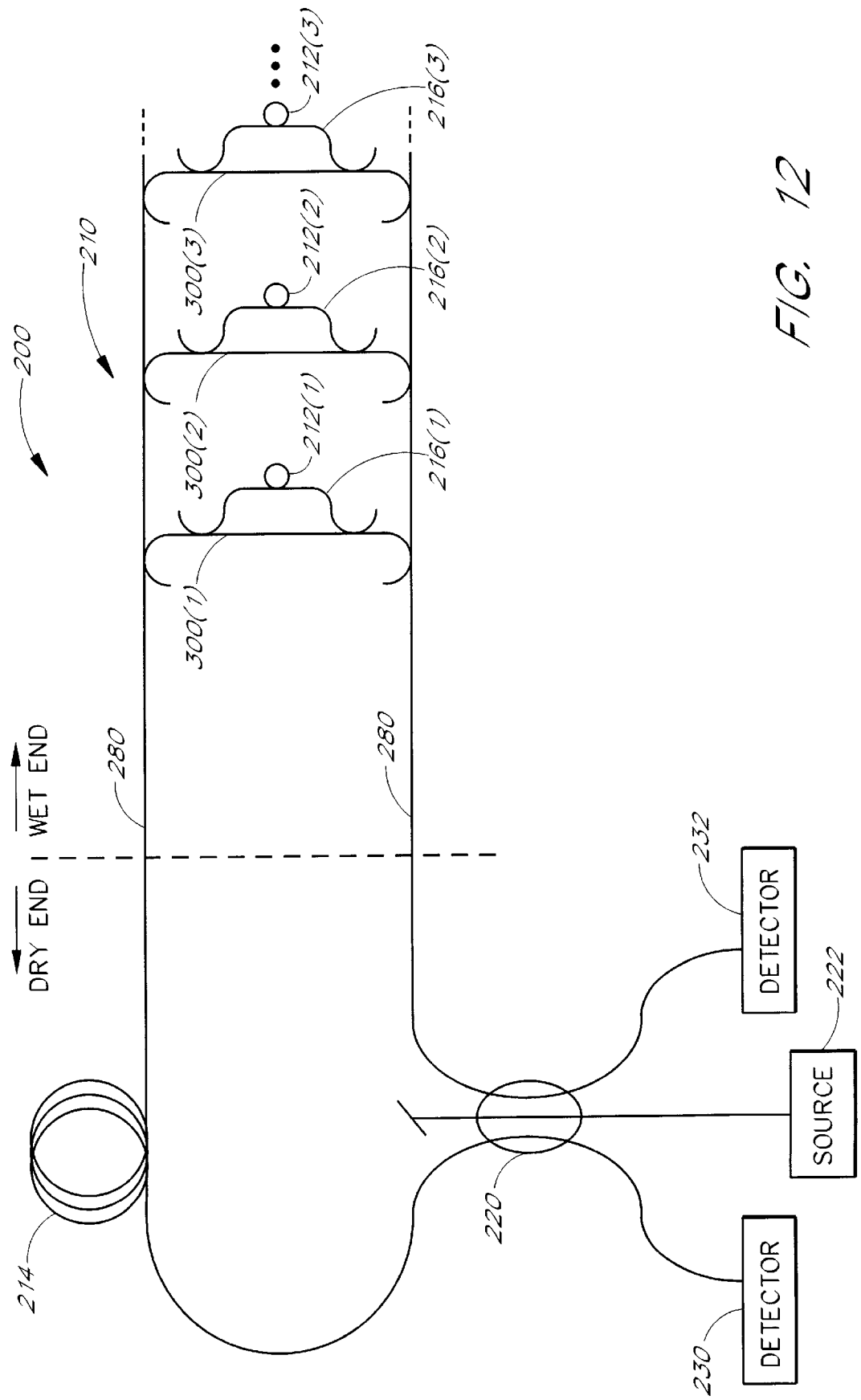
FIG. 12 illustrates a Sagnac interferometer in accordance with the present invention which includes empty rungs which detect distributed pick-up noise which can be subtracted from the signals generated by the sensors.

In order to further eliminate distributed pick-up signal, the hydrophone-induced acoustic modulation can be isolated from the distributed pick-up modulation by placing empty rungs 300 that do not contain a hydrophone in the array 210, as shown in FIG. 12. Each rung 216(i) which contains a hydrophone 212(i), called a sensing rung, is proceeded by one of the empty rungs 300(i). The fact that the non-sensing fiber of each loop which encloses an empty rung 300(i) is nearly identical to the non-sensing fiber of the loop which encloses the corresponding sensing rung 212(i) means the empty rung 300(i) and the corresponding sensing rung 212(i) will have nearly the same distributed pick-up signal. By treating this empty rung 300(i) as another sensor in the array 210 and properly timing the pulses (in the TDM scheme) from the empty rungs 300(i) and the sensing rungs 212(i) so that they do not overlap, the distributed pick-up signal present on each sensing rung 212(i) can be measured. After detection, this signal can be subtracted from the sensing rung signal, leaving only intensity variations produced by phase modulations in the hydrophone fiber. Implementing such a scheme requires 2N rungs for an N sensor array 210, thereby reducing the duty cycle of individual signals by one half.

If desensitizing the bus portion of the array 210 is not required, a single empty rung 300 can be placed in the array 210 to measure the distributed pick-up signal associated with the delay loop 214, thereby requiring only N+1 rungs (N sensing rungs 212(i) and one empty rung 300) for N sensors. If one empty rung 300 does not adequately measure the distributed pick-up signal for each sensing rung 212(i), more empty rungs 300 can be added at periodic intervals along the array, until the distributed pick-up signal present on each sensing rung 212(i) can be adequately measured by the nearest of these empty rungs 300. Using fewer empty rungs results in a higher duty cycle for individual signals. FIG. 12 depicts the extreme in which an empty rung was added for every sensing rung.

Polarization

Figure 13:
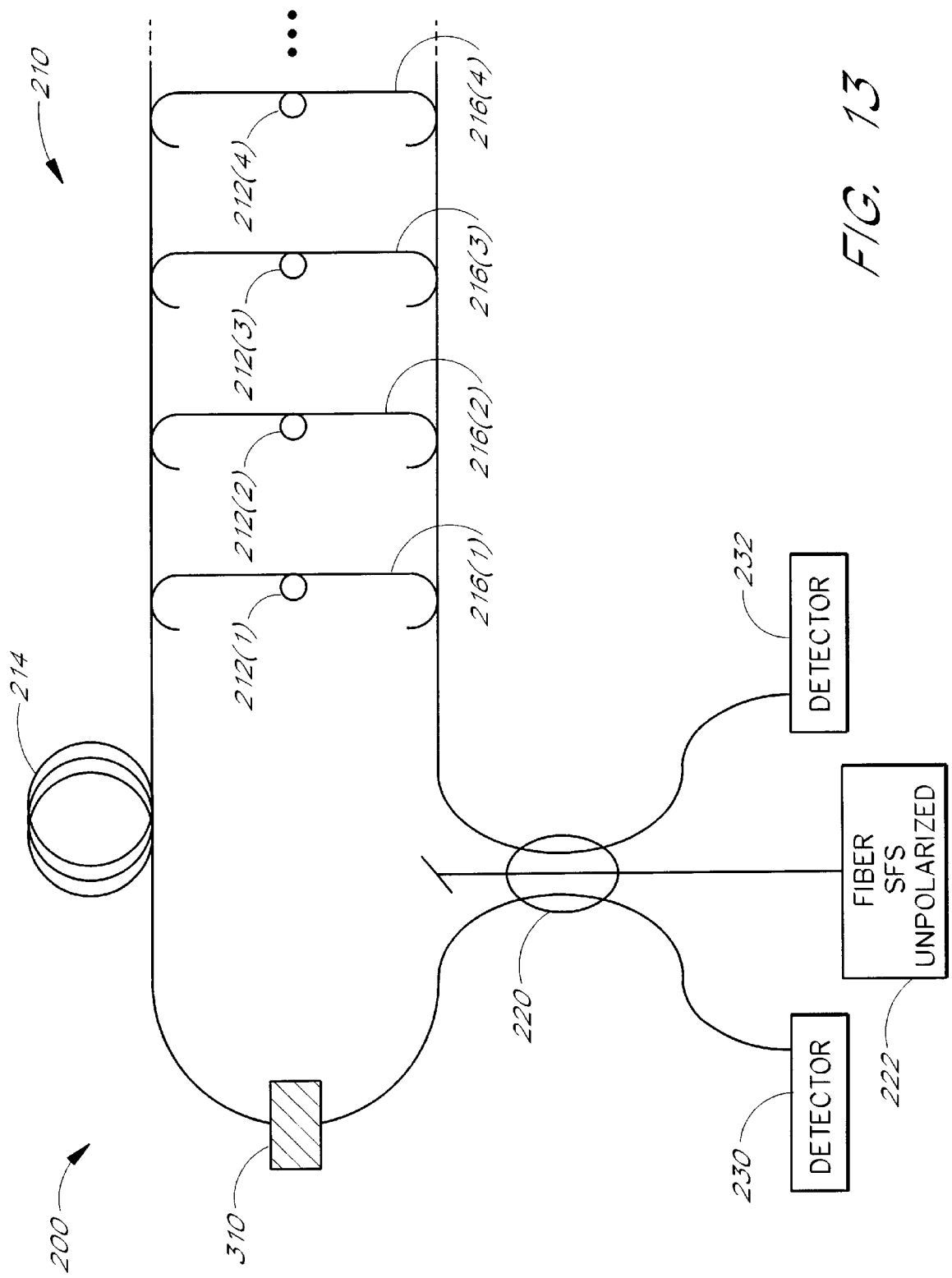
FIG. 13 illustrates a Sagnac interferometer in accordance with the present invention which includes a depolarizer to reduce the effects of polarization induced fading.

For maximum contrast in any interferometric sensor, the state of polarization (SOP) of the interfering beams must be identical when they recombine. If they are orthogonal, there is no interference and thus no amplitude-modulated signal. This is referred to as polarization-induced signal fading. Because each sensor in the Sagnac sensor array is a Sagnac loop, the research carried out so far on polarization-induced signal fading in the Sagnac fiber gyroscope applies to the Sagnac sensor array as well. One promising solution is to place a depolarizer within the Sagnac loop. (See, for example, K. Böhm, et al., LOW-DRIFT FIBRE GYRO USING A SUPERLUMINESCENT DIODE, *ELECTRONICS LETTERS*, Vol. 17, No. 10, May 14, 1981, pp. 352–353.) The depolarizer ensures that at least half of the optical power is returning to the 3×3 coupler in the correct SOP at all times. This general approach produces a constant visibility regardless of the loop birefringence. (See, for example, William K. Burns, et al., Fiber-Optic Gyroscopes with Depolarized Light, *JOURNAL OF LIGHTWAVE TECHNOLOGY*, Vol. 10, No. 7, July 1992, pp. 992–999). The simplest configuration uses an unpolarized source such as a fiber superfluorescence source and a depolarizer in the loop. As illustrated in FIG. 13, in the Sagnac sensor array 200, one depolarizer 310 is placed at a point which is common to all the Sagnac loops. The depolarizer 310 ensures that each sensor 212(i) has this constant visibility independent of birefringence as long as the loop birefringence remains constant. This represents a great simplification in the handling of polarization-induced signal fading over those methods used in Mach-Zehnder interferometric sensor arrays.

Although slow changes in the birefringence will be sufficiently canceled by the reciprocal nature of the Sagnac interferometer, birefringence modulations at frequencies in the acoustic range of interest will produce polarization noise. Most birefringence modulation at these frequencies occurs as a result of physical fiber movement. Thus, the Sagnac loop should remain stationary in order to reduce the polarization noise (as well as the distributed pick-up signal).

Noise Sources Introduced by the use of the Sagnac Interferometer

Thermal Phase Noise

Because the index of refraction of the fiber changes with temperature, thermal fluctuations in a fiber will produce phase fluctuations in the light traveling through it. These index variations are uncorrelated over the length of fiber, and thus the resulting phase fluctuations scale as the square root of length. Because Mach-Zehnder interferometers typically use less than 100 meters of fiber in each arm, the magnitude of this thermal phase noise is negligible. The Sagnac interferometer has a great deal more fiber in the interferometer and as a result, thermal phase noise can become a limiting noise source. The magnitude of this thermal phase noise in a Sagnac interferometer has been described theoretically and confirmed by experiment. (See, for example, Sverre Knudsen, et al., Measurements of Fundamental Thermal Induced Phase Fluctuations in the Fiber of a Sagnac Interferometer, *IEEE Photonics Technology Letters*, Vol. 7, No. 1, 1995, pp. 90–93; and Kjell Kråkenes, et al., Comparison of Fiber-Optic Sagnac and Mach-Zehnder Interferometers with Respect to Thermal Processes in Fiber, *JOURNAL OF LIGHTWAVE TECHNOLOGY*, Vol. 13, No. 4, April 1995, pp. 682–686.). For loops greater than 2 km, the thermal phase noise can exceed 1 $\mu rad/\sqrt{Hz}$ in the frequency range of interest, which is on the order of the required array sensitivity.

The thermal phase noise can be considered as a source of distributed pick-up noise, akin to an external modulation to the delay loop, and as such can be reduced by using empty rungs, as described above. Thermal phase noise can also be reduced by shortening the loop length. As discussed above, the loop length can be shortened without changing the low frequency sensitivity by increasing the hydrophone fiber length by the same factor as that by which the delay loop was decreased. For example a 40-km delay loop with 50 meters of hydrophone fiber has the same low-frequency response as a 20-km delay loop with 100 meters of fiber. The latter combination however will suffer less thermal phase noise because the total delay loop length is shorter by almost a factor of two.

Kerr Effect Induced Phase Noise

Kerr-induced phase shifts which can be generated in a Sagnac interferometer have received a great deal of attention for the fiber optic gyroscope. (See, for example, R. A. Bergh, et al., Source statistics and the Kerr effect in fiber-optic gyroscopes, *OPTICS LETTERS*, Vol. 7, No. 11, November 1982, pp. 563–565; R. A. Bergh, et al., Compensation of the optical Kerr effect in fiber-optic gyroscopes, *OPTICS LETTERS*, Vol. 7, No. 6, June 1982, pp. 282–284; and N. J. Frigo, et al., Optical Kerr effect in fiber gyroscopes: effects of nonmonochromatic sources, *OPTICS LETTERS*, Vol. 8, No. 2, February 1983, pp. 119–121.) The demands of the gyroscope and the acoustic sensor, however, are different because the gyroscope measures DC levels. Small DC offsets created by Kerr-induced phase shifts which would limit a fiber gyroscope are non-issues with an acoustic sensor. The Kerr-induced DC phase shift is not a problem as long as it does not move the bias point too far away from quadrature. The intensity noise on the light source can produce a Kerr induced phase noise on the output. However, the magnitude of this Kerr-induced AC phase noise is small as long as the Kerr-induced DC phase shift remains small. The origin of Kerr-induced phase shifts in the Sagnac sensor array is different than in the fiber gyroscope. The asymmetry of the Sagnac sensor array invites such a Kerr phase shift much more readily than the nominally symmetric gyroscope does. That asymmetry results from the array portion as well as any placement of EDFAs which are asymmetric, in that one beam sees gain before propagating through the delay loop, then sees loss, while the counter-propagating beam sees loss, then sees gain. It is possible to balance these asymmetries and null the Kerr-induced phase shift by choosing the proper location for EDFAs in the delay loop. The specifics depend on the exact array configuration and which multiplexing scheme is used.

Non-linear Phase Modulation Resulting from the EDFAs

The population inversions created in the EDFAs induce a phase shift on the signal light that passes through it. (See, for example, M. J. F. Digonnet, et al., Resonantly Enhanced Nonlinearity in Doped Fibers for Low-Power All-Optical Switching: A Review, *OPTICAL FIBER TECHNOLOGY*, Vol. 3, No. 1, January 1997, pp. 44–64.) This phenomenon has been used to produce all-optical interferometric switches. In a Sagnac sensor array, the EDFAs within the interferometer create a nonlinear phase shift via the same mechanism. Variations in the population inversion due to pump or signal power fluctuations will produce phase modulations which will be converted to an intensity noise.

In order to estimate the magnitude of this noise source, a determination must be first made as to how the inverted population responds to pump and signal power fluctuations. This is relatively straightforward to do by invoking the rate equations for an erbium system:

$$N_1 + N_2 = N_0, \tag{11}$$

$$\frac{d}{dt}N_2 = \frac{I_p \sigma_p^a}{h\nu_p A_{eff}} N_1 + \frac{I_s \sigma_s^a}{h\nu_s A_{eff}} N_1 - \frac{I_p \sigma_p^e}{h\nu_p A_{eff}} N_2 - \frac{I_s \sigma_s^e}{h\nu_s A_{eff}} N_2 - \frac{N_2}{\tau_2}, \tag{12}$$

where $N_1$ and $N_2$ are the population densities of the lower and excited states respectively, $N_0$ is the total population density, $I$ is the intensity, $\sigma$ is the cross section, $A_{eff}$ is the effective mode area in the fiber, and $\tau_2$ is the lifetime of level two. The subscripts p and s denote pump and signal, respectively, and the superscripts a and e denote absorption and emission, respectively.

By splitting $N_1$, $N_2$, $I_p$, and $I_s$ into their steady-state and time-varying components, then substituting this into Equation 12 and combining Equation 12 with Equation 11, the result is:

$$\frac{d}{dt}N_2(t) = \left[\frac{N_0 \sigma_p^a + N_2^{ss}(\sigma_p^e + \sigma_p^a)}{h\nu_p}\right] I_p(t) + \tag{13}$$

$$\left[\frac{N_0 \sigma_s^a + N_2^{ss}(\sigma_s^e + \sigma_s^a)}{h\nu_s}\right] I_s(t) +$$

$$\left[\frac{I_p^{ss}(\sigma_p^e + \sigma_p^a)}{h\nu_p} + \frac{I_s^{ss}(\sigma_s^e + \sigma_s^a)}{h\nu_s} + \frac{1}{\tau_2}\right] N_2(t) -$$

$$\left[\frac{(\sigma_p^e + \sigma_p^a)}{h\nu_p}\right] I_p(t) N_2(t) - \left[\frac{(\sigma_s^e + \sigma_s^a)}{h\nu_s}\right] I_s(t) N_2(t),$$

where the superscript ss denotes steady-state values, and the time-varying components are now written as explicit functions of time ($N_2 = N_2^{ss} + N_2(t)$). If it is assumed that $N_2(t)$ is much smaller than $N_2^{ss}$, then the last two terms in Equation 13 can be neglected. By writing $I_p(t) = I_p^m \sin(f_p t)$ and $I_s(t) = I_s^m \sin(f_s t)$ (where $I_p^m$ and $I_s^m$ denote the modulation amplitudes of $I_p(t)$ and $I_s(t)$, respectively, and $f_p$ and $f_s$ respectively denote the pump and signal modulation frequencies) and solving the resulting differential equations, it can be found that:

$$\frac{|N_2(f_p)|}{N_2^{ss}} \approx \tag{14}$$

$$\left(\frac{\sigma_s^a(\sigma_p^e + \sigma_p^a) - \sigma_p^a(\sigma_s^e + \sigma_s^a)}{(\sigma_p^e + \sigma_p^a)^2} \cdot \frac{\nu_p}{\nu_s}\right) \left(\frac{1}{\sqrt{1 + f_p^2/f_o^2}}\right) \cdot \frac{I_s^{ss} I_p^m}{I_p^{ss2}}$$

-continued $$\frac{|N_2(f_s)|}{N_2^{ss}} \approx \left(\frac{\sigma_s^a}{\sigma_p^a} - \frac{\sigma_s^e + \sigma_s^a}{\sigma_p^e + \sigma_p^a}\right) \cdot \frac{\nu_p}{\nu_s} \cdot \left(\frac{1}{\sqrt{1 + f_p^2/f_o^2}}\right) \cdot \frac{I_s^m}{I_p^{ss}} \tag{15}$$

where:

$$f_o = \frac{\sigma_p^e + \sigma_p^a}{h\nu_p} I_p^{ss} + \frac{\sigma_s^e + \sigma_s^a}{h\nu_s} I_s^{ss} + \frac{1}{\tau_2} \approx \frac{\sigma_p^e + \sigma_p^a}{h\nu_p} I_p^{ss} \text{ when} \tag{16}$$

$$I_p^{ss} \gg I_s^{ss}.$$

If it is assumed that $\lambda_p = 1480$ nm, $\lambda_s = 1550$ nm, and $I_p^{ss} = 1$ W, and if typical erbium-silica cross sections are assumed, then Equations 14 and 15 simplify to:

$$\frac{|N_2(f_p)|}{N_2^{ss}} \approx \left(\frac{0.9}{\sqrt{1 + f_p^2/4.3 \text{kHz}}}\right) \cdot \frac{I_s^{ss} I_p^m}{I_p^{ss2}} \tag{17}$$

$$\frac{|N_2(f_s)|}{N_2^{ss}} \approx \left(\frac{1.2}{\sqrt{1 + f_s^2/4.3 \text{kHz}}}\right) \cdot \frac{I_s^m}{I_p^{ss}}. \tag{18}$$

The pump-induced population inversion fluctuations (Equation 17) will be analyzed first. If $I_s^{ss} = 1$ mW, $I_p^{ss} = 1$ W, and it is assumed that $I_p^m/I_p^{ss} = 10^{-6}/\sqrt{\text{Hz}}$ (120 dB/$\sqrt{\text{Hz}}$ electronic SNR), then $|N_2(f_p)|/N_2^{ss} = 9 \times 10^{-10}$ $\sqrt{\text{Hz}}^{-1}$ at frequencies well below 4.3 kHz. In order to convert this figure to a phase modulation, the fact that 10 mW of pump power absorbed in an erbium-doped fiber induces approximately 7 radians of phase shift at 1550 nm can be used. (See, for example, M. J. F. Digonnet, et al., Resonantly Enhanced Nonlinearity in Doped Fibers for Low-Power All-Optical Switching: A Review, *OPTICAL FIBER TECHNOLOGY*, Vol. 3, No. 1, January 1997, pp. 44–64.) Using simulations, 10 mW of absorbed pump power in a typical erbium-doped fiber provides approximately 6 dB of small signal gain at 1550 nm, which is close to the gain required by each amplifier in an array with distributed EDFAs. (See, for example, Craig W. Hodgson, et al., Optimization of Large-Scale Fiber Sensor Arrays Incorporating Multiple Optical Amplifiers-Part I: Signal-to-Noise Ratio; Craig W. Hodgson, et al., Optimization of Large-Scale Fiber Sensor Arrays Incorporating Multiple Optical Amplifiers-Part II: Pump Power; Jefferson L. Wagener; et al., Novel Fiber Sensor Arrays Using Erbium-Doped Fiber Amplifiers; and C. W. Hodgson, et al., Large-scale interferometric fiber sensor arrays with multiple optical amplifiers, cited above.) Therefore, each amplifier provides approximately 7 radians of DC phase shift. Since the nonlinear phase shift is proportional to the upper state population, $N_2$, it can be written that $\Delta N_2/N_2^{ss} = \Delta\phi/\phi^{ss}$. Using this relation and Equation 17 again for $I_s^{ss} = 1$ mW, $I_p^{ss} = 1$ W, $I_p^m/I_p^{ss} = 10^{-6}/\sqrt{\text{Hz}}$ and $f_s \ll 4.3$ kHz, the low-frequency phase noise induced by each EDFA is (7 radians)$\times (9 \times 10^{-10})$ $\sqrt{\text{Hz}}^{-1} = 6.3 \times 10^{-9}$ rad/$\sqrt{\text{Hz}}$. If it is assumed that there are a total of 500 such amplifiers and that the phase modulations from all 500 amplifiers add coherently, the total pump noise induced phase shift can be estimated to be 3.2 $\mu$rad/$\sqrt{\text{Hz}}$. The target phase noise floor is typically set to 1 $\mu$rad/$\sqrt{\text{Hz}}$, indicating that the nonlinear phase-noise induced by the EDFAs due to pump power fluctuations is close to but not significantly larger than the required phase noise floor. In practice, the amplifiers' phase modulations will not add coherently, which will reduce the 3.2 $\mu$rad/$\sqrt{\text{Hz}}$ figure.

Calculations of the induced phase shift due to signal power fluctuations are more complicated because the signal power not only has intensity noise but is also modulated by the multiplexing scheme. Again considering the TDM case, in general, while a given pulse is traveling through a particular EDFA, there may or may not be a counterpropagating propagating pulse traveling through that EDFA at the same time. Taking the worst case in which there is always a counter-propagating pulse, $I_s^m$ is twice the intensity noise of each individual pulse. For the amplifiers, $I_s^m$ is typically 1.5 to 2 times the intensity noise of each individual pulse. Assuming the signal light has an electronic SNR of 120 dB/$\sqrt{Hz}$ at acoustic frequencies (i.e., $I_s^m/I_s^{ss}=10^{-6}/\sqrt{Hz}$), and inserting this figure into Equation 18 along with $I_p^{ss}=1$ W and $I_s^m=2$ mW, it can be calculated that $|N_2(f_s)|/N_2^{ss}$ is approximately $2.4 \times 10^{-9}$ $\sqrt{Hz}^{-1}$ at frequencies much lower than 4.3 kHz and that the phase noise induced by signal intensity noise in each EDFA is thus $1.68 \times 10^{-8}$ rad/$\sqrt{Hz}$. Again assuming 500 amplifiers and coherent addition of all EDFA-induced phase modulation, the total EDFA induced phase noise on each pulse is 8.4 $\mu$rad/$\sqrt{Hz}$, a level which could again limit the performance of the Sagnac sensor array. However, a more detailed study taking into account the multiplexing scheme and exact timing of the array is needed for a more accurate calculation.

Multiplexing Schemes in a Sagnac array

Time-Division Multiplexing

It has been assumed thus far that the Sagnac sensor array is operated in a TDM configuration. It should be noted that, in the Sagnac sensor array, the source requirements for such a TDM system are not as demanding as those of a Mach-Zehnder interferometric sensor array in a TDM configuration. The reason for this is the use of the broadband source in the Sagnac sensor array. In the Mach-Zehnder interferometric sensor array, the light from adjacent rungs is coherent due to the narrow linewidth source, and thus extremely high extinction ratios on the input pulse are required to prevent multi-path coherent interference. These high extinction ratio requirements are achieved by placing multiple modulators in series, which results in a complicated, high loss, and expensive source. In the Sagnac sensor array, the required extinction ratio need not be as high because the broadband source eliminates any possibility of multi-path coherent interference. In addition, the narrow linewidths required by the Mach-Zehnder interferometric sensor array prevent the use of a pulsed laser source in place of a continuous wave (cw) laser source which is externally modulated with Lithium Niobate intensity modulators. In the Sagnac sensor array, either a continuous-wave ASE source which is externally modulated, a pulsed ASE source, or some combination thereof could be used to construct the source. Again, the reason for this is that the Sagnac sensor array does not require a narrow linewidth source. Although the present invention does not require a narrow linewidth source, it should be understood that the Sagnac sensor array of the present invention can be used with a narrow linewidth source, such as, for example, a laser.

Frequency Division Multiplexing

Figure 14:
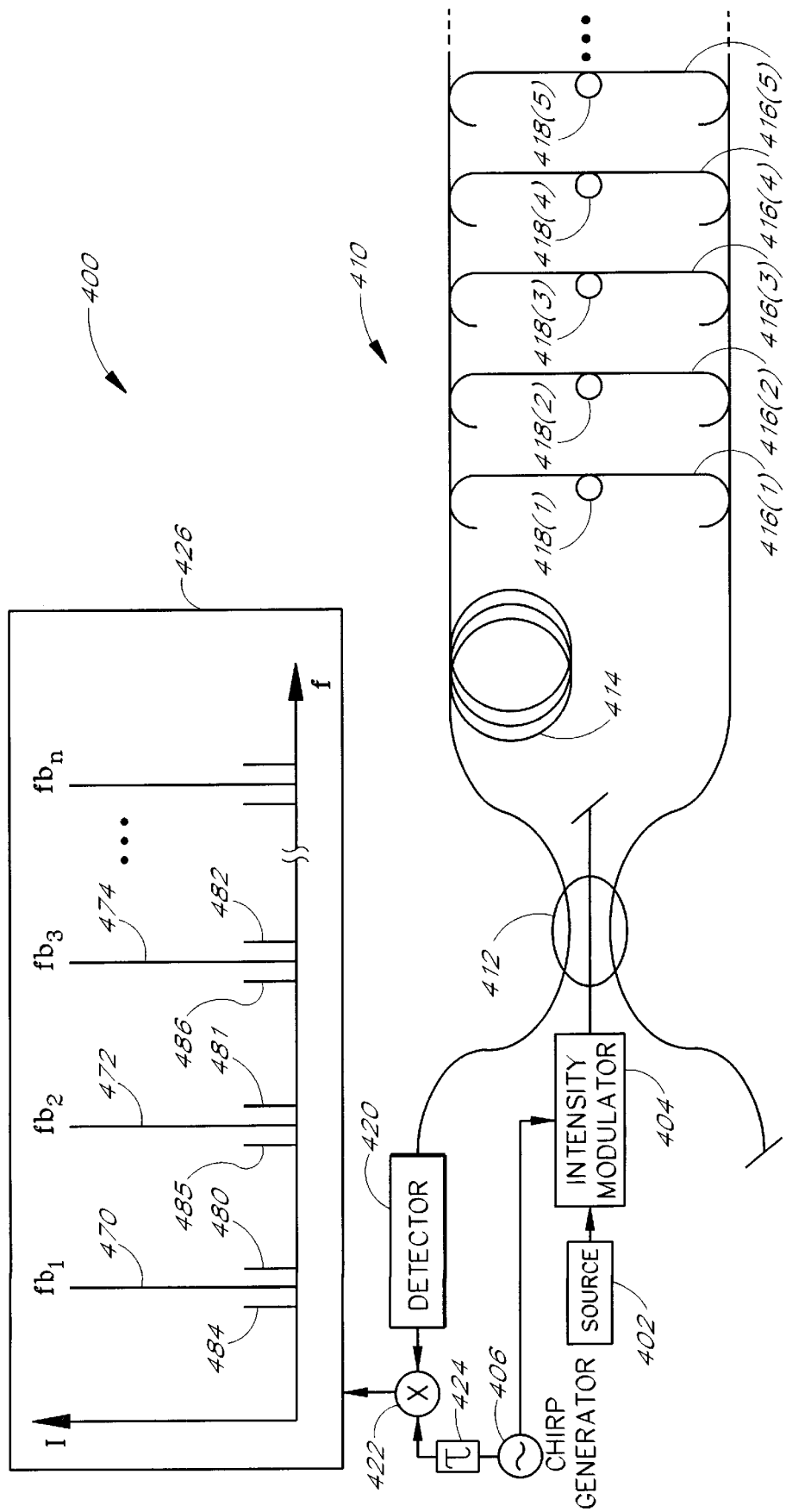
FIG. 14 illustrates a Sagnac interferometer which utilizes frequency divisional multiplexing.

The use of the broadband source also allows the Sagnac sensor array to operate in non-TDM configurations without changing the design or requiring additional sources. Frequency division multiplexing (FDM) is commonly used with Mach-Zehnder interferometric sensor arrays using the Phase-Generated Carrier (PGC) scheme but is also compatible with the Sagnac sensor array. FIG. 14 shows a basic Sagnac sensor array 400 using a FDM scheme. A fiber superfluorescent source (SFS) 402 (or other broadband source, such as, for example, an LED) generates input light. A chirped intensity modulation is applied to the input light via an intensity modulator 404 which is controlled by a chirped frequency generator 406. The modulated light enters a sensor array 410 via a 3×3 coupler 412. The light passes through a delay loop 414 and plural sensing rungs 416($i$) having respective sensors 418($i$). Empty rungs (not shown) can also be included if desired. After passing through the delay loop 414 and the rungs 416($i$), the light exits from the sensor array 410 through the coupler 412 and is detected by a detector 420 which generates an electrical output signal responsive to the detected light. The electrical output signal from the detector 420 is mixed in a mixer 422 with the same chirped frequency which has been time delayed by a delay 424 which delays the chirped frequency by a time $\Delta t$. In the setup illustrated in FIG. 14, the output of the mixer 422 is applied to a spectrum analyzer 426. In an operational embodiment, the output of the mixer 422 is applied to a signal processing subsystem (not shown) which analyzes the output of the mixer 422 to reproduce the acoustic signals impinging on the array 410.

Figure 15:
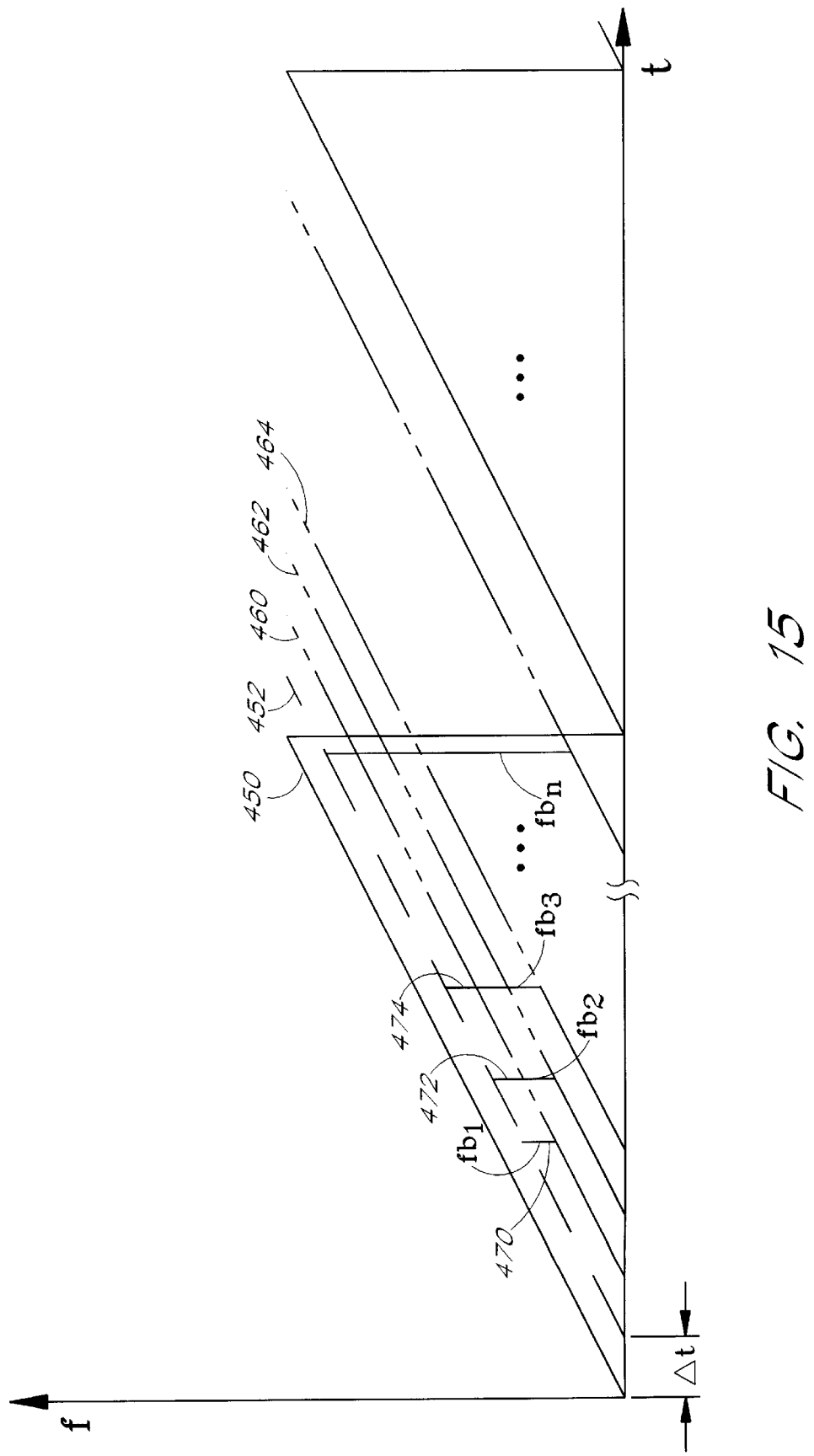
FIG. 15 illustrates a graph which shows the generation of the beat signals between the delayed modulation signal and the returning sensor signals in the interferometer of FIG. 14.

The signals returning from the sensors 418($i$) in the various rungs 416($i$) are further delayed with respect to the delayed chirp frequency. This is illustrated by the graphs in FIG. 15 by the original chirped frequency 450, the delayed chirped frequency 452 from the delay 424, the chirped return signal 460 from the first rung, the chirped return signal 462 from the second rung and the chirped return signal 464 from the third rung. In the mixer 422, separate beat frequencies $f_{b_1}$ 470, $f_{b_2}$ 472, $f_{b_3}$ 474, respectively (shown in FIG. 14), are formed between the mixing chirped frequency 452 and each of the signals returning from the various rungs in the Sagnac sensor array 410. (See, for example, S. F. Collins, et al., A Multiplexing Scheme For Optical Fibre Interferometric Sensors Using An FMCW Generated Carrier, *OFS '92 Conference Proceedings*, pp. 209–211.) Although only three chirped return signals 460, 462, 464 are illustrated in FIG. 15, it is contemplated that up to N return signals can be provided, where N is the number of rungs in the array 410. The chirped return signals from the Nth rung causes a beat frequency $f_{bN}$ in the mixer 422.

As illustrated by a pictorial representation of a spectral output in FIG. 14, acoustic modulation of the signals will appear as upper sidebands 480, 481, 482 and lower sidebands 484, 485, 486 to the beat frequencies. An advantage of this FDM scheme is that the demands on the array timing are greatly relaxed over those required in a TDM system. A TDM system requires a specific delay between adjacent rungs in order to prevent pulses from overlapping, and this can present a demanding engineering problem. In FDM, variations in fiber lengths shift beat frequencies but do not induce overlap between signals as long as these beat frequencies are separated by twice the acoustic detection range. The latter is accomplished by selecting the proper chirp rate. Unlike in a TDM system, all paths return light at all times, which can result in phase noise between the different incoherent signals. The broadband ASE light source minimizes the magnitude of this phase noise. (See, for example, Moslehi, Analysis of Optical Phase Noise in Fiber-Optic Systems Employing a Laser Source with Arbitrary Coherence Time, *Journal of Lightwave Technology*, Vol. LT-4, No. 9, September 1986, pp. 1334–1351.)

Code Division Multiplexing

Figure 16:
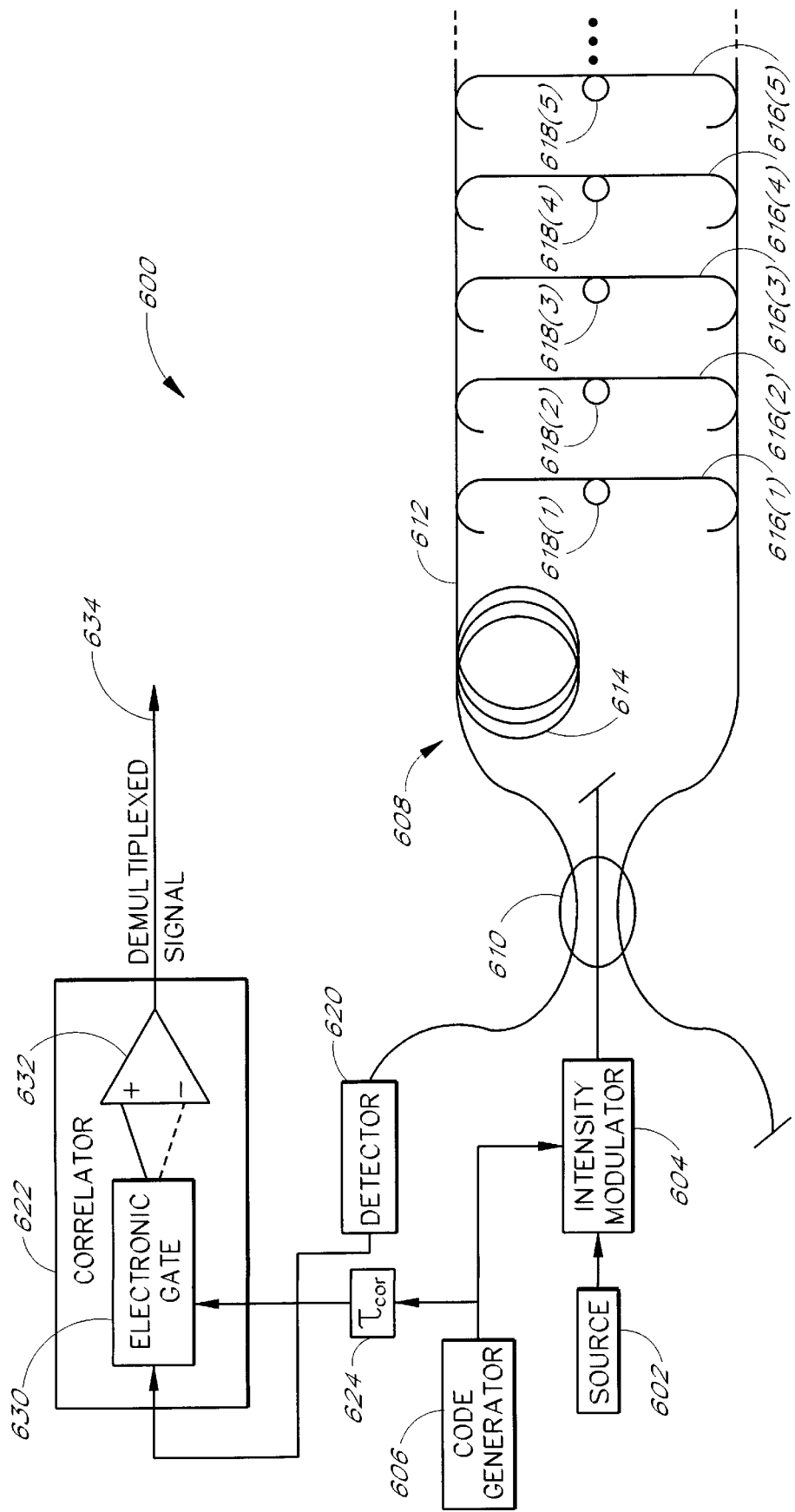
FIG. 16 illustrates a Sagnac interferometer which utilizes code division multiplexing.

Code division multiplexing (CDM) has received increased attention lately for its use in sensor arrays. (See, for example, A. D. Kersey, et al., Code-division Multiplexed Interferometric Array With Phase Noise Reduction And Low Crosstalk, *OFS '92 Conference Proceedings*, pp. 266–269; and H. S. Al-Raweshidy, et al., Spread spectrum technique for passive multiplexing of interferometric optical fibre sensors, *SPIE*, Vol. 1314 Fibre Optics '90, pp. 342–347.) As illustrated for a Sagnac sensor array 600 in FIG. 16, in CDM, the input light from a fiber superfluorescent source 602 (or other broadband source, such as, for example, an LED) is modulated in an intensity modulator 604 according to a pseudo-random code generated by a code generator 606. The modulated light is applied to an interferometric loop 608 via a 3×3 coupler 610 and propagates through a delay loop 614 and a plurality of rungs 616($i$) in an array 612. In the illustrated embodiment, each rung 616($i$) includes a respective sensor 618($i$). Empty rungs (not shown) can also be included if desired. The light returns from the loop via the 3×3 coupler 610 and is detected by a detector 620. The electrical output of the detector 620 is applied to a correlator 622 along with the output of the code generator 606, which output is delayed for a duration $\tau_{Cor}$ by a delay 624. The bit duration of the pseudo-random code is shorter than the propagation delay between adjacent rungs in the array 612. When $\tau_{cor}$ is equal to one of the loop travel times $\tau_i$, through a respective rung 616($i$), then the signal returning from this sensor in the rung 616($i$) is correlated to the delayed pseudo-random code. The other signals, which have delays $\tau_j$ where $|\tau_j - \tau_i| > \tau_{bit}$ correlate to zero. The correlation process involves, for example, multiplying the detected signal by 1 or –1 (or gating the signal in an electronic gate 630 to the non-inverting and inverting inputs of a differential amplifier 632) depending on whether the correlating code is on or off. The output of the differential amplifier on a line 634 is the correlated output. The signal is then time averaged over a period tavg equal to the duration of the code. The uncorrelated signals time average to zero, thereby isolating the signal from sensor 618($i$). $\tau_{cor}$ is scanned to retrieve sequentially the signals from all sensors.

An advantage of CDM over TDM is that the delay between sensors does not have to be controlled accurately. Any loop delays $\tau_j$ in which $|\tau_j - \tau_j + 1| > \tau_{bit}$ is acceptable (where $\tau_{bit}$ is the duration of a pulse in the code). Correlating requires a knowledge of the $\tau_j$'s, which are easily measured. As with FDM, the use of a broadband source benefits reducing the phase noise which results from the addition of all the signals together.

The foregoing described a novel design for an acoustic sensor array based on the Sagnac interferometer. The major advantages of this design are the use of common-path interferometers. This eliminates the conversion of source phase noise into intensity noise, which is prevalent in Mach-Zehnder interferometric sensors, and allows the use of a cheap, high-power ASE source or other broadband source. The response of the Sagnac sensor array as a function of acoustic frequency is shown to match the ocean noise floor. The design also allows the dynamic range to be dramatically increased without adding hydrophones by using one additional, very short delay loop. A technique for eliminating polarization-induced signal fading was discussed above. The Sagnac sensor array also allows the use of several multiplexing schemes in a simpler form than is achievable with a standard Mach-Zehnder array. Because of these features, the Sagnac sensor array design provides a very promising alternative to Mach-Zehnder-interferometer-based sensor arrays.

Folded Sagnac Sensor Array

Figure 17:
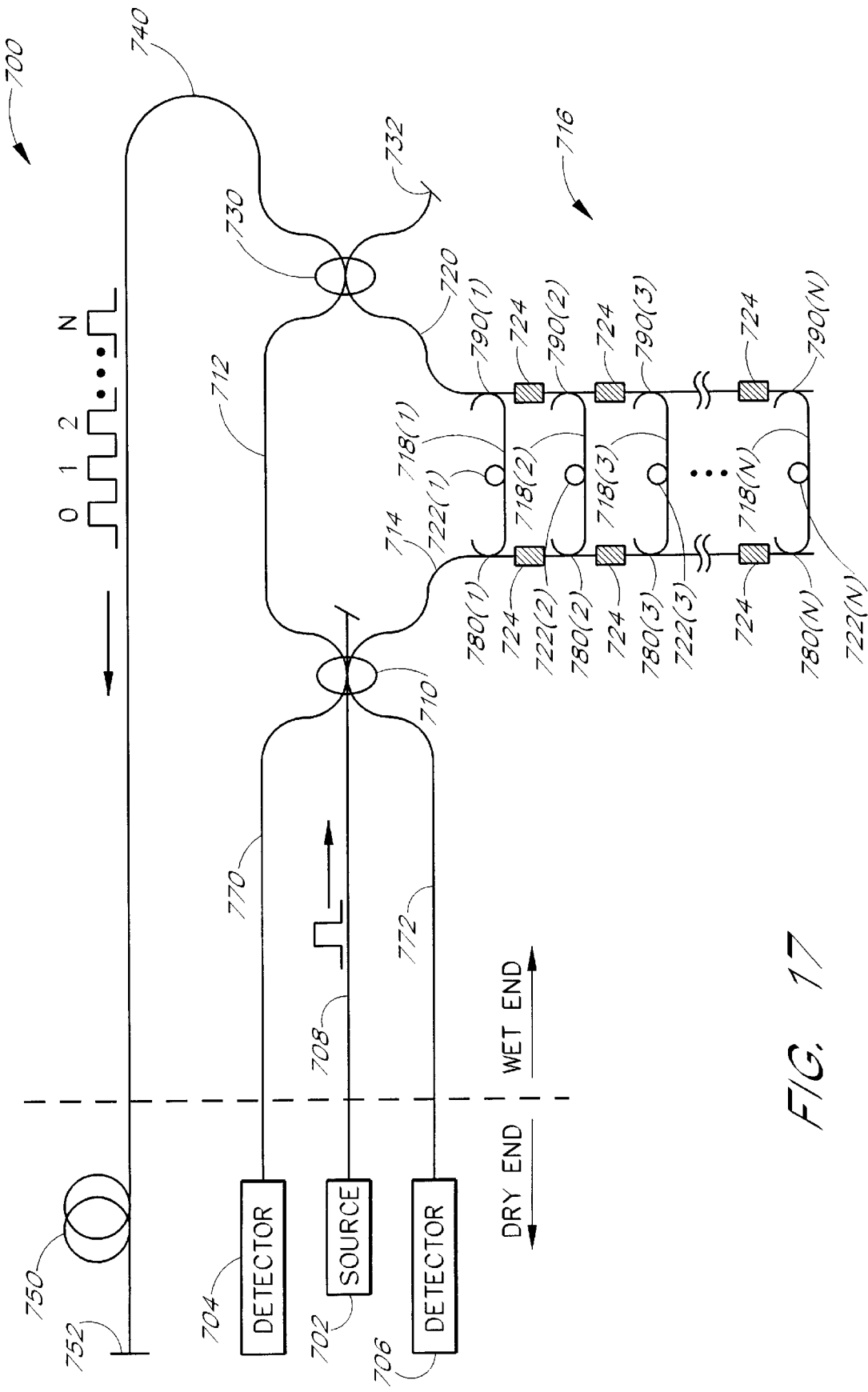
FIG. 17 illustrates the architecture of a folded Sagnac acoustic fiber sensor array.

FIGS. 17–20 illustrate alternative embodiments of a distributed acoustic sensor array based upon the Sagnac effect which has an architecture modified to reduce the distributed pick-up from the downlead fibers. In particular, FIG. 17 illustrates a basic folded Sagnac acoustic fiber sensor array 700 which comprises a source 702, a first detector 704 and a second detector 706. Preferably, the source 702, the first detector 704 and the second detector 706 are located in the dry end of the sensor array 700 (e.g., on shore or on board a ship).

The source 702 generates light pulses which are coupled to a 3×3 coupler 710 via a downlead fiber 708. As illustrated, the 3×3 coupler is located in the wet end (e.g., proximate to the ocean floor). The 3×3 coupler 710 has a first output port coupled to one end of a common fiber rung (rung 0) 712, has a second output port coupled to a first array input/output fiber 714 of an array 716, and has a third output port which is non-reflectively terminated. Approximately 33 percent of the light from the source 702 is coupled to each of the first and second ports of the 3×3 coupler and thus approximately 33 percent of the light propagates to the common fiber rung 712 and approximately 33 percent of the light propagates to the array 716. As discussed above, although described herein as a 3×3 coupler 710, other n×m couplers (e.g., a 2×2 coupler, a 4×4 coupler, etc.) can be used with the embodiment of FIG. 17 and the alternative embodiments of the present invention described below.

The array 716 comprises a plurality of rungs 718($i$) (i.e., 718(1), 718(2) ... 718(N)) coupled between the first array input/output fiber 714 and a second array input/output fiber 720. Each rung 718($i$) includes a respective acoustic sensor (i.e., hydrophone) 722($i$). The array 716 advantageously includes distributed erbium doped fiber amplifiers (EDFAs) 724, such as described above in connection with FIG. 3. (The pump source for the EDFAs 724 is not shown in FIG. 17.) Other array configurations can also advantageously be used.

The second array input/output fiber 720 couples the array 716 to a first port of a 2×2 coupler 730. A second end of the common rung (rung 0) 712 is coupled to a second port of the 2×2 coupler 730. Although described herein as an array 716 comprising plural sensors 722($i$), it should be understood that the present invention has applications for a sensor system having only a single sensor 722.

A third port of the 2×2 coupler 730 is nonreflectively terminated at a terminal 732. A fourth port of the 2×2 coupler 730 is coupled to a delay loop downlead fiber 740. The delay loop downlead fiber 740 couples the fourth port of the 2×2 coupler to a first end of a delay loop 750. The delay loop 750 may be located either in the dry end as shown or in the wet end. A second end of the delay loop 750 is coupled to a reflector 752 such that light exiting the second end of the delay loop 750 is reflected back into the delay loop 750, propagates through the delay loop 750 and propagates through the delay loop downlead fiber 740 back to the fourth port of the 2×2 coupler 730. The light returned from the loop downlead fiber 740 is divided by the 2×2 coupler 730 with substantially equal portions propagating in the common rung 712 and in the array 716 with both portions propagating toward the 3×3 coupler 710. The two portions are combined in the 3×3 coupler 710 where light pulses which have traveled the same distance through the array 716 and through the common rung 712 interfere and light pulses which have traveled different distances do not interfere. The signals resulting from the interference are output from the 3×3 coupler 710 as first and second output signals which respectively propagate to the first detector 704 via a first detector downlead fiber 770 and propagate to the second detector 706 via a second detector downlead fiber 772. The detectors 704, 706 generate electrical output signals which are analyzed by electronics (not shown) in a conventional manner to reproduce the acoustic signals impinging on the sensors 722(*i*). As discussed below, the signals which interfere within the 3×3 coupler 710 return from each sensor 722(*i*) at different times, and can therefore be separated by time division multiplexing, frequency multiplexing, code division multiplexing, or the like, as discussed above. The non-interfering signals do not generate detectable output signals and are ignored.

The embodiment of FIG. 17 can be further modified by inserting a depolarizer (not shown) in one of the fiber segments 712, 714 or 720 in conjunction with an unpolarized source, as described above in connection with the Sagnac interferometer. Such embodiments will be described below in connection with FIGS. 23A, 23B and 23C.

The light in a single pulse from the source 702 will now be traced through the sensor array 700. A source pulse from the source 702 is launched and travels down the source downlead 708 and through the 3×3 coupler 710 to the common rung 712 and to the array 716. Together, the common rung 712 and the N rungs 718(*i*) in the array 716 provide N+1 separate paths for the source pulses to travel to the 2×2 coupler 730. Because there are N+1 separate paths for the source pulse to travel, the source pulse is split into N+1 separate pulses which pass through the 2×2 coupler 730 and travel down the delay loop downlead 740 to the delay loop 750. After passing through the delay loop 750, the N+1 pulses are reflected by the reflector 752 and then propagate back through the delay loop 750, down the delay loop downlead 740 to the 2×2 coupler 730 in the wet end, still as N+1 separate pulses. Each of the N+1 pulses is again split into N+1 pulses in the common rung 712 and the N rungs 718(*i*). After passing back through the common rung 712 and the rungs 718(*i*), the (N+1)$^2$ pulses are combined in the 3×3 coupler 710 and then return down the detector downleads 770, 772 back to the dry end where the pulses are detected by the first and second detectors 704, 706 and analyzed.

Because there are (N+1)$^2$ possible separate combinations of paths from the source 702 to the reflector 752 and back to the detectors 704, 706, there are (N+1)$^2$ returned pulses. The only pulses that will interfere in a useable manner are pairs of pulses which travel the same exact path length but in opposite order. For the purposes of the following discussion, a pulse will be identified by two numbers where the first number identifies the path taken by the pulse from the source 702 to the reflector 752, and the second number identifies the path taken by the pulse from the reflector 752 back to the detectors 704, 706. For example, the pulse 0,1 travels through the common rung (rung 0) 712, then through the delay loop 750, to the reflector 752, back through the delay loop 750, and then through rung 718(1). The pulse 1,0 travels first through the rung 718(1), then through the delay loop 750, to the reflector 752, back through the delay loop 750, and then through the common rung (rung 0) 712. Because the distance traveled by the pulse 0,1 is identical with the distance traveled by the pulse 1,0, the pulse 0,1 and the pulse 1,0 interfere when combined at the 3×3 coupler 710 and therefore define a common-path interferometer (i.e., a folded Sagnac interferometer) in the same manner as the Sagnac interferometers described above. Acoustic sensing results from the hydrophone 722(1) which is placed in rung 1 which responds to acoustic modulation. The interfering pulses 0,1 and 1,0 see the hydrophone 722(1) at different times and thus pick-up a phase difference due to the time varying acoustic modulation of the hydrophone 722(1). At the 3×3 coupler 710, this phase difference is converted into an intensity modulation which is transmitted down the detector downleads 770, 772 to the detectors 704, 706. The same effect occurs for the pulses 0,2 and 2,0, for the pulses 0,3 and 3,0, etc.

Because the folded Sagnac interferometer is common-path, the source 702 can have a short coherence length, which means that interference will only occur between pulses which have traveled nearly identical paths. Therefore, pulse i,j will interfere with pulse j,i only. As stated above, there are N interferometers of interest (pulse 0,i interfering with pulse i,0 for i=1 to N). There are also the many other interferometers which do not include the common rung (rung 0) 712 (e.g., pulse 1,2 interfering with pulse 2,1, pulse 1,3 interfering with pulse 3,1, etc.). Such interfering pulses contribute noise to the useful pulses, and shall be referred to herein as noise pulses. These noise pulses carry two types of noise. As with all pulses, they carry additional shot noise, ASE-signal beat noise (in an amplified array), phase noise, etc., which increase the detected noise. The noise pulses which form an unwanted interferometer (pulse 1,2 interfering with pulse 2,1, etc.) also carry intensity modulation due to interferometric sensing of acoustic waves. This intensity modulation is an unwanted signal and can be viewed as a source of noise. It is important to note that these unwanted interferometers have as their interfering point couplers 280(1) through 280(N) where the rungs 218(1) through 218(N) couple to the first input/output fiber 714 of the array 716, whereas the signal pulses interfere at the 3×3 coupler 710. Because the noise pulses interfere before they reach the 3×3 coupler 710 coupler, the intensity modulation of the noise pulses is provided symmetrically to both detectors 704 and 706. The signal pulses which interfere at the 3×3 coupler 710 however produce an asymmetric intensity modulation. Therefore, by differentially amplifying the currents from the detectors 704, 706, the intensity modulation of the signal pulses adds and the intensity modulation of the noise pulses subtracts, thus reducing the noise contribution of the unwanted interferometers.

To completely eliminate all the noise added by these noise pules, the pulses of interest can be separated from the noise pulses by using a time division multiplexing scheme and properly choosing delay lengths. In particular, the optical path length from the 3×3 coupler 710 through the common rung 712 to the 2×2 coupler 730 is selected to correspond to a propagation time τ. The optical path length of a fiber portion from the 3×3 coupler to the coupler 780(1), through the first rung 718(1), to a corresponding coupler 790(1) and to the 2×2 coupler 730 is selected to be (N+1)τ. A portion of the optical path length is a common path from the 3×3 coupler 710 to the coupler 780(1) and from the coupler 790(1) to the 2×2 coupler 730, and a portion of the optical path length is through the rung 718(1). The optical path lengths through each of the rungs 718(*i*) are preferably selected to be approximately equal. The total length of the optical path from the coupler 780(1) to the coupler 780(2) and the optical path from a coupler 790(2) to the coupler 790(1) is selected to be τ such the total optical path length from the 3×3 coupler 710 to the 2×2 coupler 730 through the second rung 718(2) is τ longer than the total optical path length from the 3×3 coupler 710 to the 2×2 coupler 730 through the first rung 718(1) (i.e., the total optical path length between the two couplers 710, 730 through the second rung 718(2) is (N+2)τ). The total additional optical path length for each successive is selected to be τ. Thus, the travel time of light from the 3×3 coupler 710 through a rung 718(*i*) to the 2×2 coupler 730 is defined as the delay time $T_i$ of the rung 718(*i*). In accordance with the foregoing description, $T_i$ is determined by the optical path lengths through the rungs as follows:

$T_i = \tau i = 0$ (for the common rung 712)

$T_i = (N+i)\tau$  $1 \leq i \leq N$ (for each of the sensing rungs 718(1), 718(2), etc.

From the foregoing, it can be seen that the optical path length through the farthest rung N is $(N+N)\tau$ or $2N\tau$.

Figure 18:
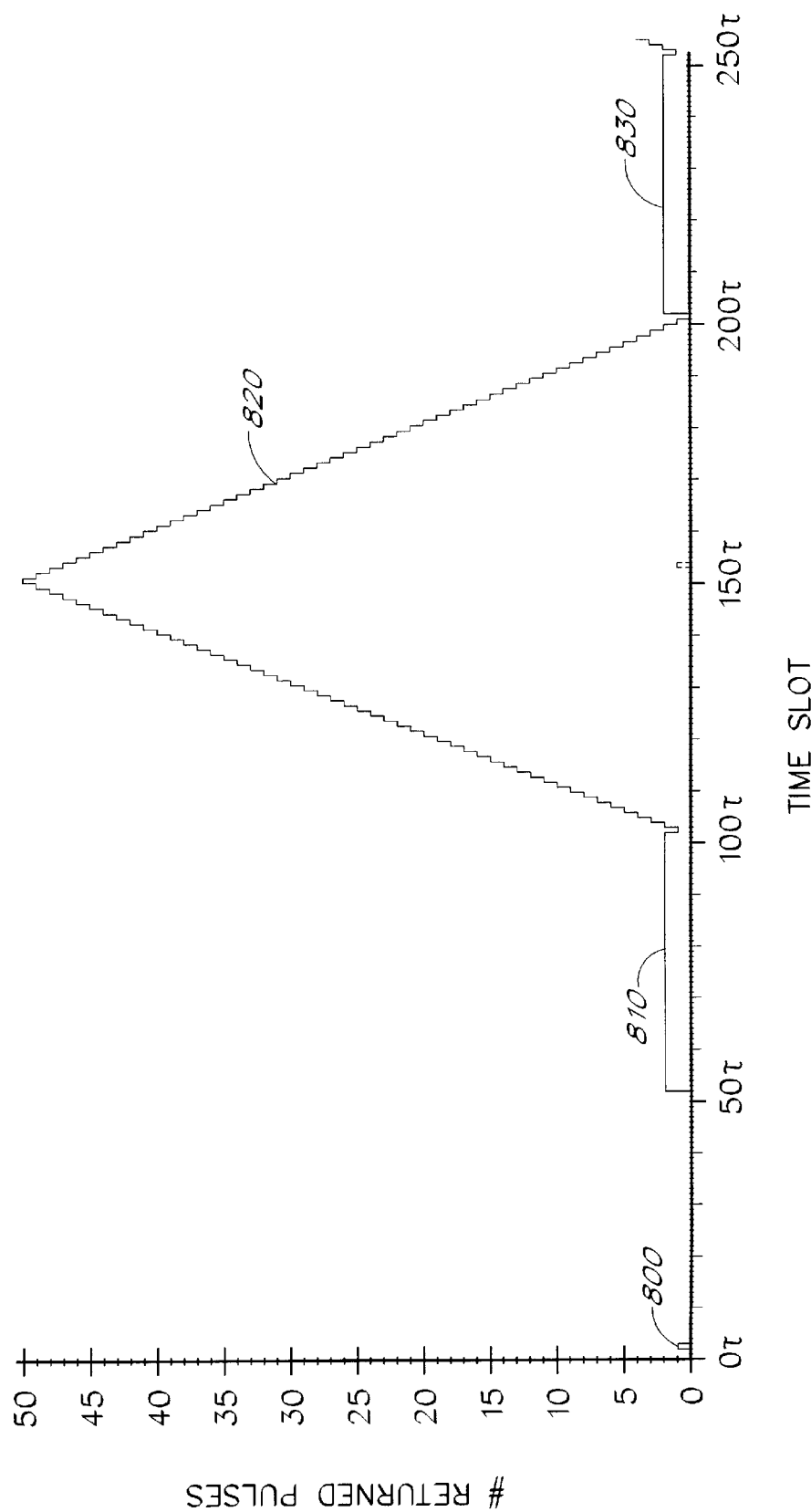
FIG. 18 illustrates a graph of the number of returned pulses per time interval, showing the separation in time of signal pulses and noise pulses.

The duration of each pulse is selected to be no more than $\tau$. Thus, as illustrated in FIG. 18, the first pulse 800 returned to the 3×3 coupler 710 will be the pulse which traveled through the common rung 712 (i.e., rung 0) from the source 702 to the reflector 752 and back to the detectors 704, 706. This pulse has a total propagation time of $2\tau$. (In comparing propagation times, the propagation time of each pulse to the reflector 752 through the delay loop 750 and back is ignored because the propagation time is common to all pulses and simply operates as an offset (not shown) to the timing diagram in FIG. 18.) The next set 810 of pulses returned to the detectors 702, 706 are the pulses which travel through the common rung 712 in one direction and travel through a sensing rung 718(i) in the opposite direction (i.e., the pulses 0,1 and 1,0; 0,2 and 2,0; 0,3 and 3,0, through 0,N and N,0). These pulses have respective propagation times of $2\tau+N\tau$, $3\tau+N\tau$, $4\tau+N\tau$, through $(N+1)\tau+N\tau$. Thus, all the useful pulses are received between a time $(N+2)\tau$ and a time $(2N+2)\tau$ (including the duration $\tau$ of the last pulse received). In contrast, the interfering pulses which travel through a sensing rung 718(i) in both directions (i.e., the pulses, 1,1, 1,2 and 2,1, 1,3 and 3,1 . . . 2,2, 2,3 and 3,2, . . . etc.) are received as a set of pulses 820 between a time $2(N+2)\tau$ and a time $(4N+1)\tau$. Thus, the signal pulses are separated from the noise pulses.

For example, in FIG. 18, the number of returned pulses as a fluction of time is plotted for N=50. As illustrated, a single pulse is received at a time $2\tau$. Thereafter, no pulses are received during the interval $3\tau$ through $52\tau$. Then, from $52\tau$ through $102\tau$, two pulses are received during each time interval. The noise pulses then return from a time $102\tau$ to a time $201\tau$. In this way, the signal pulses are separated in time from the noise pulses, thus preventing the noise pulses from adding noise to the signal pulses. The electronics (not shown) are readily synchronized to only look at the pulses received between the time $52\tau$ and the time $102\tau$.

It should be noted that the source 702 can be activated to send out the next pulse at the at a time interval of $150\tau$ relative to the previous pulse because the $0\tau$ to $50\tau$ interval in response to the next pulse can overlap the $150\tau$ to $200\tau$ interval of noise pulses returning in response to the previous source pulse. Thus, a next set 830 of useful pulses can begin arriving at a time 201. Therefore, the embodiment of FIGS. 17 and 18 has an overall duty cycle of roughly ⅓ for useable signal information.

The advantage of the folded Sagnac acoustic fiber sensor 700 over the Sagnac loop illustrated in the previous figures is that the delay fiber 750 is insensitive to modulation. Because the downleads are often quite long and are subjected to large movements and vibrations, distributed downlead pickup is a potentially serious limitation to a Sagnac acoustic fiber sensor. In the folded Sagnac acoustic fiber sensor 700, the source 708 and detector downleads 770, 772 are insensitive because they occur outside the interferometer. The delay loop downlead 740 is insensitive because all the interfering pulses travel this same fiber separated by small time delays (approximately 1 microsecond) and thus see the same perturbations. Any low frequency (much less than approximately 1 MHz) modulation to the delay loop downlead and delay loop itself it seen substantially equally by both interfering pulses and thus does not contribute to a phase difference. The array portion 716 and the common rung 712 comprise the only sensitive fibers in the interferometer 700.

As shown in FIG. 17, the remotely pumped distributed erbium doped fiber amplifiers (EDFAs) 724 can be located throughout the array 216 to regenerate power, as discussed above.

The 3×3 coupler 710 is used to passively bias each sensor 722(i) near quadrature and to allow source noise subtraction. Noise subtraction results from the fact that each detector 704, 706 is biased on an opposite slope (because of the way the signals coming out of the 3×3 coupler 710 are phased with respect to each other), causing phase modulation to asymmetrically affect the intensity at each detector, while source excess noise symmetrically affects the intensity at each detector. Therefore, by differentially amplifying the detector outputs, the phase modulation induced intensity variations are added and the source's intensity noise is subtracted in the same manner that the signals from the unwanted interferometers would be subtracted.

It should be understood with respect to FIGS. 17 and 18 that a similar time divisional multiplexing effect can be accomplished by providing a longer optical path length through the common rung 712 and shorter optical path lengths through the sensing rungs 718(i). For example, the common rung 712 can advantageously be selected to have an optical path length of $2N\tau$ (i.e., $T_0=2N$), and the optical paths through the rungs can advantageously be selected to be $\tau$, $2\tau$, $3\tau$, . . . $N\tau$. The foregoing can be summarized as:

$T_i = 2N\tau$  $i = 0$  (for the common rung 712)
$T_i = i\tau$  $1 \leq i \leq N$  (for each of the sensing rungs 718(1), 718(2), etc.

Thus, the first signal to return will have an optical propagation time (again subtracting out the propagation time through the delay loop 750 which is common to all signals) of $2\tau$ which is the time required to pass through the first rung 718(1) in both directions. The longest delay of any signal which passes through one of the sensing rungs 718(i) in both directions is 2N for a signal pulse which travels both directions through the farthest sensing rung 718(N). The first useable signal to return is a signal which results from the interference of a signal which travels in to the reflector 752 through the common rung 712 and returns through the first sensing rung 718(1) with a signal which travels to the reflector 752 through the first sensing rung 718(1) and returns through the common rung 712. The interference signal will arrive at a time $(2N+1)\tau$ which is later than the last unwanted signal. The last useable signal will arrive at a time $(2N+N)\tau$ (i.e., $3N\tau$). Finally, a signal produced by a pulse which traveled to and from the reflector 752 in the common rung 712 arrives at a time $4N\tau$, which is well separated from the useable interference signals.

It is desirable for acoustic sensors to have as large a dynamic range (range of detectable acoustic modulation amplitudes) as possible. Without using demodulation techniques such as the phase-generated carrier scheme, the minimum detectable phase modulation is set by the noise performance of the array, and the maximum detectable phase modulation (approximately 1 rad) is set by the nonlinear response function of an interferometer. In a Mach-Zehnder sensor, the mapping of acoustic modulation to phase modulation is a function of only the hydrophone's responsivity. Thus, these limits on the detectable phase modulation along with this mapping of acoustic modulation into phase modulation give the range of acoustic modulation the sensor can detect.

In a folded Sagnac acoustic fiber sensor array, the mapping of acoustic modulation into phase modulation is a function of both the responsivity of each of the hyrophones (sensors) 722(*i*) and the length of the delay loop 750. Thus by changing the length of the delay loop 750, the dynamic range of the sensors 722(*i*) can be adjusted without modifying the hydrophones 722(*i*) themselves. In addition, if two reflectors 742(1) and 752(2) are used, each sensor 718(*i*) can have two different delay loops 750(1) and 750(2), as shown in a sensor 850 in FIG. 19. This allows each sensor 722(*i*) to return two signals which have different dynamics ranges, as discussed above with respect to FIGS. 7 and 8, thereby greatly increasing the total dynamic range of each sensor 722(*i*). The penalty is a reduction in duty cycle for each individual signal by a factor of 1/(number of delay loops).

Figure 20:
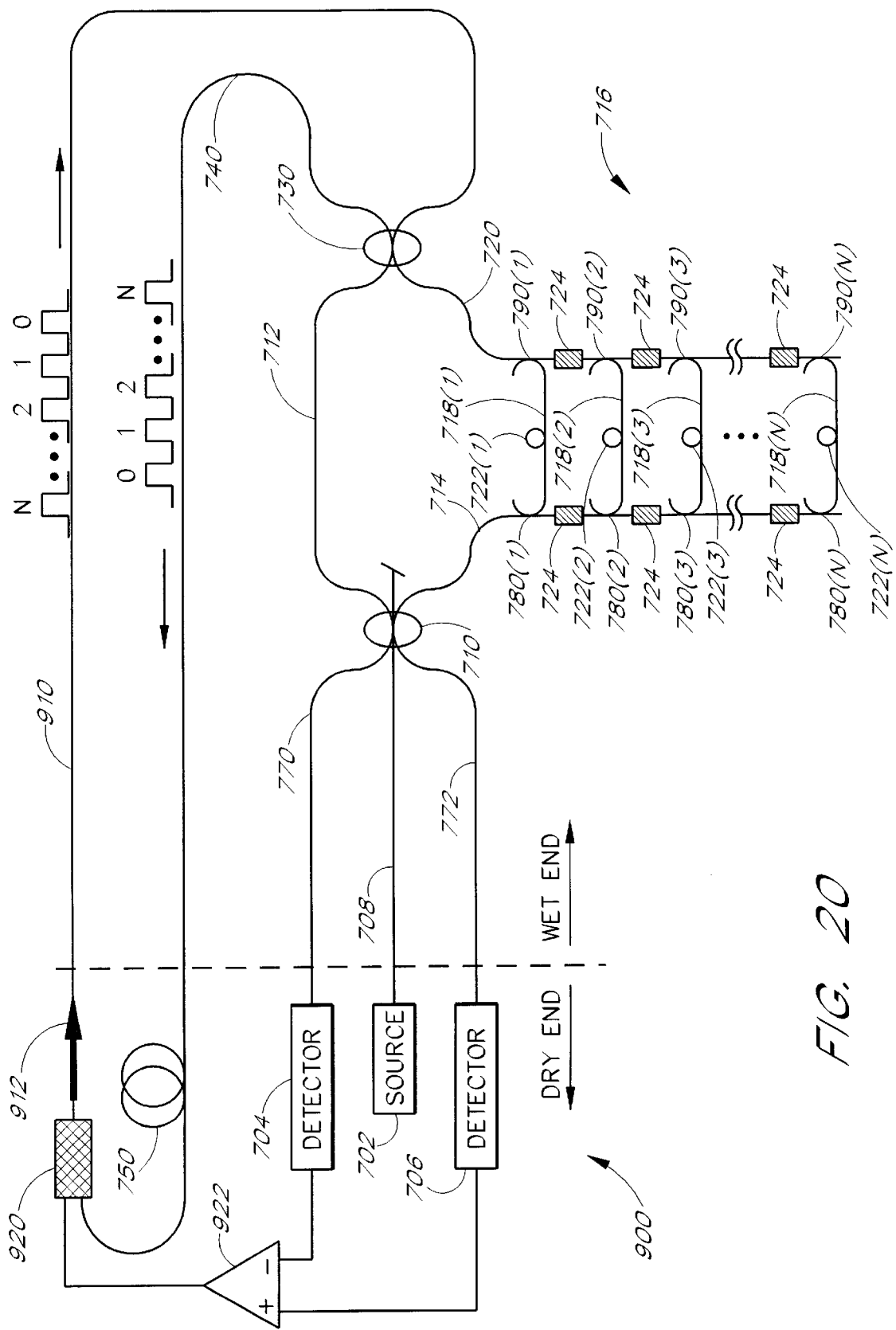
FIG. 20 illustrates a folded Sagnac acoustic fiber sensor array having a phase modulator and nulling circuitry in place of the reflector in FIG. 17.

FIG. 20 illustrates a sensor 900 which implements a phase-nulling technique similar to techniques which have been used in fiber gyroscopes. The delay loop reflector 752 of FIG. 17 is not used in the sensor 900 of FIG. 20. Rather, the pulses are instead returned via a return downlead 910 into the previously unused port of the 2×2 coupler 730. An optical isolator 912 is inserted in the return downlead 910 to prevent light from traveling the delay loop 750 in both directions. The sensor 900 of FIG. 20 behaves identically to the sensor 700 of FIG. 17 with the reflector 752. However, the sensor 900 allows the addition of a phase modulator 920 to be inserted into the return downlead 910. The phase modulator 920 is activated to add a phase shift to each pulse individually. By feeding the detected phase shift into the phase modulator 920 via a differential amplifier 922, phase changes are nulled out, and the required applied phase shift in the phase modulator 920 becomes the signal. In this phase nulling method, the dynamic range of the array 900 is limited only by the maximum phase shift that the phase modulator 920 can provide.

Figure 19:
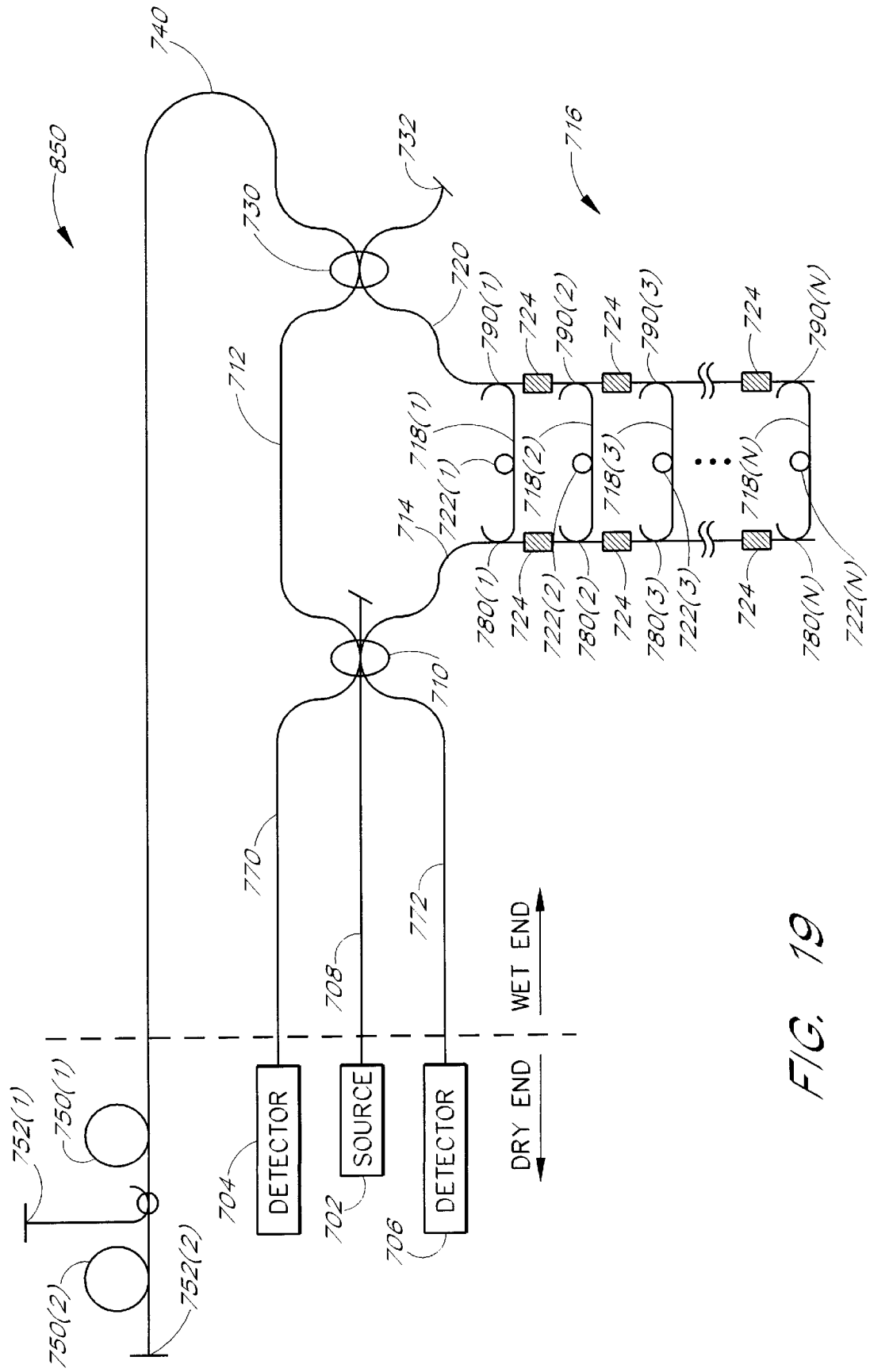
FIG. 19 illustrates a folded Sagnac acoustic fiber sensor array having a second delay loop to provide extended dynamic range.
Figure 21:
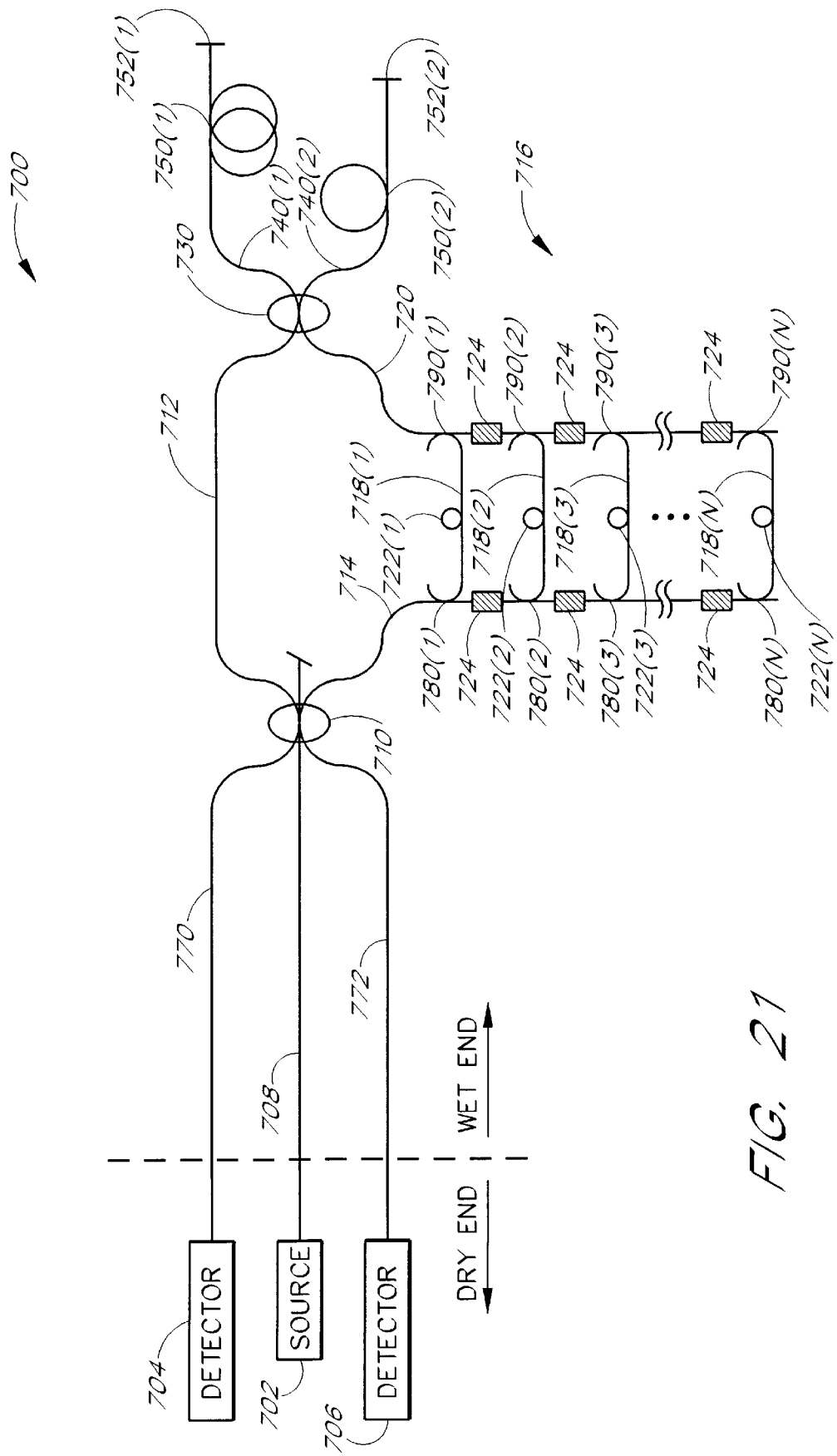
FIG. 21 illustrates a further alternative embodiment of FIG. 19 in which the two delay loops are connected to different ports of the coupler.

FIG. 21 illustrates a further alternative embodiment of FIG. 19 in which the two delay loops 750(1) and 750(2) are not connected to the same delay loop downlead. Rather, the first end of the first delay loop 750(1) is connected to a first delay loop downlead 740(1) which is connected to the fourth port of the 2×2 coupler 730 as in FIG. 19. The second end of the first delay loop 750(1) is coupled to the first reflector 752(1) as before. The first end of the second delay loop 750(2) is coupled to the third port of the 2×2 coupler 730 via a second delay loop downlead 740(2), and the second end of the second delay loop 750(2) is coupled to the second reflector 752(2). Approximately half the light from the 2×2 coupler 730 is coupled to each of the downleads 740(1), 740(2). The light in each downlead 740(1), 740(2) is delayed in the respective delay loop 750(1), 750(2) and is reflected back to the 2×2 coupler 730 as before. The reflected light is coupled to the common rung 712 and to the array 716. The delays of the delay loops 750(1), 750(2) are selected so none of the N+1 pulses which propagate from the fourth port of the 2×2 coupler 730 through the first delay loop 750(1) overlap in time with any of the N+1 pulses which propagate from the third port of the 2×2 coupler 730 through the second delay loop 750(2). Thus, the embodiment of FIG. 21 provides similar functionality to the embodiment of FIG. 19; however, the embodiment of FIG. 21 utilizes the light which was coupled out of the third port of the 2×2 coupler 730 in FIG. 19 and discarded.

Figure 22:
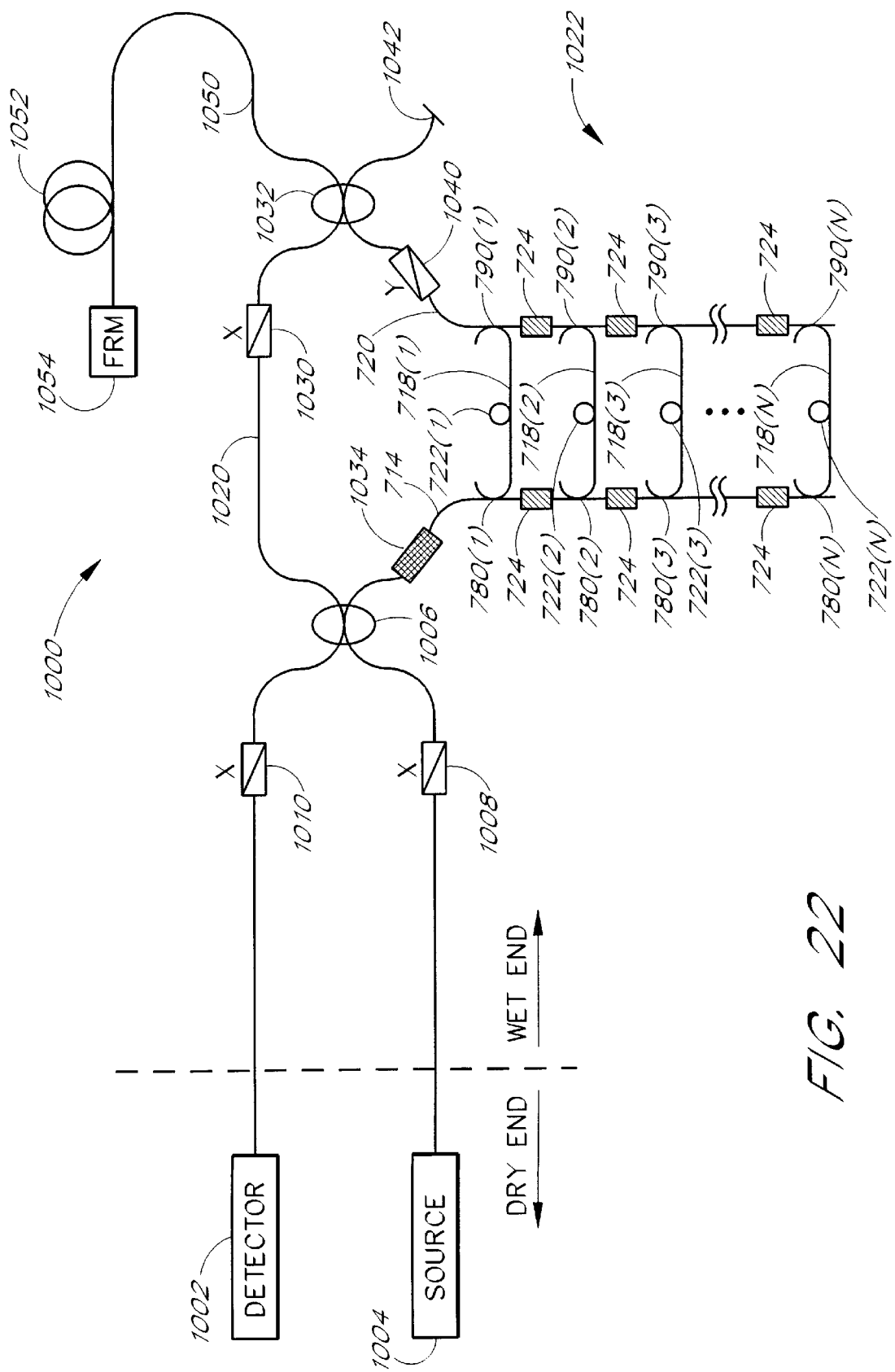
FIG. 22 illustrates an alternative embodiment of a fiber optic acoustic sensor array system using a Faraday rotating mirror.

FIG. 22 illustrates an alternative embodiment of a fiber optic acoustic sensor system 1000 using a folded Sagnac sensor array. In the system 1000, a source 1004 is coupled to a first port of a 2×2 polarization maintaining coupler 1006 by an X-polarizer 1008. A detector 1002 is connected to a second port of the 2×2 coupler 1006 via a X-polarizer polarizer 1010. A second detector (not shown) may advantageously be included in the embodiment of FIG. 22 by coupling light from the fiber leading to the source 1004. The X-polarizer 1008 only passes light from the source 1004 having a first polarization (e.g., an X-polarization). Thus, the polarization maintaining coupler 1006 receives light having an X-polarization from the source 1004 and couples the light to a common rung 1020 via a third port and to a sensor array 1022 via a fourth port. The sensor array 1022 has a similar structure to the sensor array 716 of FIG. 17, and like elements have been numbered accordingly.

Note that the two X-polarizers 1008, 1010 can be replaced by one or more X-polarizers in alternative locations in the system 1000.

The common rung 1020 is coupled via an X-polarizer 1030 to a first port of a second polarization maintaining 2×2 coupler 1032. The light propagating to the array 1022 first passes through a depolarizer 1034 and then to the first input/output fiber 714. The depolarizer 1034 couples substantially equal amounts of the X polarized light to Y polarized light and to Y polarized light. Thus, approximately 50 percent of the light propagates in the array 1022 as X-polarized light, and approximately 50 percent propagates in the array 1022 as Y-polarized light.

After passing through the rungs of the array 1022, the light propagates via the second input/output fiber 720 and a Y-polarizer 1040 to a second port of the second coupler 1032. The Y-polarizer 1040 allows only Y-polarized light to enter the second coupler 1032. The coupler 1032 combines the light from the array 1022 and from the common rung 1020 Approximately half the light entering the coupler 1032 is coupled via a third port of the coupler 1032 to a light absorbing termination 1042, and approximately half of the light is coupled to a downlead fiber 1050 which propagates the light to a first end of a delay loop 1052.

Light passes through the delay loop 1052 to a Faraday rotating mirror (FRM) 1054. The operation of the Faraday rotating mirror 1054 is well known and will not be described in detail. Basically, when light is incident onto the Faraday rotating mirror 1054 in one polarization, it is reflected in the orthogonal polarization. Thus, the X-polarized light which passed through the common rung 1020 is reflected as Y-polarized light, and the Y-polarized light which passed through the array is reflected as X-polarized light.

The reflected light passes back through the delay 1052 and enters the fourth port of the coupler 1032. The light is coupled to the common rung 1020 and to the array 1022. The X-polarizer 1030 in the common rung passes only the light in the X-polarization which originally propagated through the array 1022. Similarly, the Y-polarizer 1040 in the array 1022 passes only Y-polarized light which originally propagated through the common rung 1020.

After propagating through the array 1022, the returning Y-polarized light is depolarized in the depolarizer 1034 to produce both X-polarized light and Y-polarized light. The light from the common rung 1020 enters the third port of the coupler 1006, and light from the depolarizer 1034 enters the fourth port of the coupler 1006. The light combines in the coupler, and the X-polarized light from the two ports which has traveled the same optical distance interferes and is coupled to the first and second ports. The portion coupled to the second port propagates through the X-polarizer 1010 to the detector 1002 where the interfering signals are detected.

It should be understood that only the light which originally traveled different paths to and from the Faraday rotating mirror 1054 interferes at the coupler 1006. The only light allowed to propagate through the common rung 1020 in the reflected direction is X-polarized light which originally propagated in the array 1022 as Y-polarized light. Similarly, the only light allowed to propagate through any of the rungs of the array 1022 in the reflected direction is Y-polarized light which originally propagated in the common rung 1020 as X-polarized light. Potentially interfering light cannot travel through the rungs in both directions to produce the noise signals described above in connection with the above-described embodiments. Thus, each of the pulses generated in the array 1022 from the reflected pulse that originally traveled in the common rung 1020 can interfere with only a single one of the pulses which was originally generated in the array 1022 and which propagated in the common rung 1020 after it was reflected. Thus, it is not necessary in the embodiment of FIG. 22 to include additional delays to separate the useable signal pulses from noise pulses.

Figure 23A:
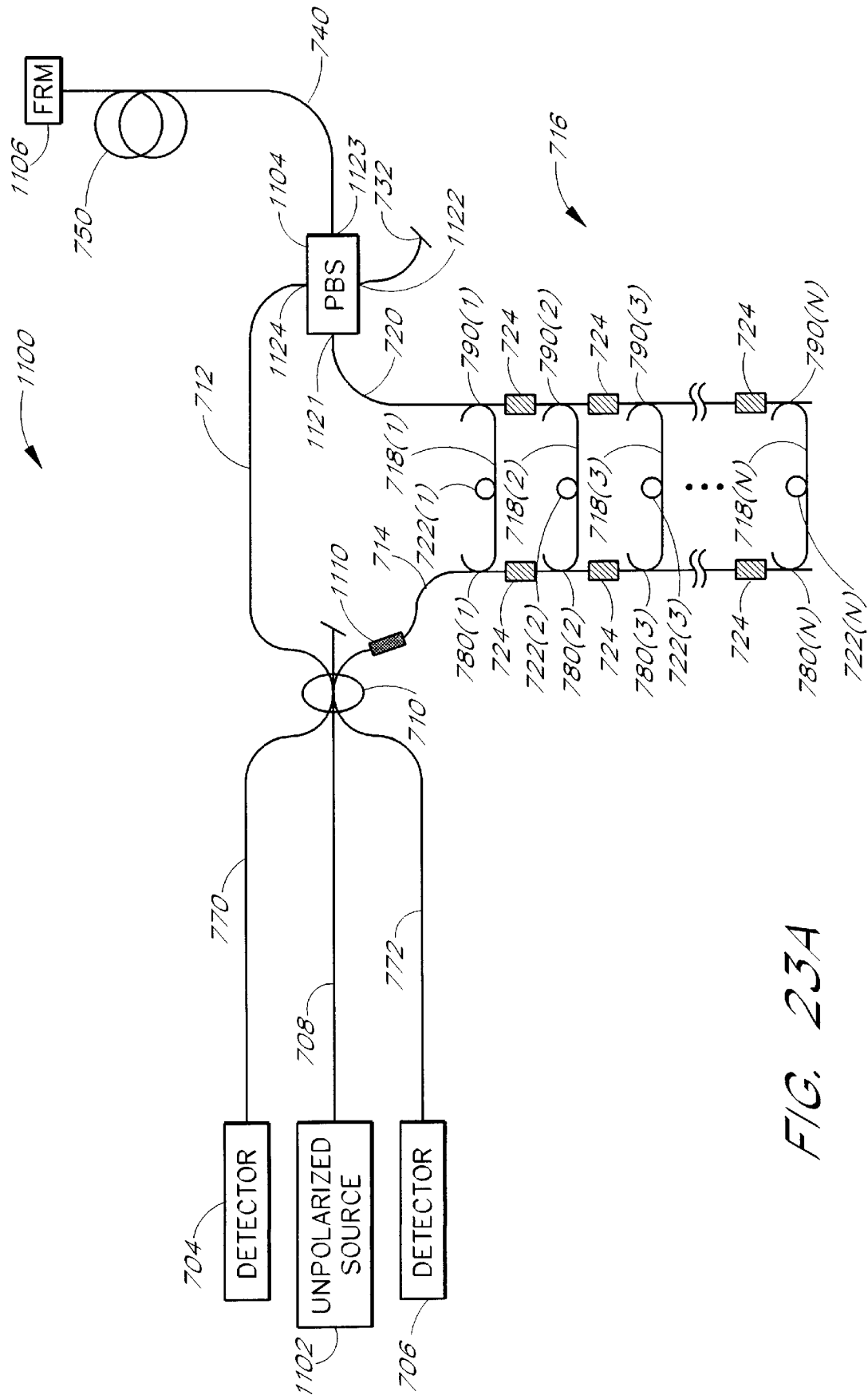
FIGS. 23A, 23B and 23C illustrate further alternative embodiments of a fiber optic acoustic sensor array which utilize an unpolarized light source in combination with a depolarizer, a polarization beam splitter and a Faraday rotating mirror.
Figure 23B:
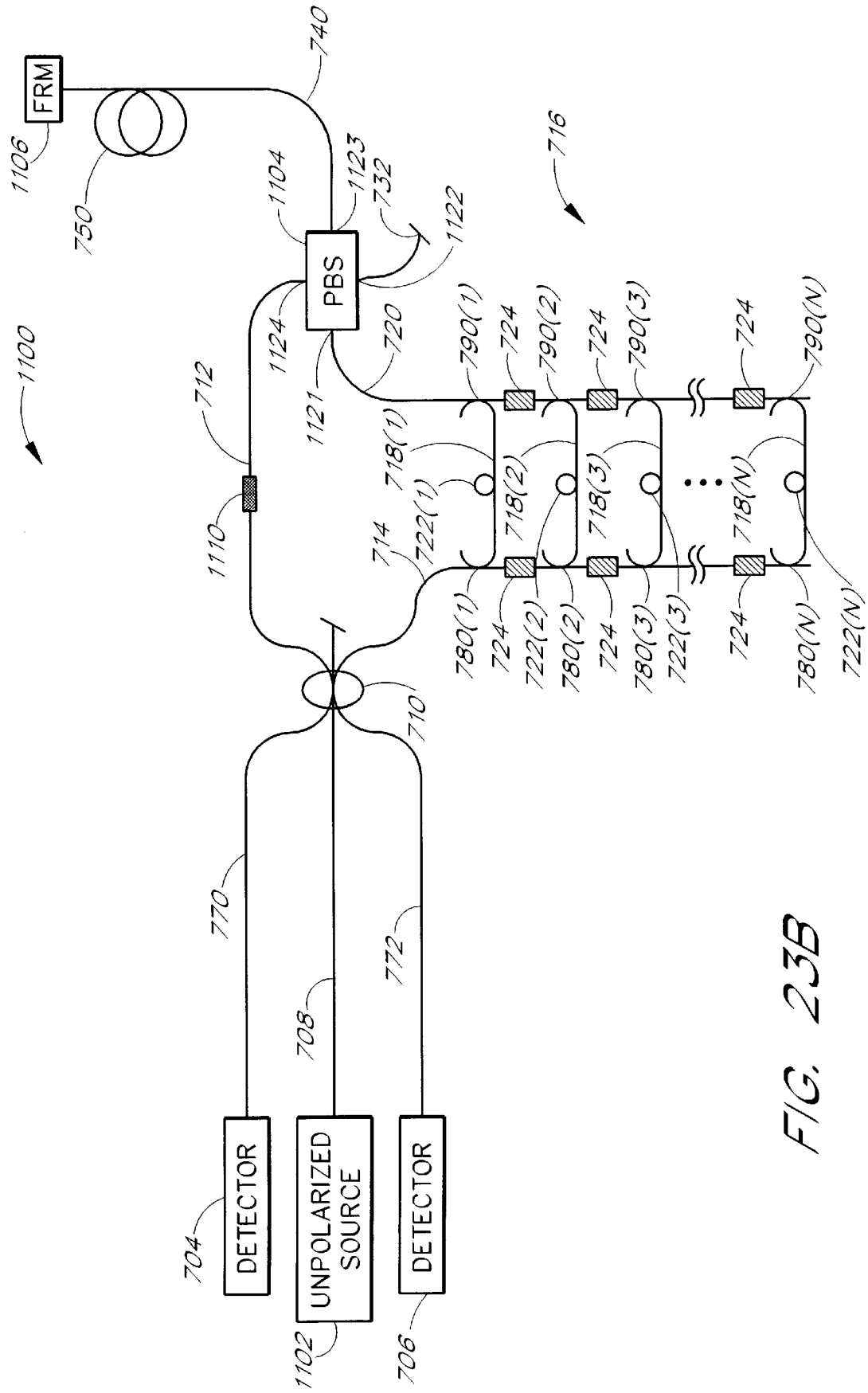
Figure 23C:
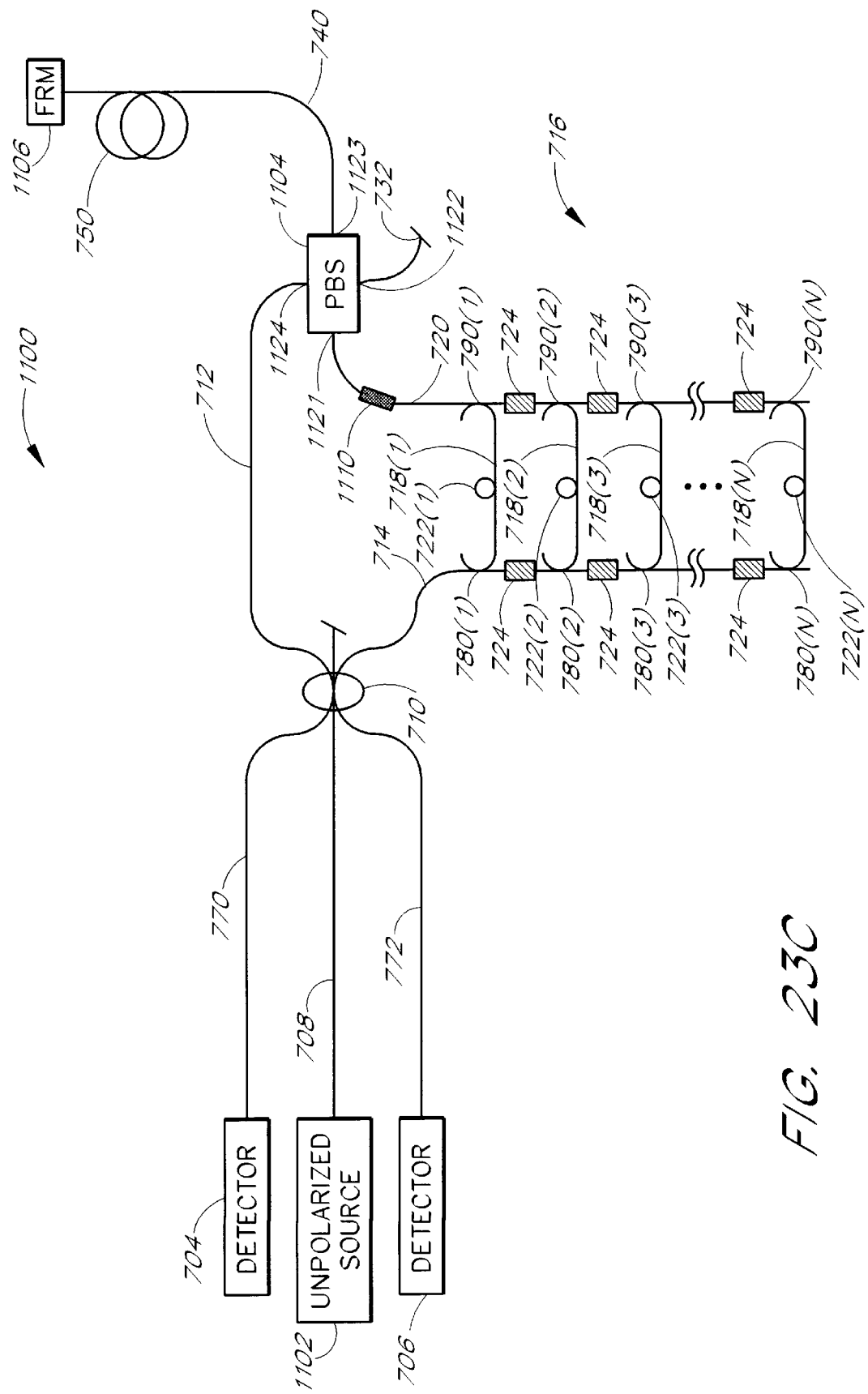

FIGS. 23A, 23B and 23C illustrate further alternative embodiments of the present invention. A sensor array 1100 in the embodiments of FIGS. 23A, 23B and 23C is similar to the sensor array 700 in the embodiment of FIG. 17, and like elements have been numbered accordingly. The embodiments of FIGS. 23A, 23B and 23C include an unpolarized source 1102. The 2×2 coupler 730 of FIG. 17 is replaced with a polarization beam splitter (PBS) 1104 in FIGS. 23A, 23B and 23C. The reflector 752 in FIG. 17 is replaced with a Faraday rotating mirror (FRM) 1106, which is similar to the Faraday rotating mirror 1054 of FIG. 22. The 3×3 coupler 710 in FIGS. 23A, 23B and 23C does not have to be a polarization maintaining coupler.

Each of FIGS. 23A, 23B and 23C includes a depolarizer 1110. In FIG. 23A, the depolarizer 1110 is located on the first array input/output fiber 714. In FIG. 23B, the depolarizer 1110 is located on the common rung 712. In FIG. 23C, the depolarizer 1110 is located on the second array input/output fiber 720.

In the embodiment of FIG. 23A, light from the unpolarized source 1102 enters the 3×3 coupler 710 and is coupled in approximately equal portions to the common rung 712 and to the first array input/output fiber 714. The light propagating in the first array input/output fiber 714 passes through the depolarizer 1110, which has the effect of causing substantially half of the light entering the array in one polarization (e.g., the X-polarization) to be coupled into the orthogonal polarization (e.g., the Y-polarization), and likewise half of the light entering the array in the Y-polarization to be coupled to the X-polarization. Thus, after the depolarizer 1110, half of the light in the X-polarization originated in the X-polarization and the other half of the light in the X-polarization originated in the Y-polarization. Likewise, after the depolarizer 1110, half of the light in the Y-polarization originated in the Y-polarization and the other half of the light in the Y-polarization originated in the X-polarization. Effectively, the depolarizer 1110 scrambles the unpolarized light.

The light passes through the array 716 in the manner described above in connection with the other embodiments. The light exiting the array 716 propagates through the second array input/output fiber 720 to a first port 1121 of the polarization beam splitter 1104. The polarization beam splitter 1104 splits the incident light into the two orthogonal polarizations (i.e., the X-polarization and the Y-polarization). For the purpose of this discussion, it is assumed that the polarization beam splitter 1104 operates like a polarization-dependent mirror oriented at 45°, wherein light entering the first port 1121 in one polarization (e.g., the X-polarization) is reflected to a second port 1122 and light entering the first port 1121 in the other polarization (e.g., the Y-polarization) is transmitted to a third port 1123. In the embodiment shown, the light exiting the second port 1122 is nonreflectively absorbed by the terminator 732. The Y-polarized light exiting the third terminal 1123 propagates through the delay loop download fiber 740, through the delay loop 750 to the Faraday rotating mirror 1106. Note that this Y-polarized light from the array portion 716 traveled through the depolarizer 1110 and half of it was originally X-polarized light and half of it was originally Y-polarized light. As discussed above, the Faraday rotating mirror 1106 causes the incident light to be coupled to the orthogonal polarization. Thus, the Y-polarized light is coupled to the X-polarization.

The X-polarized light reflected by the Faraday rotating mirror 1106 passes through the delay loop 750 and the delay loop download fiber 740 back to the third port 1123 of the polarization beam splitter. Because the light is now in the X-polarization, the light is reflected to a fourth port 1124 rather than being transmitted to the first port 1121. Thus, the Y-polarized light which was originally incident on the polarization beam splitter from the array 716 is coupled to the common rung 712 to propagate back to the 3×3 coupler 710 in the X-polarization.

Unpolarized light which propagates from the 3×3 coupler 710 to the polarization beam splitter 1104 via the common rung 712 enters the polarization beam splitter 1104 via the fourth port 1124. The components of the light in the Y-polarization are transmitted to the second port 1122 and are nonreflectively terminated by the terminator 732. The components of the light in the X-polarization are reflected to the third port 1123 and propagate to the Faraday rotating mirror 1106 via the delay loop download fiber 740 and the delay loop 750. (The reason for including the depolarizer 1110 can now be understood. Because only the X-polarized light from the common rung 712 is coupled to the delay loop download fiber 740, the depolarizer 1110 ensures that the light coupled from the array 716 to the delay loop download fiber 740 also includes some light which was originally X-polarized.) The Faraday rotating mirror 1106 reflects the light as Y-polarized light, and the Y-polarized light propagates through the delay loop and the downlead fiber to the third port 1123 of the polarization beam splitter 1104.

The Y-polarized light incident on the third port 1123 of the polarization beam splitter 1104 is transmitted to the first port 1121 and thus to the second array input/output fiber 720. The Y-polarized light propagates through the array 716 to the first array input/output fiber 714 and then passes through the depolarizer 1110 to the 3×3 coupler 710. The depolarizer 1110 operates to convert approximately 50 percent of the Y-polarized light to X-polarized light. The X-polarized light from the depolarizer 1110 interferes with the X-polarized light from the common rung 712. The resulting combined light is detected by the detector 704 or the detector 706 in accordance with the phase relationship between the interfering light signals in the 3×3 coupler 710.

Note that the X-polarized light incident on the 3×3 coupler 710 from the depolarizer 1110 and the X-polarized light from the common rung 712 travel identical path lengths. For example, light which propagates through the common rung 712 first, propagates in the X-polarization through the common rung 712 and then propagates through the array 716 in the Y-polarization. On the other hand, the light which propagates through the array 716 first propagates in the Y-polarization through the array 716 and then propagates in the X-polarization through the common rung.

Because the two "counterpropagating" light signals are in the same polarizations when propagating through the corresponding portions of the interferometric path, the propagation lengths are identical except for the effect of incident noise sensed by the array 716.

It should be understood that the terminator 732 coupled to the second port 1122 of the polarization beam splitter 1104 can be replaced with a second delay loop (not shown) and a second Faraday rotating mirror (not shown) to provide a second interferometric path for light which interferes in the Y polarization. By adjusting the delay provided by the second delay loop, the return signals from the second interferometric path can be precluded from overlapping with the return signals from the first interferometric path.

The embodiment of FIG. 23B is similar to the embodiment of FIG. 23A except that the depolarizer 1110 is positioned in the common rung 712. The effect of the depolarizer 1110 in FIG. 23B is (1) to cause a portion of the light in the common rung 712 returning from the polarization beam splitter 1104 in a single polarization (e.g., the X-polarization) to be coupled to the orthogonal polarization and (2) to scramble the unpolarized light which travels from the 3×3 coupler 710 through the common rung 712 towards the polarization beam splitter 1104. This ensures that the light interferes when it recombines at the 3×3 coupler 710 (the same reason the depolarizer 1110 was added to the fiber 714 of FIG. 23A).

The embodiment of FIG. 23C is also similar to the embodiment of FIG. 23A except that the depolarizer 1110 is positioned in the second array input/output fiber 720. The embodiment of FIG. 23C is functionally equivalent to the embodiment of FIG. 23A because it does not matter whether the light passes through the array portion 716 and then passes through the depolarizer 1110 or passes through the depolarizer 1110 and then passes through the array portion 716. Thus, the function of the embodiment of FIG. 23C is substantially the same as the function of the embodiment of FIG. 23A, as described above.

Although the foregoing description of the array in accordance with the present invention has addressed underwater acoustic sensing, it should be understood that the present invention can be used to sense any measurand which can be made to produce non-reciprocal phase modulations in a fiber. If, for example, the hydrophones were replaced with an alternative sensing device which responds to a different measurand, the array would detect that measurand in the same manner as acoustic waves are detected. The array of the present invention can be advantageously used to sense vibrations, intrusions, impacts, chemicals, temperature, liquid levels and strain. The array of the present invention may also be used to combine a number of different sensors located at either the same place or located in different places (e.g., for the detection of various faults at various points along the hull of a ship or a building). Other exemplary applications include the detection and tracking of moving automobiles on highways or airplanes on airstrips for traffic monitoring and control.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. An acoustic sensor comprising:
   a source of a light;
   a first coupler which couples said light to a first optical path having a first optical length and to an array of sensors, said array of sensors comprising at least a first sensor, said first sensor being in a second optical path having a second optical length different from said first optical length;
   a second coupler which receives light from said first optical path and from said array and couples said light to an optical delay path, said light returning from said optical delay path to said second coupler, said second coupler coupling said light returning from said optical delay path to said first optical path and to said array, said light returning from said optical delay propagating through said first optical path and said array to said first coupler, said first coupler combining said light from said first optical path and said array to cause light traveling equal distances through said first optical path and said array to interfere and generate a detectable output signal, said detectable output signal varying in response to acoustic energy impinging on said first sensor; and
   at least one detector which detects said detectable output signals to generate a detector output signal responsive to variations in said detectable output signal from said first coupler.

2. The acoustic sensor as defined in claim 1, further including a second sensor in said array, said second sensor being in a third optical path having a third optical length different from said first optical length and said second optical length.

3. An acoustic sensor comprising:
   a source of a input light;
   a first coupler which couples said input light to at least a first optical path and to at least one additional optical path for propagation therein in a first direction, said first optical path having a first optical length, light passing through said first optical path being substantially unaffected by an acoustic signal, said at least one additional optical path having a second optical length different from said first optical length, at least a portion of said at least one additional optical path being affected by said acoustic signal to modulate a phase of light passing through said portion of said at least one additional optical path;
   a delay path; and
   a second coupler which couples light from said first optical path and said at least one additional optical path to said delay path, said light from said first optical path and said at lease one additional optical path comprising respective first and second portions of light which are spaced apart in time in accordance with differences in said first and second optical lengths, said first and second portions of light returning from said delay path as respective first and second delayed portions of light, said second coupler coupling said first and second delayed portions of light to said first optical path and to said at least one additional optical path, each of said first and second delayed portions of light being coupled to each of said optical paths for propagation therein in a second direction opposite said first direction, said portions of light traveling in said second direction being recombined in said first coupler and being output from said first coupler to at least one detector, said detector detecting interference between light pulses which travel substantially equal total distances in said first and second directions.

4. A method of detecting acoustic signals, comprising:

generating an input light signal;

coupling said input light signal to at least first and second propagation paths to propagate in respective first directions therein, said first and second propagation paths having respective first and second optical lengths, said first and second propagation paths outputting respective first and second output light portions, said first and second output light portions being output from said first and second propagation paths at differing times in accordance with differences in said first and second optical path lengths, said second output pulse being modulated by an acoustic signal impinging on said second propagation path;

coupling said first and second output light portions to a delay path, said delay path outputting first and second delayed light portions corresponding to said first and second output light portions;

coupling said first and second delayed light portions to said first and second propagation paths to propagate therein in a second direction opposite said first direction, said first propagation path outputting a first set of return light portions, said first set of return light portions comprising a respective return light portion for each of said first and second delayed light portions, said second propagation path outputting a second set of return light portions, said second set of return light portions comprising a respective return light portion for each of said first and second delayed light portions;

coupling said first and second sets of return light portions to at least one detector, said return light portions in said first and second sets of return light portions resulting from output light portions and delayed light portions which travel identical optical path lengths interfering to generate detectable output signals; and selectively detecting said detectable output signals to detect only output signals resulting from interference of light portions which propagated in said first propagation path in either said first direction or said second direction, said detectable output signals varying in response to the acoustic signal impinging on said second propagation path.

5. A sensor comprising:

a first optical coupler to receive input light and to couple the input light to a first optical path having a first optical propagation delay and to a second optical path, said second optical path comprising an array of sensors, each sensor in said array being in an optical path having a respective optical propagation delay;

a second optical coupler to receive light from said first optical path and from said array, to couple said light to a delay path, and to couple light returning from said delay path back to said first and second optical paths to cause said light to propagate to said first optical coupler to be recombined therein, portions of said light interfering in said first optical coupler when said portions of said light have traveled equal distances through said first and second optical paths before returning to said first coupler; and a detector which detects variations in intensity of light resulting from light pulses interfering in said first coupler.

6. A sensor comprising:

a first coupler which couples light to a common path and to a sensing array to propagate in respective first directions therein, said sensing array comprising a plurality of sensing paths;

a second coupler which couples light from said common path and from said sensing array to a delay path, said second coupler firther coupling light from said delay path to said common path and to said sensing array to propagate in respective second directions therein to said first coupler, said first coupler providing output light responsive to said light propagating in said respective second directions; and a detector which receives said output light from said first coupler and generating an output signal responsive to interference of light in said first coupler.

7. The sensor as defined in claim 6, wherein said delay path comprises a length of optical fiber and a reflector, said length of optical fiber selected to provide an optical delay time, said light propagating through said optical fiber from said second coupler to said reflector, said reflector reflecting light into said optical fiber to propagate through said optical fiber to said second coupler.

8. The sensor as defined in claim 6, wherein said reflector comprises a Faraday rotating mirror, said light incident on said Faraday rotating mirror in a first polarization being reflected in an orthogonal second polarization and said light incident in said second polarization being reflected in said first polarization.

9. The sensor as defined in claim 8, further including a first polarizer to permit light to propagate in said first polarization in said common path between said first coupler and said second coupler, and a second polarizer to permit light to propagate in said second polarization in said sensing array, said Faraday rotating mirror causing light which propagates in said common path in said first direction to propagate only in said sensing array in said second direction and causing light which propagates in said sensing array in said first direction to propagate only in said common path in said second direction, portions of said light propagating in said second direction in said common path interfering at said first coupler with portions of said light propagating said second direction in said sensing array which travel substantially equal total optical path lengths in said first and second directions.

10. The sensor as defined in claim 6, wherein said delay path receives said light from a first port of said second coupler and returns light to a second port of said second coupler.

11. The sensor as defined in claim 6, wherein said delay path includes a phase modulator which modulates light propagating in said delay path, said phase modulator responsive to said output signal from said detector to modulate said light propagating in said delay path to null said output signal from said detector.

12. The sensor as defined in claim 6, further including an unpolarized source to generate said optical pulse and a depolarizer to depolarize light generated by said unpolarized source.

* * * * *

UNITED STATES PATENT AND TRADEMARK OFFICE
CERTIFICATE OF CORRECTION

PATENT NO. : 6,034,924
DATED : March 7, 2000
INVENTOR(S) : Benjamin J. Vakoc

It is certified that error appears in the above-identified patent and that said Letters Patent is hereby corrected as shown below:

<u>Column 36,</u>
Line 11, change "firther" to -- further --.

Signed and Sealed this

Seventh Day of May, 2002

Attest:

Attesting Officer

JAMES E. ROGAN
Director of the United States Patent and Trademark Office